United States Patent
Okamura et al.

(10) Patent No.: US 6,490,515 B1
(45) Date of Patent: Dec. 3, 2002

(54) PASSENGER DETECTING APPARATUS

(75) Inventors: Hiroyo Okamura, Yokohama (JP); Naobumi Kuboki, Yokohama (JP); Takayuki Enomoto, Yokohama (JP); Shoichi Negami, Hiratsuka (JP); Kyosuke Hashimoto, Kawasaki (JP)

(73) Assignee: The Furukawa Electric Co., Ltd. (JP)

( * ) Notice: Subject to any disclaimer, the term of this patent is extended or adjusted under 35 U.S.C. 154(b) by 47 days.

(21) Appl. No.: 09/670,935

(22) Filed: Sep. 26, 2000

Related U.S. Application Data

(63) Continuation of application No. PCT/JP00/00253, filed on Jan. 20, 2000.

(30) Foreign Application Priority Data

| Jan. 27, 1999 | (JP) | 11-018962 |
| Mar. 31, 1999 | (JP) | 11-093064 |
| Apr. 20, 1999 | (JP) | 11-112392 |
| Apr. 28, 1999 | (JP) | 11-122588 |

(51) Int. Cl.⁷ .............................. G06F 19/00
(52) U.S. Cl. ................ 701/49; 701/45; 280/730.1; 180/273
(58) Field of Search ............. 701/49, 45; 280/735, 280/730.1, 730.2, 743.1; 180/273, 272; 340/561, 562, 666, 667; 702/98, 101, 94, 128, 134

(56) References Cited

U.S. PATENT DOCUMENTS

| 5,494,311 A | * | 2/1996 | Blackburn et al. | 280/735 |
| 5,612,876 A | * | 3/1997 | Zeidler et al. | 701/45 |
| 5,678,854 A | * | 10/1997 | Meister et al. | 280/735 |
| 6,024,378 A | * | 2/2000 | Fu | 280/735 |
| 6,043,736 A | * | 3/2000 | Sawahata et al. | 340/438 |
| 6,043,743 A | * | 3/2000 | Saito et al. | 340/562 |
| 6,076,853 A | * | 6/2000 | Stanley | 280/735 |
| 6,101,436 A | * | 8/2000 | Fortune et al. | 701/45 |
| 6,104,972 A | * | 8/2000 | Miyamoto et al. | 701/45 |
| 6,186,538 B1 | * | 2/2001 | Hamada et al. | 280/735 |

FOREIGN PATENT DOCUMENTS

| JP | 61-113527 | 5/1986 |
| JP | 07-237487 | 9/1995 |
| JP | 07-270541 | 10/1995 |
| JP | 09-150662 | 6/1997 |
| JP | 10-206254 | 8/1998 |
| JP | 10-236272 | 9/1998 |
| JP | 10/236274 | 9/1998 |
| JP | 10-297334 | 11/1998 |
| JP | 10-318861 | 12/1998 |

* cited by examiner

Primary Examiner—Tan Nguyen
(74) Attorney, Agent, or Firm—Knobbe, Martens, Olson & Bear, LLP

(57) ABSTRACT

A passenger detecting apparatus determines the presence of a passenger or an object, such as a child seat, in a seat unit, estimates the weight of the passenger or determines the build of the passenger, thereby improving the usability of peripheral devices of a seat. The passenger detecting apparatus has a dielectric sensor (111) and a pressure-sensitive sensor (112) in a seat cushion (102) and detects the presence of a passenger or an object on a seat based on their outputs, or has a dielectric sensor and a pressure-sensitive sensor in the seat cushion and a dielectric sensor (113) in the back rest and an angle sensor (114) for detecting an angle defined by the seat cushion and the back rest and determines the build of a passenger based on their outputs.

7 Claims, 42 Drawing Sheets

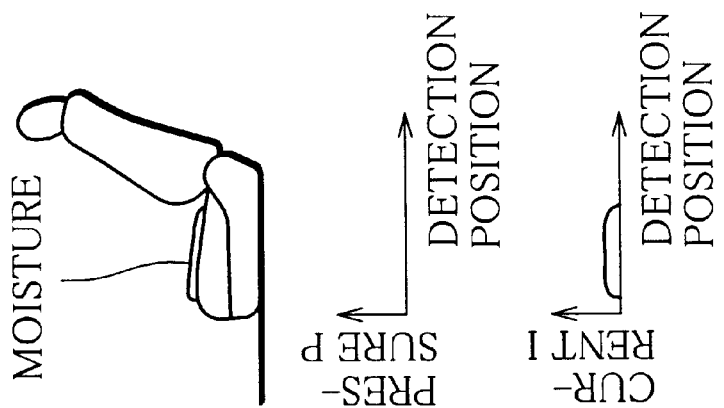
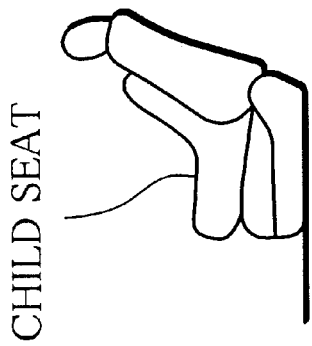
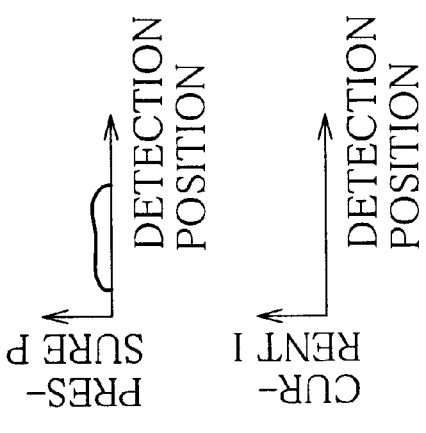
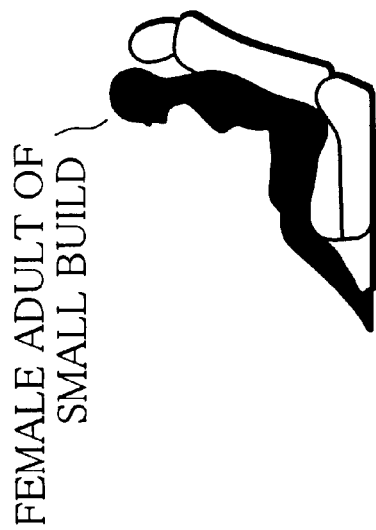
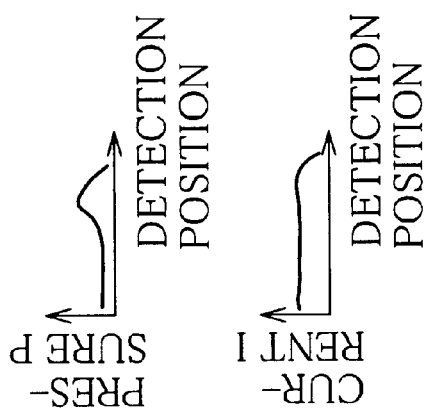

FORWARD SEATING

BACK ←→ FRONT

CORRECTION COEFFICIENT α FOR LOAD APPLIED TO FEET

SMALL   LARGE

BACK ←→ FRONT
(BARYCENTER POSITION)

CORRECTION COEFFICIENT β FOR LOAD APPLIED TO FEET

SMALL   LARGE

BACK ←→ FRONT
(HEAD POSITION)

RECLINING

BACK ← → FRONT

CORRECTION COEFFICIENT $\alpha$ FOR LOAD APPLIED TO FEET

LARGE  SMALL

BACK ← → FRONT
(BARYCENTER POSITION)

CORRECTION COEFFICIENT $\beta$ FOR LOAD APPLIED TO FEET

LARGE  SMALL

BACK ← → FRONT
(HEAD POSITION)

PASSENGER DETECTING APPARATUS

This application is a continuation under 35 U.S.C. Section 120 to International Application No. PCT/JP00/00253, filed on Jan. 20, 2000. The disclosure of this application is hereby incorporated by reference in its entirety.

TECHNICAL FIELD

The present invention relates to a passenger detecting apparatus which determines the presence of a passenger or an object, such as a child seat, on a seat apparatus, accurately estimates the weight of a passenger, or determines or classifies the build or the seating posture of a passenger seated on a seat.

BACKGROUND ART

Passenger restraint systems, such as an air bag system, a seat-belt pretensioner and a force limiter are often equipped around, for example, the seat apparatus of an automobile to secure the safety of a passenger. If those passenger restraining systems are used inadequately or wrong, however, the passenger restraint systems may hurt a passenger. If an air bag is activated while a woman of small build is driving with her face close to the steering wheel, the abrupt inflation of the air bag may cause a face injury. If an air bag is activated with a child sitting in the front of a front passenger seat, the inflation of the air bag likewise may injure the child.

To prevent harmful effects from being done by the restraint systems that should guarantee safety of a passenger, it is desirable to adequately activate the passenger restraint systems around the seat apparatus in accordance with the build of a passenger seated on a seat.

In a case of an air bag system, for example, there is a demand of attaching a passenger detecting apparatus to a seat unit to determine the build of a passenger and performing such control as to inflate the air bag normally when the passenger is determined as an adult of a standard size, to slow the air-bag bag inflation time when the passenger is determined as an adult of small build and not to inflate the air bag and secure safety only with a seat belt when the passenger is determined as a child.

Accordingly, consideration is given to what is called a smart air bag system which controls an air bag in accordance with the build of a passenger. There are various systems of using the position or the like of a passenger on a seat besides build information such as the weight and height, as threshold values for the build of a passenger. Of those systems, the most promising one is the system that controls an air bag according to the build information of a passenger. Specifically, this system determines the weight of a passenger to make classification and controls the air-bag inflation time, air-bag inflation strength or the like.

One example of a passenger detecting system which makes such decisions as to if a passenger is in a danger zone and whether the passenger is a child or an adult is introduced in U.S. Pat. Nos. 5,573,269 and 5,670,853.

The passenger detecting systems described in those publications have weight sensors located around a seat, i.e., under the seat, under the seat fabric and under the floor mat under feet, a back-rest angle sensor located in the back rest and a height sensor located above a passenger and detect the weight and position of the passenger by a combination of those sensors.

Those systems combine at least four sensors, which lead to a higher cost.

In the case where a load sensor is provided under a seat, to accurately detect the weight of a passenger, it is necessary to consider the load applied under the feet of the passenger in addition to the load detected by this load sensor. If a weight sensor is located under the floor mat as described in the aforementioned publications to acquire the load applied under the feet, the positions of the feet of a passenger differ depending on the build and posture of the passenger. This makes it difficult to accurately detect the load applied under the feet.

That is, to measure the value of the load on a seat and control the air-bag inflation time and air-bag inflation strength in accordance with the weight of a passenger, the accurate weight information of the passenger should be acquired. Even with a combination of a plurality of sensors, instruments or the like, it is difficult to make accurate measurements due to the posture of a passenger, a change in ambient temperature, a change in humidity, vibration of a vehicle and so forth. In this respect, in consideration of a variation of each measured value, it seems adequate to classify the weight of a passenger into classes having certain ranges.

It is also necessary to consider a case where an infant or a child is seated in a child seat (an auxiliary seat for a child including an infant seat and a booster seat). Specifically, the height to the head of an infant or a child, the distance to the dash board, the restraint force to the seat and so forth greatly differ from those in the case where a female adult of small build is seated. It is therefore demanded not to activate the supplemental systems around a seat, such as an air bag, unnecessarily. Since the value of the load applied to a seat in the case where a child is seated using a child seat is close to the load value in the case where a female adult of small build is seated, however, accurate passenger information may not be obtained so that the supplemental systems around a seat, such as an air bag, may be activated unnecessarily. Therefore, it is also necessary to adequately classify the weight of a passenger and to securely detect, particularly, the case where an infant or a child is seated on the car seat via a child seat.

There has been an antenna/tag system which has a tag provided on a child seat side and determines whether or not a child seat is in use by emitting radio waves toward the tag from a seat unit to detect the presence of the tag. While it is possible to determine whether or not a child seat is in use using this system, such a tag should not necessarily be provided on a child seat and when a child seat without such a tag is attached to the seat unit, the passenger detecting apparatus may erroneously determine that an adult is seated on the seat unit, resulting in an unnecessary activation of restraint systems, such as an air bag.

Japanese Unexamined Patent Publication (KOKAI) No. Hei 9-150662 discloses the structure that has a distortion gauge provided between a seat cushion and a plurality of brackets for securing the seat cushion to the floor of a vehicle. This structure merely makes reliable detection of the presence or absence of a seated person without being influenced by the seating position of the seated person on a seat, but cannot adequately classify the weight of a passenger on a seat and surely detect, particularly, the case where an infant or a child is seated on the seat via a child seat.

When the load that is applied to the seating surface using a passenger detecting apparatus, just changing the angle of the back rest, for example, significantly changes the load applied to the seating surface even if the same person is seated. This makes it difficult to estimate the size of the passenger's weight. Specifically, for example, the load that is applied to the seating surface in the case where a woman of small build is seated with the back rest set fully upright is close to the load in the case where a man of a standard size is seated with the back rest tilted slightly, so that the build cannot be determined accurately.

If such a type of passenger detecting apparatus is used in, for example, controlling an air bag, it is not possible to perform inflation of an air bag according to the build of a passenger seated on a seat or necessary inflation of a front-seat-passenger's air bag.

The aforementioned passenger detecting apparatus needs a sensor for detecting weight information to determine the build of a passenger. As this sensor, a load sensor for detecting the weight of a passenger has been proposed. Load sensors 410a to 410d are provided between a seat cushion pan 411 and springs 412 or a seat mounting section 413 to detect the weight of a passenger, as shown in FIG. 51.

As the aforementioned load sensor, an electric capacitance type or a distortion gauge or the like is used. The electric capacitance type load sensor detects the weight from a change in the electric capacitance caused by a load-induced change in the distance between electrodes, and the load sensor that uses the distortion gauge detects the weight from a load-induced change in resistance.

While those load sensors are excellent in acquiring an output proportional to the amount of a change in weight (a change in electric capacitance, resistance), the acquired output is the amount of a change in weight and the accurate weight of a seated passenger cannot be detected unless the initial value of the load sensor is set accurately.

The initial value corresponding to the initial weight of the load sensor is likely to drift due to the influence of a change in the ambient environment, such as the temperature, so that accurate weight detection is difficult.

The load applied to the load sensor is the sum of the weight of a passenger and the weight of a seat. However, the weight of a seat varies depending on the type of a vehicle, and further depending on the attaching position of the load sensor. It was therefore necessary to correct the initial value according to such a difference. As the initial value of the load sensor differs depending on the mechanical attaching state of the sensor, it should be corrected for each sensor and a manual work or the like is troublesome and takes time.

It is an object of the present invention to provide a passenger detecting apparatus which determines the presence of a passenger or an object on a seat unit and determines the build of a passenger to improve the availability of seat's peripheral units, such as passenger restraint systems.

It is another object of this invention to provide a passenger detecting apparatus which adequately classifies the weight of a passenger on a seat and reliably detects, particularly, the case where an infant or a child is seated on the seat via a child seat.

It is a further object of this invention to provide a passenger detecting apparatus which accurately estimates the weight of a passenger on a seat.

It is a still further object of this invention to provide a passenger detecting method and system which easily corrects the initial value of weight detection means to be able to improve the precision in detecting the weight of a passenger.

SUMMARY

To achieve the above objects, a passenger detecting apparatus according to this invention is characterized by comprising first detection means for detecting presence of a passenger or an object on a seat cushion; and decision means for determining whether the passenger is sitting on the seat cushion or the object is present thereon based on the first detection means.

As it is possible to accurately determine the state of an object lying on the seat cushion of a seat unit, the passenger detecting apparatus, when used in a seat unit of an automobile, can determine whether a child seat or a cargo is on the seat unit or a passenger of a relatively small build is sitting, so that restraint systems for passenger safety, such as an air bag, and other peripheral systems of the seat can be activated properly.

When the passenger detecting apparatus is used in a passenger seat unit in a vehicle, an airplane or the like, it is possible to remotely detect the passenger occupying state of the seat unit.

It is preferable that in the passenger detecting apparatus, the first detection means has at least a dielectric sensor and a pressure sensor.

Because it is determined if a passenger or an object is present on a seat cushion based on the detection result of the pressure sensor and determine whether it is a passenger or an object by means of the dielectric sensor, it is possible to reliably distinguish a passenger from an object as well as the presence or absence of a passenger or an object on the seat cushion.

It is preferable that in the passenger detecting apparatus, the first detection means has at least a dielectric sensor and a temperature sensor.

It is possible to determine that a passenger is seated only when the temperature sensor and the dielectric sensor both satisfy certain conditions and determine that an object is lying on the seat cushion when one of the temperature sensor and the dielectric sensor satisfies certain conditions.

It is preferable that in the passenger detecting, the decision means also determines whether or not there is moisture sticking on the seat cushion based on detection results of the dielectric sensor and the pressure sensor or detection results of the dielectric sensor and the temperature sensor.

In the case where decision is made based on the detection results of the dielectric sensor and the pressure sensor, it is possible to detect that moisture is sticking on the seat cushion when the presence of a passenger or an object is not detected from the detection result of the pressure sensor and the dielectric sensor satisfies certain conditions.

It is preferable that the passenger detecting apparatus comprises second detection means for detecting presence and a seating state of a passenger in a seat cushion; third detection means for detecting a contact state of the passenger to a back rest; angle detection means for detecting an angle defined by the seat cushion and the back rest; and decision means for determining presence/absence and a build of the passenger based on the second detection means, the third detection means and the angle detection means.

As the build of a passenger is determined not only from the seating state of the passenger on the seat cushion but also from the state of contact of the passenger to the back rest and the angle defined by the seat cushion and the back rest, the build of a passenger can be determined accurately regardless of the tilt angle of the back rest.

Therefore, when the passenger detecting apparatus is used in the seat unit of an automobile, for example, restraint systems for passenger safety, such as an air bag, and other peripheral systems of the seat can be activated properly.

When the passenger detecting apparatus is used in a passenger seat unit in a vehicle, an airplane or the like, it is possible to roughly and remotely detect the ratio of an adult, a child or the like occupying the seat unit, ensuring the use in in-vehicle (in-flight) services or the like.

It is preferable that in the passenger detecting apparatus, the second detection means has at least one of a dielectric sensor, a pressure sensor and a temperature sensor.

It is possible to precisely acquire the position of the buttocks of a passenger on a seat cushion from the end position of the output in the case of the dielectric sensor or the temperature sensor and from the peak position of the output in the case of the pressure sensor, and use it in determining the build of the passenger.

It is preferable that in the passenger detecting apparatus, the third detection means has at least one of a dielectric sensor, a pressure sensor and a temperature sensor.

A sensor of a different type from the sensor that is used as the second detection means can be used for the third detection means, and the shoulder position of a passenger at the back rest can be accurately obtained from the end position of the detection output of the sensor and can be used in determining the build of the passenger.

It is preferable that in the passenger detecting apparatus, the second detection means uses at least one of the first detection means as recited in claim 1.

By using at least one of the first detection means is used as the second detection means, it is possible to determine the presence of a passenger or an object on a seat unit, distinguish them from each other and determine the build of the passenger with fewer detection means.

It is preferable that in the passenger detecting apparatus, the pressure sensor comprises a plurality of independent pressure sensor elements arranged in the seat cushion in a matrix form, and the decision means determines whether a passenger is sitting on the seat cushion or an object is present thereon and also determines a build of the passenger if sitting on the seat cushion, based on detection results of the dielectric sensor and the pressure sensor element.

Because it is distinguished and determined whether a passenger is sitting on the seat cushion or an object is lying thereon by the combination of the pressure sensor and the dielectric sensor located in the seat cushion and the pressure sensor elements are arranged in a matrix form in the seat cushion, it is possible to accurately determine the build of a passenger only on the seat cushion side.

A passenger detecting apparatus according to this invention is characterized by comprising first detection means for detecting a distribution of a load applied to a seat cushion of a vehicle; second detection means for detecting a seat weight of a vehicle and a load applied to an entire seat; and decision means for classifying a passenger sitting on the seat based on the detection results of the first detection means and the second detection means.

From the distribution of the load applied to the seat cushion of a vehicle acquired by the first detection means, it is possible to detect if a person is seating on the seat or a child seat or an object is lying thereon, and allow the second detection means to detect the load applied the entire seat including the weight of the seat and adequately classify the weight of a passenger on the seat, and detect the case where an infant or a child is seated on the seat via a child seat.

A passenger detecting apparatus according to this invention is characterized in that decision means classifies a passenger sitting on the seat based on the detection results of first detection means for detecting if there is a child seat on a seat in a vehicle and second detection means for detecting a seat weight of a vehicle and a load applied to an entire seat.

As the first detection means detects the presence or absence of a child seat and the second detection means detects the load applied the entire seat including the weight of the seat, it is possible to adequately classify the weight of a passenger on the seat, and detect reliably, particularly, the case where an infant or a child is seated on the seat via a child seat.

A passenger detecting apparatus according to this invention is characterized by comprising load measuring means for measuring a weight of a seat on which a passenger sits and a weight of the passenger applied to the seat; barycenter position detection means for detecting a barycenter of the passenger on the seat; and weight estimation means for estimating the weight of the passenger by correcting a measured value of the load measuring means based on information from the barycenter position detection means.

Without arranging extra weight sensors around a seat, the load measuring means can measure the weight of a seat on which a passenger is seated and the weight of the passenger on the seat, and this measured value can be corrected based on information from the barycenter position detection means so that the weight of the passenger can be estimated accurately.

A passenger detecting apparatus according to this invention is characterized by comprising load measuring means for measuring a weight of a seat on which a passenger sits and a weight of the passenger applied to the seat; barycenter position detection means for detecting a barycenter of the passenger on the seat; and seating posture estimation means for estimating a seating posture of the passenger based on information from the barycenter position detection means.

It is possible to accurately estimate the seating posture of a passenger without arranging extra weight sensors around a seat.

It is preferable that in the passenger detecting apparatus, the barycenter detection means uses the load measuring means located at at least two or more different positions of the seat.

The use of the load measuring means located for the barycenter detection means eliminates the need for specially providing a sensor as the barycenter detection means, thereby reducing the number of sensors.

It is preferable that in the passenger detecting apparatus, the barycenter detection means comprises a pressure-sensitive film having a plurality of pressure-sensitive sensor elements arranged in the seat.

As the barycenter of a passenger on a seat can be detected accurately by a plurality of pressure-sensitive sensor elements provided in the pressure-sensitive film, the weight of the passenger can be estimated accurately.

It is preferable that in the passenger detecting, apparatus, the seat is movable on seat rails and the barycenter detection means also detects a barycenter of the passenger with respect to the seat rails.

As the barycenter detection means detects the barycenter of a passenger with respect to seat rails as well as the barycenter of the passenger on the seat, the front seating of the passenger can be detected reliably.

It is preferable that in the passenger detecting apparatus, the barycenter detection means has detection means for detecting a position of a head of the passenger.

By detecting the position of the passenger's head, it is possible to detect the load applied to the feet of a passenger more accurately and estimate the weight of the passenger more accurately.

It is preferable that in the passenger detecting apparatus, the barycenter detection means has detection means for detecting a width of buttocks of the passenger.

As the width of the buttocks of a passenger is statistically proportional to the weight, it is possible to reliably estimate the weight in a special case such as the weight of a child whose feet do not reach or an adult who is sitting with the feet lifted up by computing the estimated weight of the passenger from the width of the buttocks of the seated passenger, comparing it with the value of the weight that is corrected and computed by the barycenter detection means and using a lighter one.

A passenger detecting apparatus according to this invention detects a weight of a passenger who sits on a seat in a vehicle by weight detection means and acquiring secondary information about the passenger based on the detected weight information, and comprises passenger detection means for detecting if there is a passenger on the seat; acquisition means for acquiring the weight information detected by the weight detection means when the passenger detection means detects no passenger; and correction means for correcting an initial value of the weight detection means based on the weight information.

As the initial values of the individual load sensors that constitute the weight detection means are corrected based on weight information from each load sensor when the passenger detecting apparatus which constitutes the passenger detection means detects the absence of a passenger on a seat in a vehicle, the correction of the initial values of the load sensors can be carried out easily.

When there are a plurality of weight detection means, the difference between the weight detections by the individual weight detection means caused by a difference in the type of a vehicle or a difference in the attaching state can be suppressed uniformly by correcting the initial values of the corresponding weight detection means based on the weight information from the individual weight detection means.

BRIEF DESCRIPTION OF THE DRAWINGS

FIGS. 6A through 6C are diagrams for explaining (Example 1) of this invention;

DETAILED DESCRIPTION

A passenger detecting apparatus according to the first embodiment of the present invention will now be described with reference to the accompanying drawings.

Figure 1:
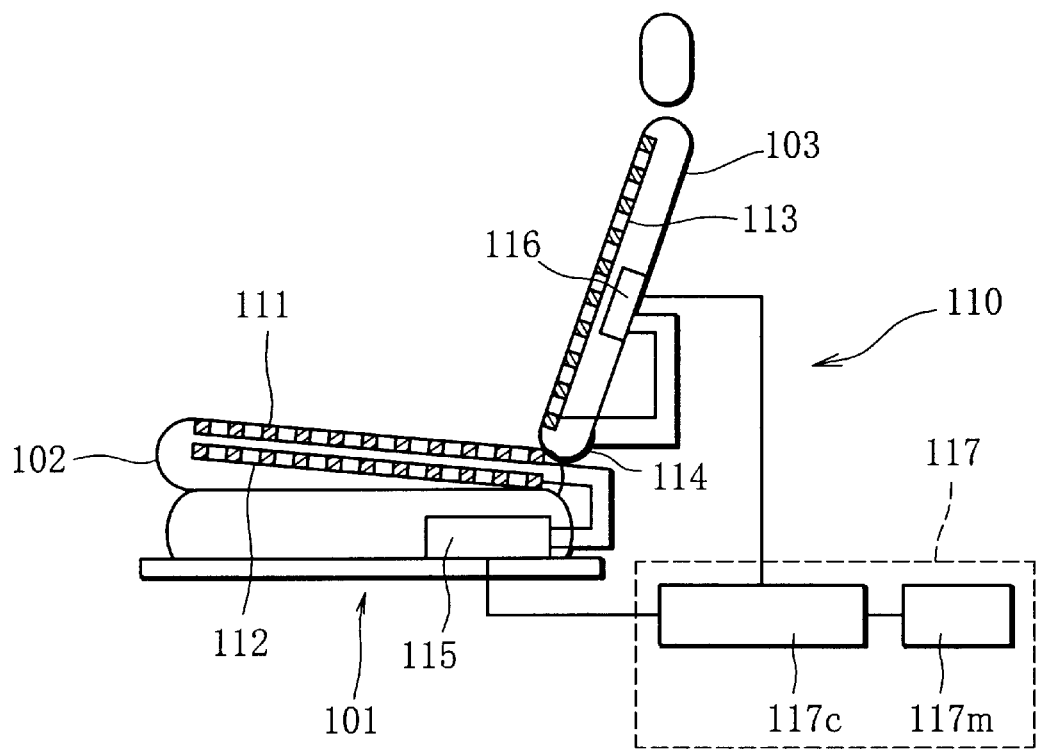
FIG. 1 is a diagram schematically showing the state where a passenger detecting apparatus according to a first embodiment of this invention is used in a seat unit.

As shown in FIG. 1, a passenger detecting apparatus 110 according to the first embodiment of this invention comprises a dielectric sensor 111 and a pressure-sensitive sensor (pressure sensor) 112, installed in a seat cushion 102, a dielectric sensor 113 installed in a back rest 103, an angle sensor 114 for measuring the angle (reclining angle) that is formed by the seat cushion 102 and the back rest 103, and a decision unit 117 which determines the presence of a passenger or an object on a seat unit and determines the build of a passenger based on the measuring results of those sensors, as shown in FIG. 1.

The measured values of the dielectric sensor 111 and the pressure-sensitive sensor 112 on the seat cushion side are subjected to signal processing by a seat-cushion side measuring unit 115 which is accommodated under the seat cushion 102 and the measured values of the dielectric sensor 113 and the angle sensor 114 on the back rest side are subjected to signal processing by a back-rest side measuring unit 116 which is housed in the back rest 103, and they are both transmitted to the decision unit 117.

The dielectric sensor 111 and the pressure-sensitive sensor 112 installed in the seat cushion 102 are intervened in a stacked state between the seat cushion and the seat fabric.

Figure 2:
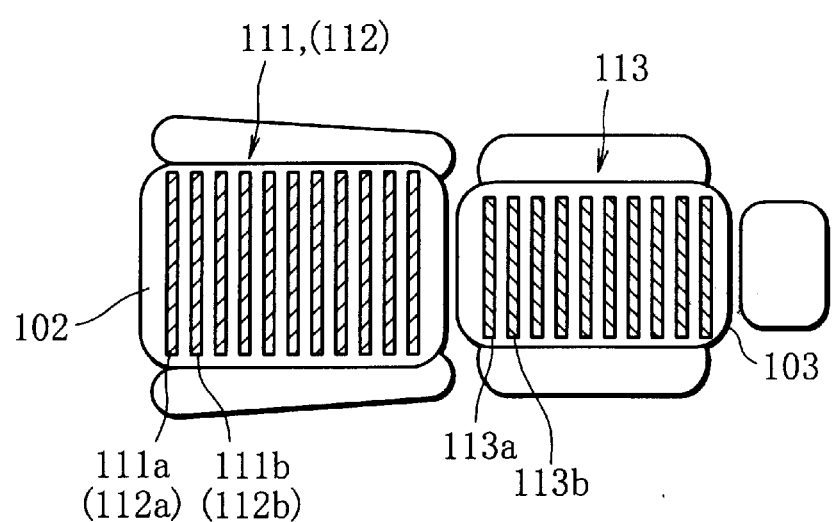
FIG. 2 is a diagram schematically depicting the seat unit in FIG. 1 in a reclined state.

The dielectric sensor 111 detects the presence or absence of a passenger by using the phenomenon that the output current of radiated waves changes according to the presence/absence of a dielectric substance, and comprises a plurality of dielectric sensor elements 111a, 111b, . . . arranged independently and in parallel from the front of the seat cushion 102 toward the rear, as shown in FIG. 2. The dielectric sensor elements 111a, 111b, . . . are comprised of a combination of transmission antennae and reception antennae, and transmit a high-frequency wave from each transmission antenna and detects a current produced in each reception antenna. The currents detected by the individual elements 111a, 111b, . . . are associated with the layout positions of the individual elements 111a, 111b, . . . in the decision unit 117 to obtain the range where the passenger's buttocks lie, and the seating position (seating state) of the passenger on the seat cushion 102 is determined.

That is, an output current I of each of the dielectric sensor elements 111a, 111b, . . . is compared with a predetermined threshold value, the rear-end position of the passenger's buttocks on the seat cushion 102 is acquired from the layout positions of the individual elements 111a, 111b, . . . and the seating position of the passenger is determined from this rear-end position.

The pressure-sensitive sensor 112 located under the dielectric sensor 111 is formed by printing conductive ink, to which conductive particles, such as carbon powder, silver powder or copper powder are added, on a PET film by known printing means and detects the presence of a passenger or an object on the seat cushion 102 by using the phenomenon that a contact resistance changes in accordance with the pressing force.

As shown in FIG. 2, this pressure-sensitive sensor 112, like the dielectric sensor 111, comprises a plurality of independent pressure-sensitive sensor elements 112a, 112b, . . . arranged in the front-rear direction in the seat cushion 102. Voltage values according to the pressures for the individual pressure-sensitive sensor elements 112a, 112b, . . . are detected, the detection results are subjected to signal processing in the seat-cushion side measuring unit 115, the peak value of an output voltage P is acquired in the decision unit 117, and the center position (ischial tuberculum position) of the buttocks of the passenger on the seat cushion 102 is acquired from the layout position of the pressure-sensitive sensor element that has produced this peak value.

For the pressure-sensitive sensor 112, a device using a pressure-sensitive rubber or a load cell may be used instead of the pressure-sensitive ink. Because the detection principles of the dielectric sensor 111 and the pressure-sensitive sensor 112 are quite different from each other as mentioned above, both sensors, even arranged in the seat cushion 102 in a stacked state, do not adversely affect each other with respect to the output characteristics.

A temperature sensor may be used in place of the pressure-sensitive sensor 112 to detect the seating state. That is, a plurality of elements which detect a change in temperature may be arranged in the front-rear direction in the seat cushion, so that the rear-end position of, for example, the buttocks is detected from a difference in temperature between the portion where the passenger's buttocks contact and the portion where they do not, and the seating state of the passenger is determined based on the position.

The dielectric sensor 113 installed in the back rest 103 uses a dielectric sensor similar to the dielectric sensor 111 installed in the seat cushion 102. This dielectric sensor 113, as schematically illustrated in FIG. 2, is constructed by arranging dielectric sensor elements 113a, 113b, ..., which are comprised of a combination of transmission antennae and reception antennae, at the back of the fabric in the up-down direction of the back rest 103 in parallel to one another.

The output currents from the individual dielectric sensor elements 113a, 113b, ... are subjected to signal processing by the back-rest side measuring unit 116 as in the seat-cushion side measuring unit 115 and the area where the back of the passenger contacts the back rest 103 is acquired by the decision unit 117. Then, the topmost position of this area is determined as the shoulder position of the passenger.

Instead of arranging the dielectric sensor 113 in the back rest 103, the pressure-sensitive sensor 112 as used in the seat cushion 102 may be arranged to detect the contact state of the passenger to the back rest 103, or a temperature sensor may be arranged to detect the contact state of the passenger to the back rest 103. That is, it is possible to acquire the area where the back of a passenger is in contact with the back rest 103 by detecting a change in the contact pressure of the passenger to the back rest 103 or a change in the temperature of the contact portion is detected from a plurality of pressure-sensitive sensor elements or a plurality of temperature sensor elements arranged in the back rest 103.

Because the back of the passenger does not closely contact the seat unit 101, however, it is preferable to use the dielectric sensor 113 that can surely detect the presence of a human body even in the case where the human body merely contacts the sensor. Even when the passenger takes a posture of having the upper half body set in a slightly upright state, therefore, the contact area of the back rest can be acquired more accurately.

The angle sensor 114 which measures the angle defined by the seat cushion 102 and the back rest 103 is comprised of a tilt angle measuring unit attached to the rotary portion of the back rest 103 as schematically illustrated in FIG. 1.

In the case where seat reclining is carried out by an electric motor as in a power adjustable seat unit, the tilt angle of the back rest 103 may be acquired by using the output of the encoder of the electric motor. When the backward and forward inclination of the seat cushion 102 is adjustable, a tilt angle measuring unit may be installed in the seat cushion 102 as in the back rest 103, so that the angle defined by the seat cushion 102 and the back rest 103 is computed by the back-rest side measuring unit 116 based on the outputs from both tilt angle measuring units.

The outputs of the dielectric sensor 111 and the pressure-sensitive sensor 112 arranged in the above-described manner on the seat cushion side are used to determine the presence/absence of a passenger or an object and acquire the positional information of the buttocks of the passenger if the passenger is seated in the decision unit 117.

When moisture is sticking on the fabric of the seat cushion 102, the dielectric sensor 111 responds and the pressure-sensitive sensor 112 does not, so that the decision unit 117 can determine that moisture is sticking on the seat cushion 102.

The output of the dielectric sensor 113 on the back rest side is used to acquire the shoulder positional information of a passenger in the decision unit 117 and the output of the angle sensor 114 is also sent to the decision unit 117 via the back-rest side measuring unit 116.

The decision unit 117, which comprises a processing unit (CPU) 117c and a memory 117m, determines if a passenger or an object is on the seat cushion 102 and if moisture is thereon and determines the build of a passenger when seated on the seat unit 101, based on before mentioned detection signals.

The decision procedures will be described below based on the flowcharts in FIGS. 3 and 4.

At the same time as the decision flow starts, measurement by the seat-cushion side pressure-sensitive sensor 112 is performed (step S101) followed by measurement by the seat-cushion side dielectric sensor 111 (step S102). Subsequently, it is determined if there is a detection signal of the seat-cushion side pressure-sensitive sensor 112 (step S103), and if there is no detection signal of the seat-cushion side pressure-sensitive sensor 112, it is determined if there is a detection signal of the seat-cushion side dielectric sensor 111 (step S104). If there is no detection signal of the seat-cushion side dielectric sensor 111, both the seat-cushion side pressure-sensitive sensor 112 and seat-cushion side dielectric sensor 111 have not responded so that it is determined that neither a person nor an object is on the seat cushion 102 and the seat is vacant (step S105). When there is the detection signal of the seat-cushion side dielectric sensor 111, nothing is on the seat cushion 102 but a dielectric substance exists, so that it is determined that the seat is wet though vacant (step S106). There may be a case where seats are wetted due to shower or squall in an open car or the like, so that the provision of this decision routine is very significant.

When there is the detection signal of the seat-cushion side pressure-sensitive sensor 112, it is determined if there is the detection signal of the seat-cushion side dielectric sensor 111 (step S111). If the detection signal of the seat-cushion side dielectric sensor 111 is not present, it is determined that a child seat (CSR) which is a non-dielectric substance, or a luggage or the like is lying on the seat cushion 102 (step S112). When the detection signal of the seat-cushion side dielectric sensor 111 is present, it is determined if an area where the pressure-sensitive sensor signal is present is identical to an area where the dielectric sensor signal is present (step S113). As a plurality of pressure-sensitive sensor elements 112a, 112b, ... and dielectric sensor elements 111a, 111b, ... are arranged in the seat cushion 102 in a stacked manner as mentioned above, it is possible to accurately detect and compare the sensor output areas in the seat cushion 102.

When it is determined in step S113 that both areas are not identical or do not coincide with each other, it is possible that, for example, the hands or legs of a child who is sitting on a child seat are in contact with the seat cushion 102, so that it is determined that a child seat (CSR) or the like is on the seat cushion 102 (step S114).

When it is determined in step S113 that both areas are identical, it is determined that a passenger is sitting on the seat cushion 102 (step S115), and the position of the buttocks on the seat cushion 102 is detected (step S116). This seat-cushion buttock position may be acquired by using the detection end position of the seat-cushion side dielectric sensor 111 or by using the peak position of the detection signal from the seat-cushion side pressure-sensitive sensor 112.

Subsequently, measurement by the back-rest side dielectric sensor 113 is carried out (step S117) and the shoulder position of the back rest is detected from this measuring result (step S118). As a plurality of dielectric sensor elements 113a, 113b, . . . are arranged in the up-down direction in the back rest 103 in parallel to one another as mentioned above, this shoulder position can be acquired based on the output end positions of those elements 113a, 113b, . . .

Next, the reclining angle is measured by the angle sensor 114 (step S119), and the size of the upper body of the passenger is computed from the buttock position in step S116, the back-rest shoulder position in step S118 and the reclining (tilt) angle of the back rest 103 (step S120) and the build of the passenger is determined (step S121).

The more forward is the buttock position located in relation to the seat cushion 102, the higher is the shoulder position located up the back rest 103 and the greater is the reclining angle of the back rest 103, it is determined in this step S120 that the size of the upper body is greater and it is determined in step S121 that the build of the passenger is larger. When the buttock position is located deep in the seat cushion 102, the shoulder position is at the lower portion of the back rest 103 and the reclining angle of the back rest 103 is not so large, it is determined that a child is seated on the seat unit 101, while when the buttock position is at a front portion of the seat cushion 102, the shoulder position is at the upper portion of the back rest 103 and the reclining angle of the back rest 103 is large, it is determined that an adult of a standard size is seated on the seat unit 101. When they are in middle, it is determined that an adult of small build is seated on the seat unit 101.

Based on the above decision results, restraint systems for securing passenger safety, such as an air bag, can be activated properly.

Specifically, for example, it is possible to change the air-bag inflation speed is changed or not to inflate the air bag in accordance with the build of the seated person. That is, when it is determined that an adult of small build is seated, the air bag is inflated more slowly than that in the case where it is determined that an adult of a standard size is seated, and when it is determined that a child is seated, the air bag is not inflated, thus preventing a woman of small build or a child from being injured by the air bag when it is activated.

Further, if the passenger detecting apparatus 110 is installed in every passenger seat unit in a vehicle, an airplane or the like and the aforementioned decision is made by each passenger detecting apparatus 110, it is possible to not only determine the vacancy of each seat unit and the presence/absence of a luggage or the like occupying each seat unit but also roughly and remotely grasp the ratio of adults, children or the like in passengers seated on the individual seat units. This can be helpful in in-vehicle (in-flight) services or the like.

Figure 5:
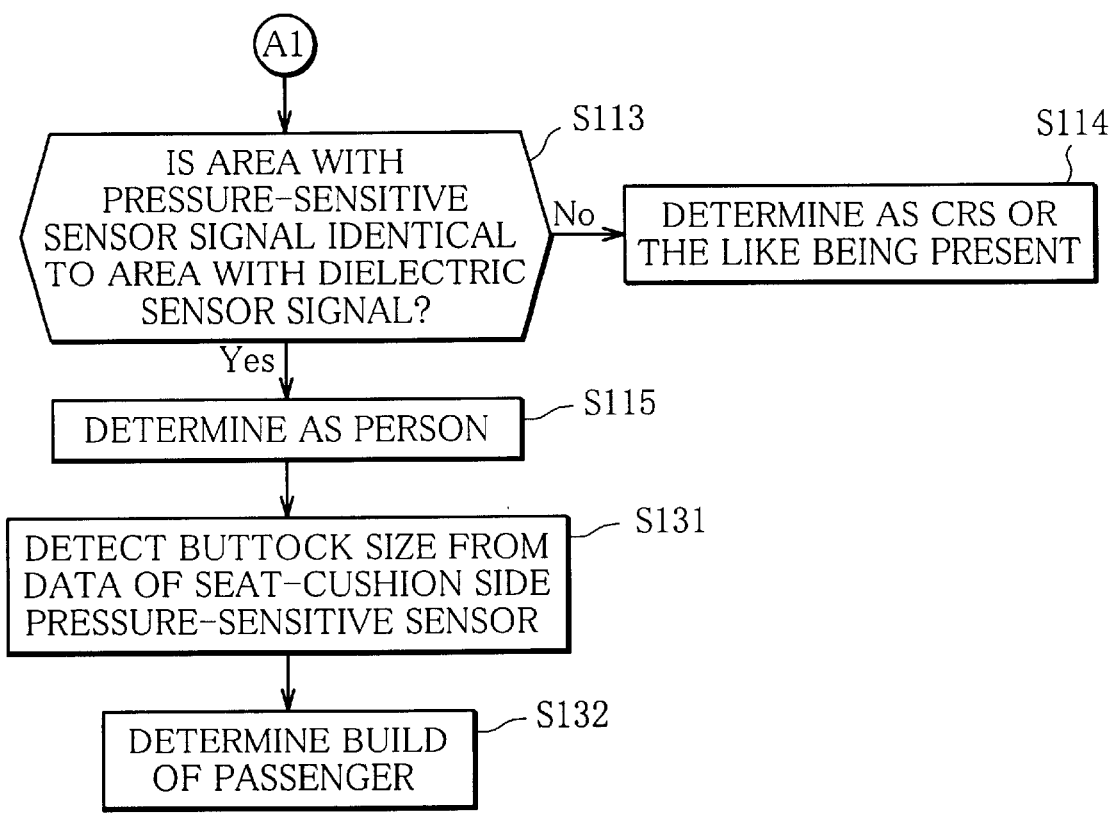
FIG. 5 is a flowchart illustrating procedures according to another embodiment different from the flowchart in FIG. 4.

Part of the decision flow according to the above-described embodiment may be replaced with a decision flow shown in FIG. 5 to determine the build of the passenger.

In executing the decision flow shown in FIG. 5, it is required that at least part of the pressure-sensitive sensor 122 located on the seat cushion side has pressure-sensitive sensor elements arranged in an m×n matrix form as shown in FIG. 10 so that when a passenger is seated, the seating state not only in the front-rear direction of the seat cushion 102 but also the widthwise direction can be detected.

Figure 3:
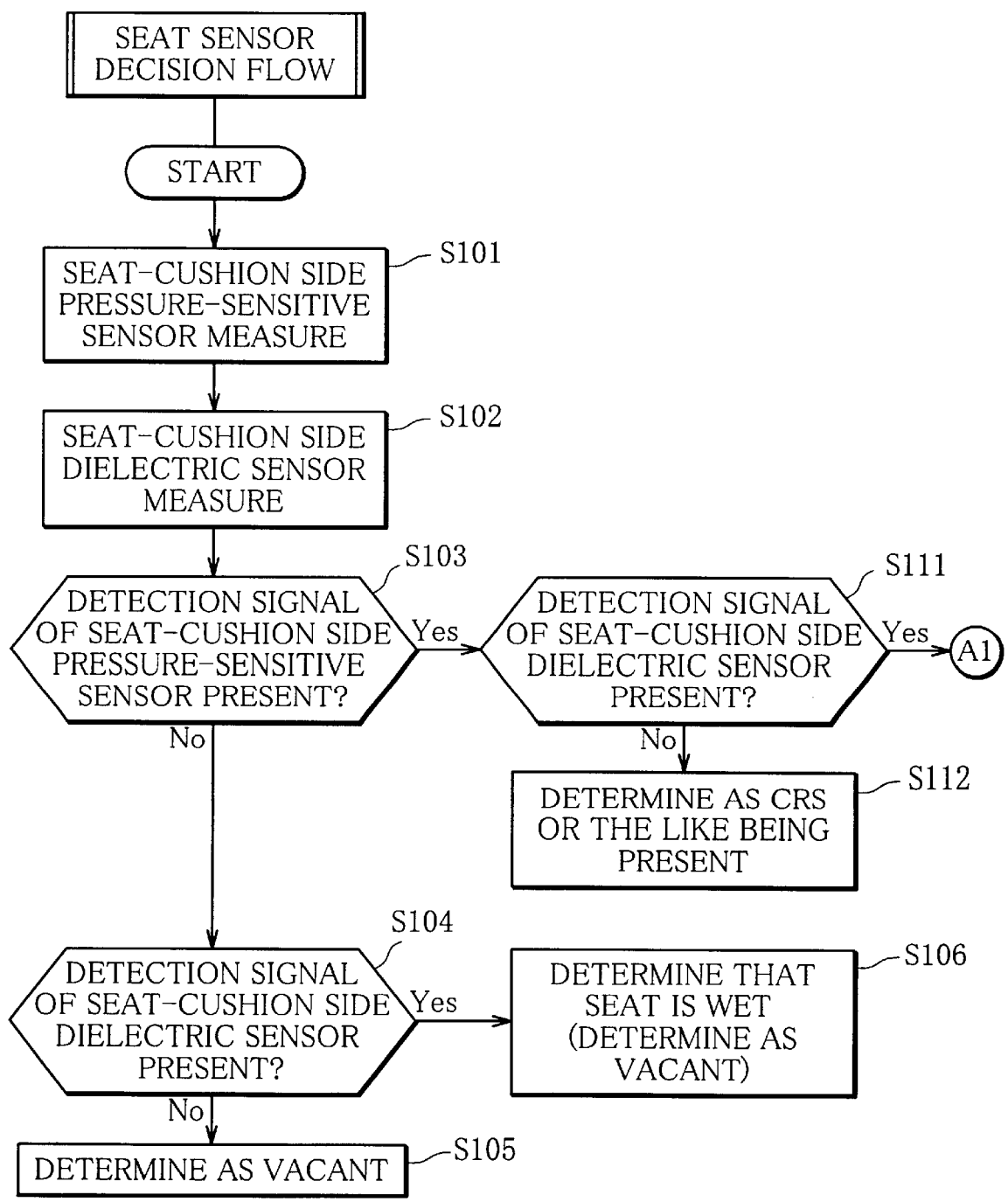
FIG. 3 is a flowchart for explaining procedures of determining the presence of a passenger or an object on a seat unit and the build of the passenger by using the passenger detecting apparatus according to the first embodiment of this invention.
Figure 4:
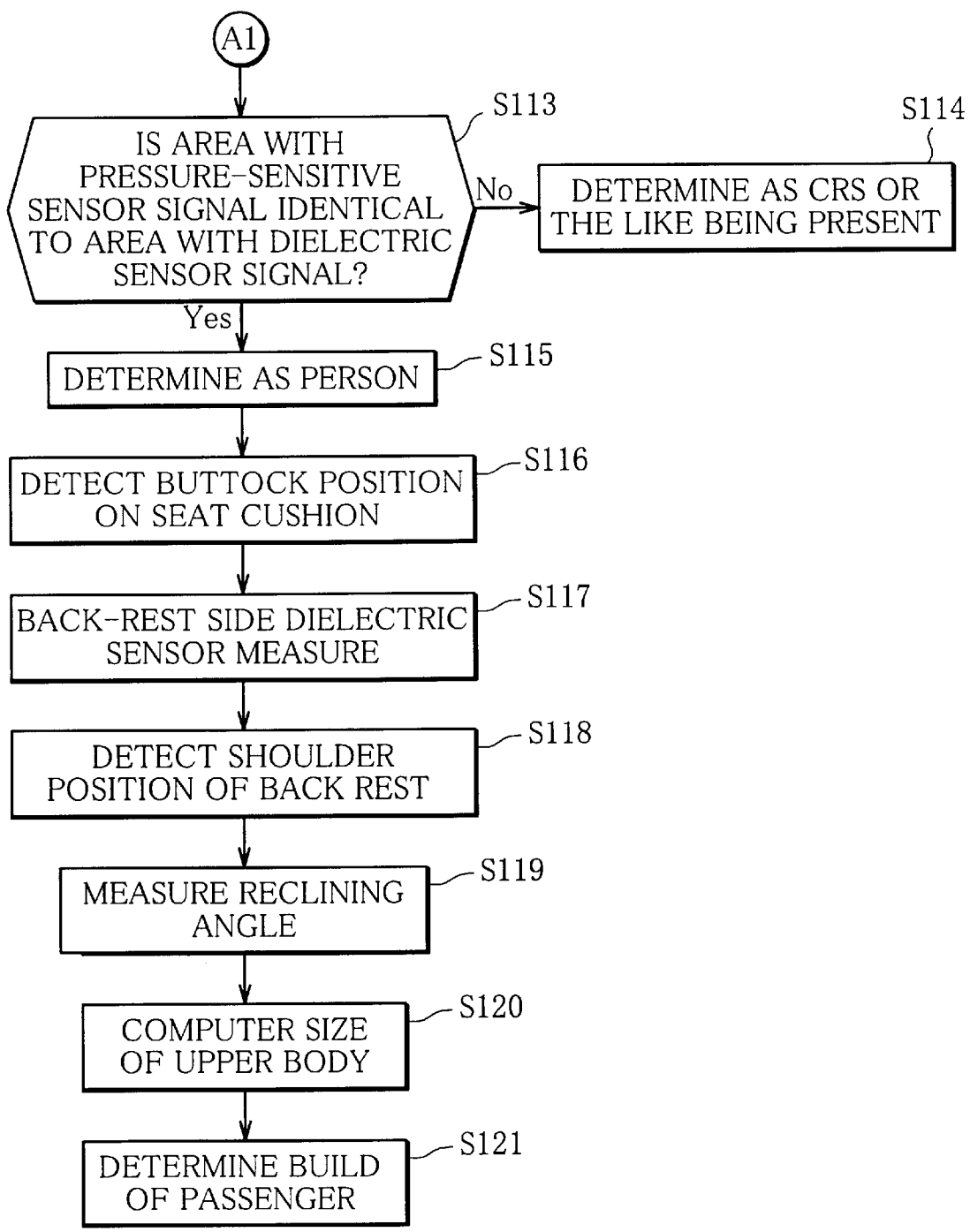
FIG. 4 is a flowchart illustrating procedures continuing from FIG. 3.

According to the decision flow shown in FIG. 5, the same decision routine as performed in the above-described embodiment until the decision flow illustrated in step S115 in FIGS. 2 and 3, and when it is determined in step S115 that a passenger is seated on the seat unit 101, the range where the passenger's buttocks are located is detected in the widthwise direction of the seat cushion 102 as well as in the front-rear direction. The size of the passenger's buttocks is detected from the number and layout positions of the matrix sensor elements detected (step S131) and the build of the passenger is determined from the size of the buttocks (step S132).

It is therefore possible to accurately detect the case where a child is seated sideways as described in Example 5 to be discussed later, the state where an adult is seated sideways with the back rest reclined or the like, and this decision information can be used in the proper operations of the peripheral systems of the seat unit.

The decision results of the passenger detecting apparatus 110 according to this invention are not limited to the use in the adequate activation of the restraint systems for securing passenger safety, detection of vacant seats or the like, but may be used in automatically cutting off the power when there is no person using, for example, a home massaging machine, automatic selection of the optimal massage menu according to the build of the user and so forth.

When the passenger detecting apparatus 110 according to this invention is used in a seat unit of a vehicle, various motors for controlling the seat posture, such as a slide motor, front and rear vertical motors, vertical head-rest moving motor, and a lumbar support motor, may be controlled in accordance with the build of the passenger to automatically adjust it to the optimal seating posture, or to automatically adjust other peripheral systems of the seat unit, such as a room mirror and door mirrors, in accordance with the build of the passenger (driver).

EXAMPLE 1

With the structure of the passenger detecting apparatus 110 shown in FIG. 1, when the outputs of the pressure-sensitive sensor 112 and the dielectric sensor 111 of the seat cushion 102 were measured in each of the case where a female adult of small build was seated (FIG. 6A), the case where a child seat was placed on the seat cushion 102 (FIG. 6B) and the case where the seat cushion 102 was wet with moisture (FIG. 6C), the sensor output characteristics respectively shown in FIG. 6 could be measured (the relationship between pressure P and the detection position in the upper part is the output characteristics by the pressure-sensitive sensor 112, and the relationship between current I and the detection position in the lower part is the output characteristics by the dielectric sensor 111). Based on the detection results, it was possible to determine the state where a child seat was placed in FIG. 6B from step S103, step S111 and step S112 of the passenger detection decision flow, to determine the state where the seat cushion 102 was wetted with moisture in FIG. 6C from step S103, step S104 and step S106 and to easily determine the state where an adult of small build was seated from step S103, step S111, step S113 and step S115 to step S121.

EXAMPLE 2

Figure 7A:
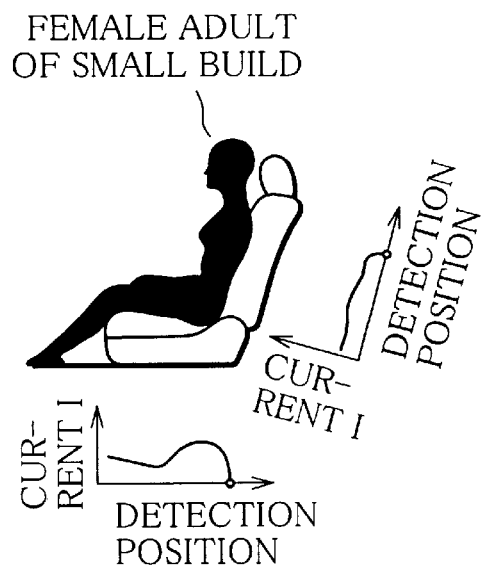
FIGS. 7A and 7B are diagrams for explaining (Example 2) of this invention.
Figure 7B:
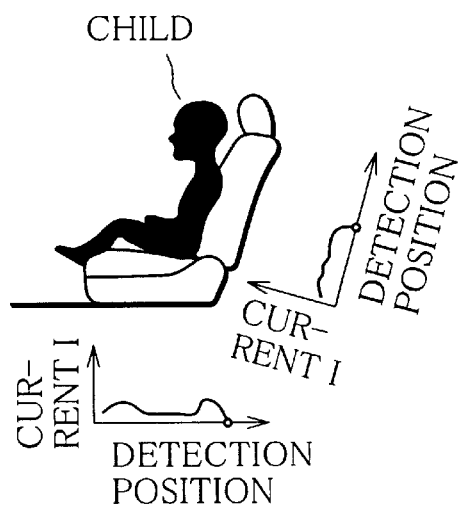

Likewise, with the structure of the passenger detecting apparatus 110 shown in FIG. 1, the outputs of the dielectric sensor 111 of the seat cushion 102 and the dielectric sensor 113 of the back rest 103 were measured in each of the case where a female adult of small build was seated (FIG. 7A) and the case where a child was seated (FIG. 7B) and the sensor output characteristics respectively shown in FIG. 7 could be measured (the relationships between the current I of the dielectric sensor and the detection position on the seat cushion side and the back rest side are respectively shown). As the end portions of the output current I (the white-dot portions in the diagrams) were acquired respectively as the buttocks and shoulder of the passenger, it was detected that the buttocks of a female adult of small build were located slightly further forward in relation to the seat cushion 102 than the buttocks of a child and the shoulder of a female adult of small build were located higher on the back rest 103 than the shoulder of a child. Based on those detection results, it was possible to easily determine that an adult of small build was seated in the case of FIG. 7A and that a child was seated in the case of FIG. 7B through step S119 to step S121 of the passenger detection decision flow.

EXAMPLE 3

Figure 8A:
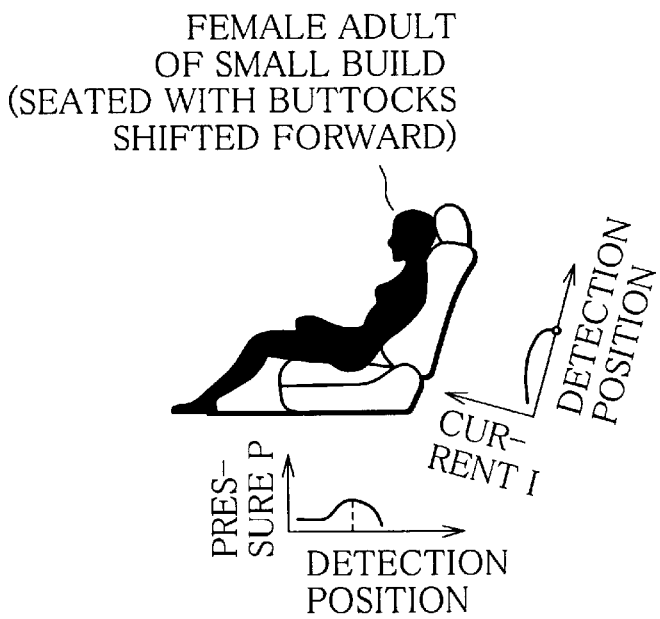
FIGS. 8A and 8B are diagrams for explaining (Example 3) of this invention.
Figure 8B:
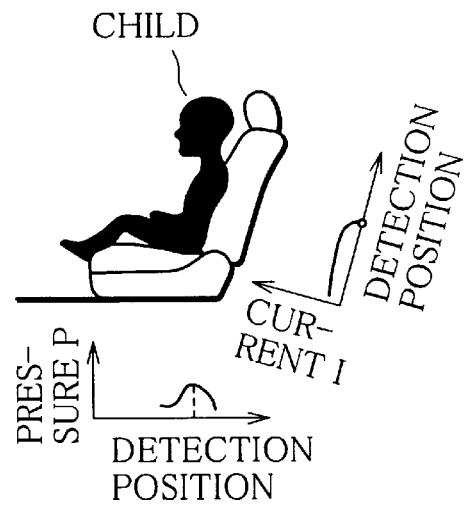

Likewise, with the structure of the passenger detecting apparatus 110 shown in FIG. 1, the outputs of the pressure-sensitive sensor 112 of the seat cushion 102 and the dielectric sensor 113 of the back rest 103 were measured in each of the case where a female adult of small build was seated with the buttocks shifted frontward (FIG. 8A) and the case where a child was seated (FIG. 8B) and the sensor output characteristics respectively shown in FIG. 8 could be measured (the relationship between the pressure P and the detection position on the seat cushion side is the output characteristics by the pressure-sensitive sensor 112, and the relationship between the current I and the detection position on the seat cushion side is the output characteristics by the dielectric sensor 113). Although the end portions of the output current I of the dielectric sensor 113 indicating the position of the shoulder of the passenger (the white-dot portions in the diagrams) were both detected to be substantially coincide with each other, the peak position of the output voltage P of the pressure-sensitive sensor 112 indicating the position of the passenger's buttocks for a female adult of small build was detected to be considerably forward in relation to the seat cushion 102 as compared with the case of a child. Based on those detection results, it was possible to easily determine that an adult of small build was seated in the case of FIG. 8A and that a child was seated in the case of FIG. 8B through step S119 to step S121 of the passenger detection decision flow.

EXAMPLE 4

Figure 9A:
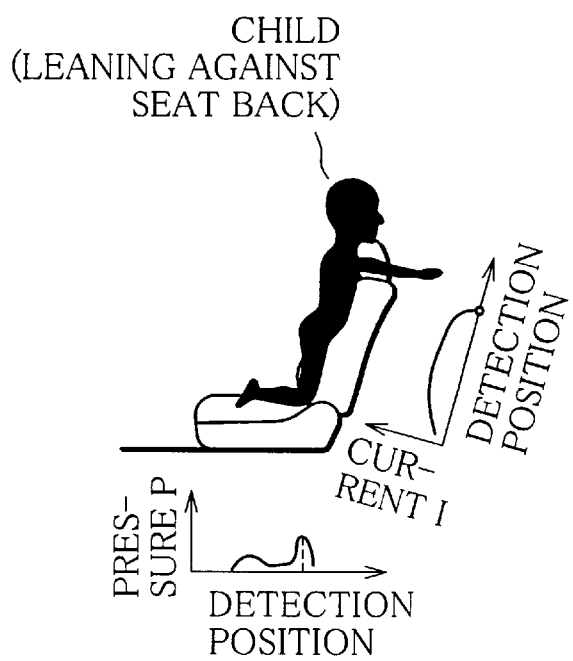
FIGS. 9A and 9B are diagrams for explaining (Example 4) of this invention.
Figure 9B:
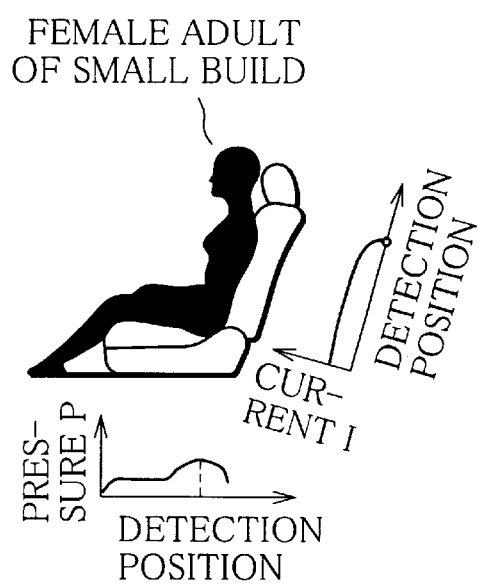

Likewise, with the structure of the passenger detecting apparatus 110 shown in FIG. 1, the outputs of the pressure-sensitive sensor 112 of the seat cushion 102 and the dielectric sensor 113 of the back rest 103 were measured in the state where a child was leaning against the back rest 103 (FIG. 9A) and the case where a female adult of small build was seated (FIG. 9B) and the sensor output characteristics respectively shown in FIGS. 9A and 9B could be measured (the relationships between the pressure P and the detection position on the seat cushion side is the output characteristics by the pressure-sensitive sensor 112 and the relationships between the current I and the detection position on the seat cushion side is the output characteristics by the dielectric sensor 113).

Although the end portions of the output current I of the dielectric sensor 113 indicating the position of the passenger's shoulder (the white-dot portions in the diagrams) were detected slightly higher than the seat cushion 103 for the case of a child than for the case of a female adult of small build, the peak position of the output voltage P of the pressure-sensitive sensor 112 indicating the position of the passenger's buttocks was detected at a deeper portion on the seat cushion 102 for the case of a child than for a female adult of small build. Based on those detection results, it was possible to determine that a child was seated in the case of FIG. 9A and that an adult of small build was seated in the case of FIG. 9B through step S119 to step S121 of the passenger detection decision flow.

EXAMPLE 5

Figure 10A:
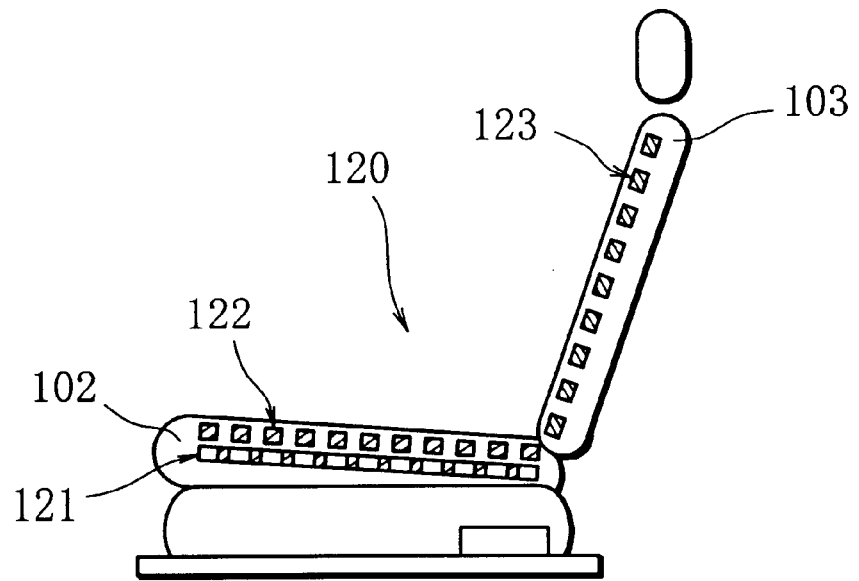
FIGS. 10A and 10B are diagrams for explaining the structure of a passenger detecting apparatus used in (Example 5) of this invention.
Figure 10B:
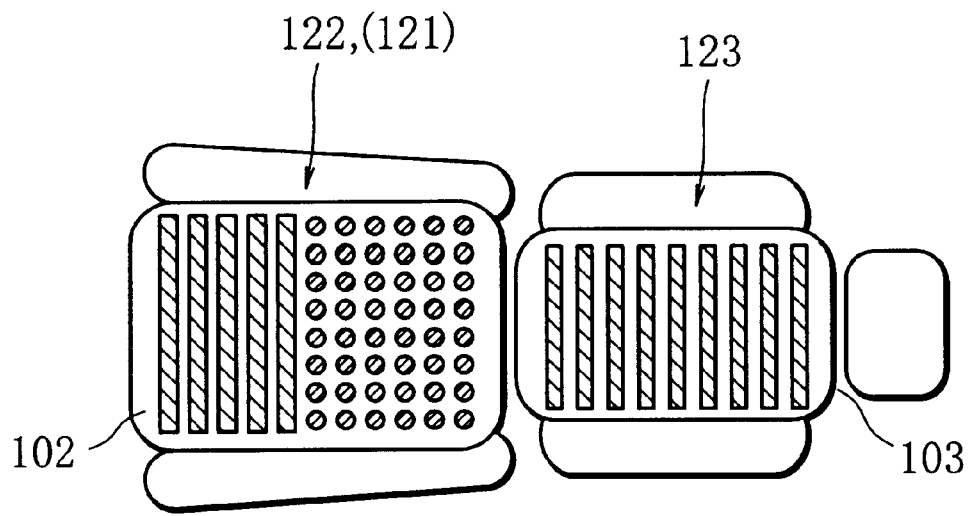

A pressure-sensitive sensor 122 of the seat cushion 102 used in this embodiment had five belt-like pressure-sensitive sensors arranged in parallel at the front portion of the seat cushion and had 6×8 spot-like pressure-sensitive sensors arranged in a matrix form at a rear portion of the seat cushion as shown in FIGS. 10A and 10B. For a dielectric sensor 121 of the seat cushion 102, a dielectric sensor 123 of the back rest 103 and a tilt angle sensor (not shown), sensors which have the same structures as those shown in FIG. 1 were used.

Figure 11A:
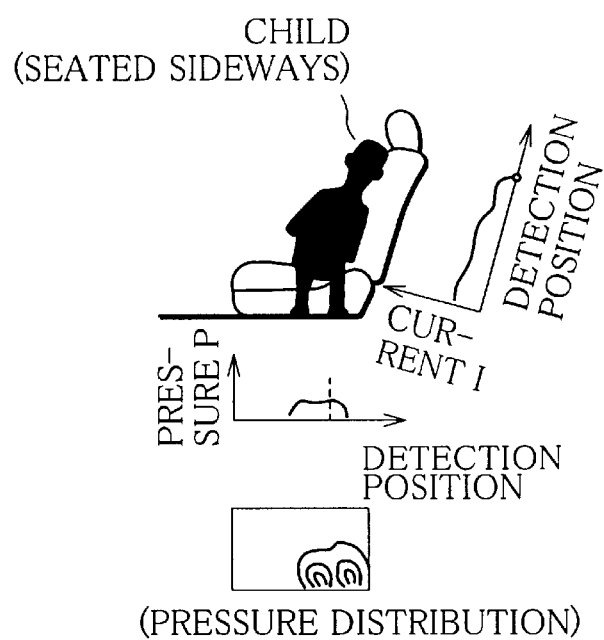
FIGS. 11A and 11B are diagrams for explaining (Example 5) of this invention.
Figure 11B:
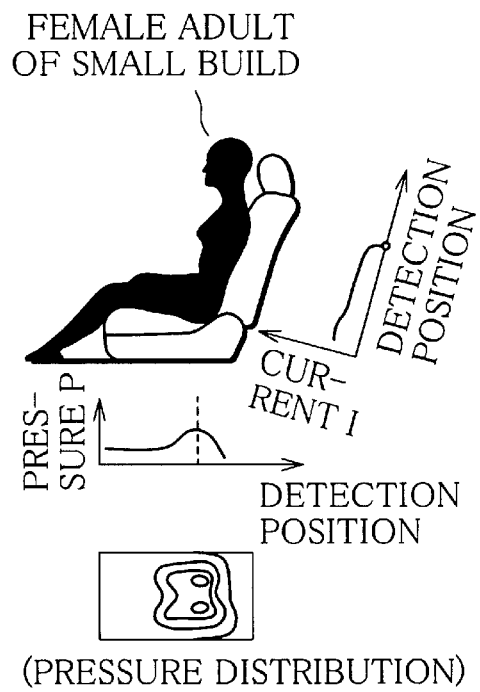

Using this passenger detecting apparatus 120, the outputs of the pressure-sensitive sensor 122 of the seat cushion 102 and the dielectric sensor 123 of the back rest 103 were measured in the state where a child was seated sideways (FIG. 11A) and the case where a woman of small build was seated (FIG. 11B), and the sensor output characteristics respectively shown in FIGS. 11A and 11B could be measured (the relationships between the pressure P and the detection position on the seat cushion side is the output characteristics by the pressure-sensitive sensor 122, below which the pressure distribution of the seat cushion is illustrated, and the relationships between the current I and the detection position on the seat cushion side is the output characteristics by the dielectric sensor 123).

It was possible to easily acquire the size of the passenger's buttocks occupying the seat cushion from the pressure distribution of the spot-like pressure-sensitive sensors arranged in a matrix form. Through step S131 and step S132 shown in FIG. 5, therefore, it was possible to easily determine that a child is seated in the case of FIG. 11A and that an adult of small build is seated in the case of FIG. 11B.

That is, according to this embodiment, specifically designing the structure of the sensors arranged in the seat cushion 102 could make it possible to determine the presence/absence of a passenger or an object on the seat cushion 102 and the build of the passenger.

The above results of the embodiment showed that the use of the passenger detecting apparatus 110 according to this invention made it possible to discriminate the case where a child seat or the like was placed on the seat cushion 102 and the case where moisture was sticking thereon, and easily determine whether an adult of small build is seated besides an adult of a standard size, so that, for example, the air-bag inflation speed could be slowed or the air-bag inflation could be stopped in accordance with the build of the passenger.

A description will now be given of a passenger detecting apparatus according to the second embodiment of this invention with reference to the accompanying drawings.

Figure 12:
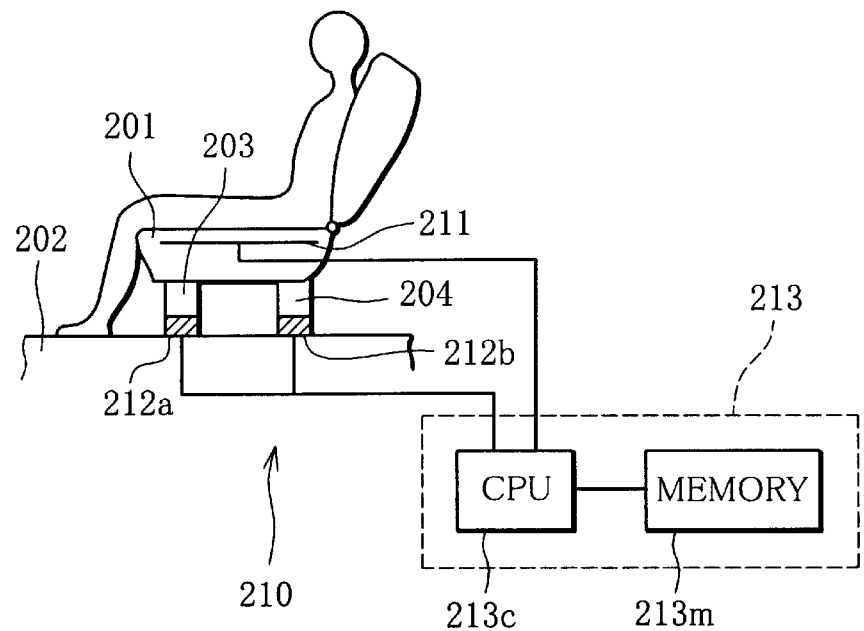
FIG. 12 is a diagram schematically showing a passenger detecting apparatus according to a second embodiment of this invention.

As shown in FIG. 12, a passenger detecting apparatus 210 according to the second embodiment of this invention comprises a seat-cushion pressure-sensitive sensor (first detection means) 211 for detecting the distribution of the load that is applied to a seat cushion 201 of a vehicle, load sensors (second detection means) 212a and 212b for detecting the weight of the seat of the vehicle and the load that is applied to the entire seat, and a processing section 213 for classifying a passenger seated on the seat based on the detection results of the seat-cushion pressure-sensitive sensor 211 and the load sensors 212.

Figure 13:
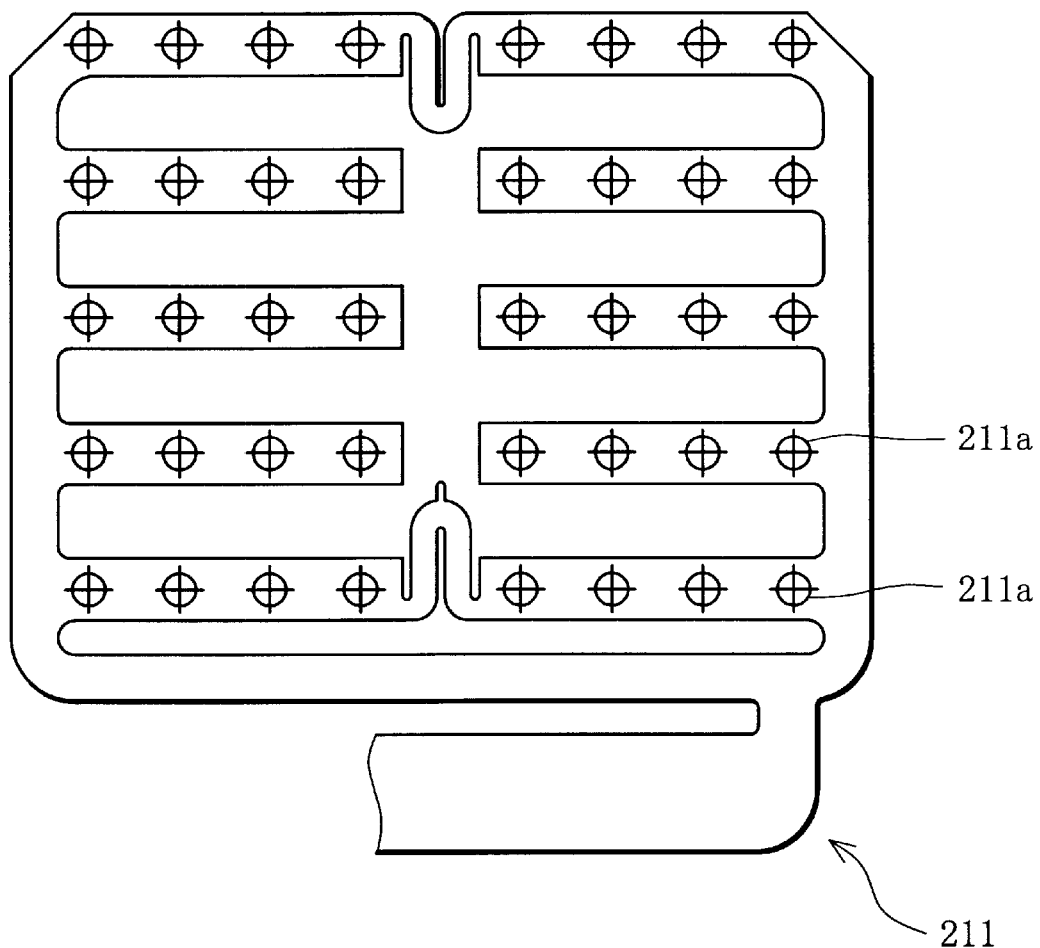
FIG. 13 is a diagram partially illustrating a seat-cushion pressure-sensitive sensor which is used in the passenger detecting apparatus in FIG. 12.

A film-like pressure sensor is used for the seat-cushion pressure-sensitive sensor 211. As shown in FIG. 13, the film-like pressure sensor has a plurality of pressure-sensitive sensor elements 211a laid in a sheet form and is located in the vicinity of the fabric of the seat cushion 201 so that it easily receives the load from a passenger.

Figure 14:
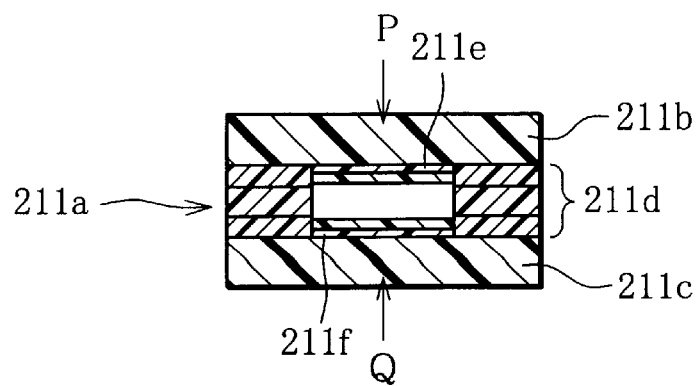
FIG. 14 is a cross-sectional view of sensor elements which constitutes the seat-cushion pressure-sensitive sensor in FIG. 13.

As shown in FIG. 14, the pressure-sensitive sensor element 211a has an insulating layer 211d formed of an adhesive layer of a predetermined thickness sandwiched by insulating plastic films 211b and 211c of PET or the like. Conductive layers 211e and 211f which have metal foils of a predetermined shape adhered or conductive paint printed in a predetermined shape into a circuit pattern are adhered onto the insulating plastic films 211b and 211c in such a way as to face each other at a given distance. As pressure is applied to the pressure-sensitive sensor element 211a from the directions of arrows P and Q, the conductive layers 211e and 211f contact each other and this contact is electrically detected to detect the pressure applied to the pressure-sensitive sensor element 211a.

As such pressure-sensitive sensor elements 211a are arranged in a matrix form as partially shown in FIG. 13, it is possible to detect the area of the buttocks of the passenger seated on the seat cushion 201, the area of a child seat in contact with the seat cushion 201 or the area of a luggage in contact with the seat cushion 201 from the outputs of the individual pressure-sensitive sensor elements 211a of the seat-cushion pressure-sensitive sensor 211.

Electric capacitance type pressure sensors are used for the load sensors 212a and 212b. As shown in FIG. 12, the load sensors 212a and 212b are placed under support portions 203 and 204 for supporting the entire seat on a floor 202, so that the individual load sensors 212a and 212b measure the weight of the seat acting on the respective support portions and the weight of the passenger acting on the entire seat and send the output signals to the processing section 213. Note that distortion gauges may be used to measure the load in place of the electric capacitance type pressure sensors.

The processing section 213 has a CPU 213c and memory 213m. Based on the detection results of the seat-cushion pressure-sensitive sensor 211, the CPU 213c determines whether a passenger is seated, a child seat is placed or a luggage is lying on the seat cushion 201, determines if there is a change in the detection area of the seat-cushion pressure-sensitive sensor 211, i.e., if the barycenter of the passenger is shifted on the seat, and performs classification of each weight of the passengers on the seat. The memory 213m stores a threshold value pattern for determining the presence/absence of a passenger on the seat, the presence/absence of a child seat, the presence/absence of a luggage and so forth based on the detection results of the seat-cushion pressure-sensitive sensor 211, and is storing threshold values or the like for allowing the CPU 213c to execute classification of each weight of the passengers on the seat.

Figure 15:
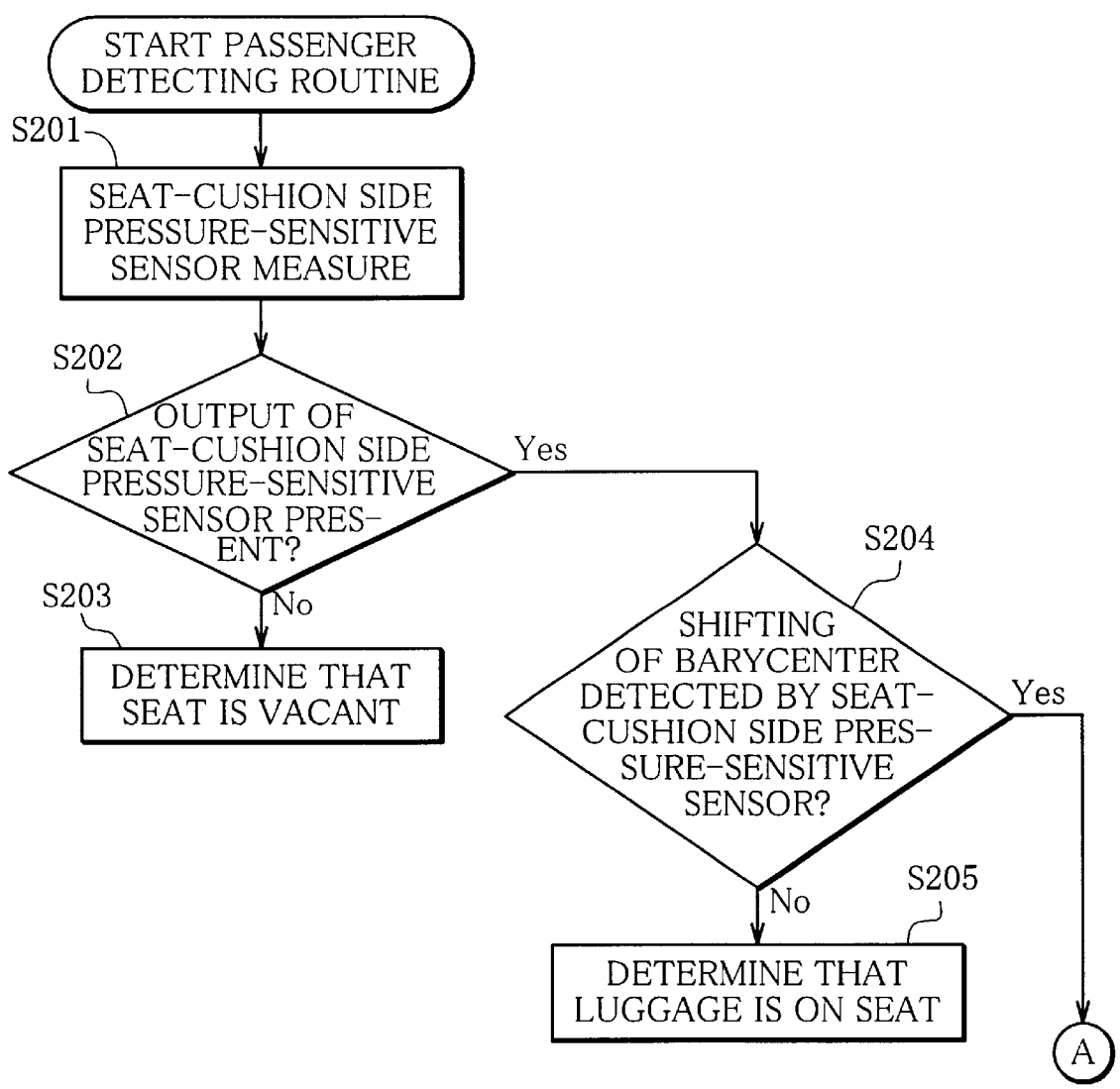
FIG. 15 is a diagram illustrating a decision flow of the passenger detecting apparatus according to the second embodiment of this invention.
Figure 16:
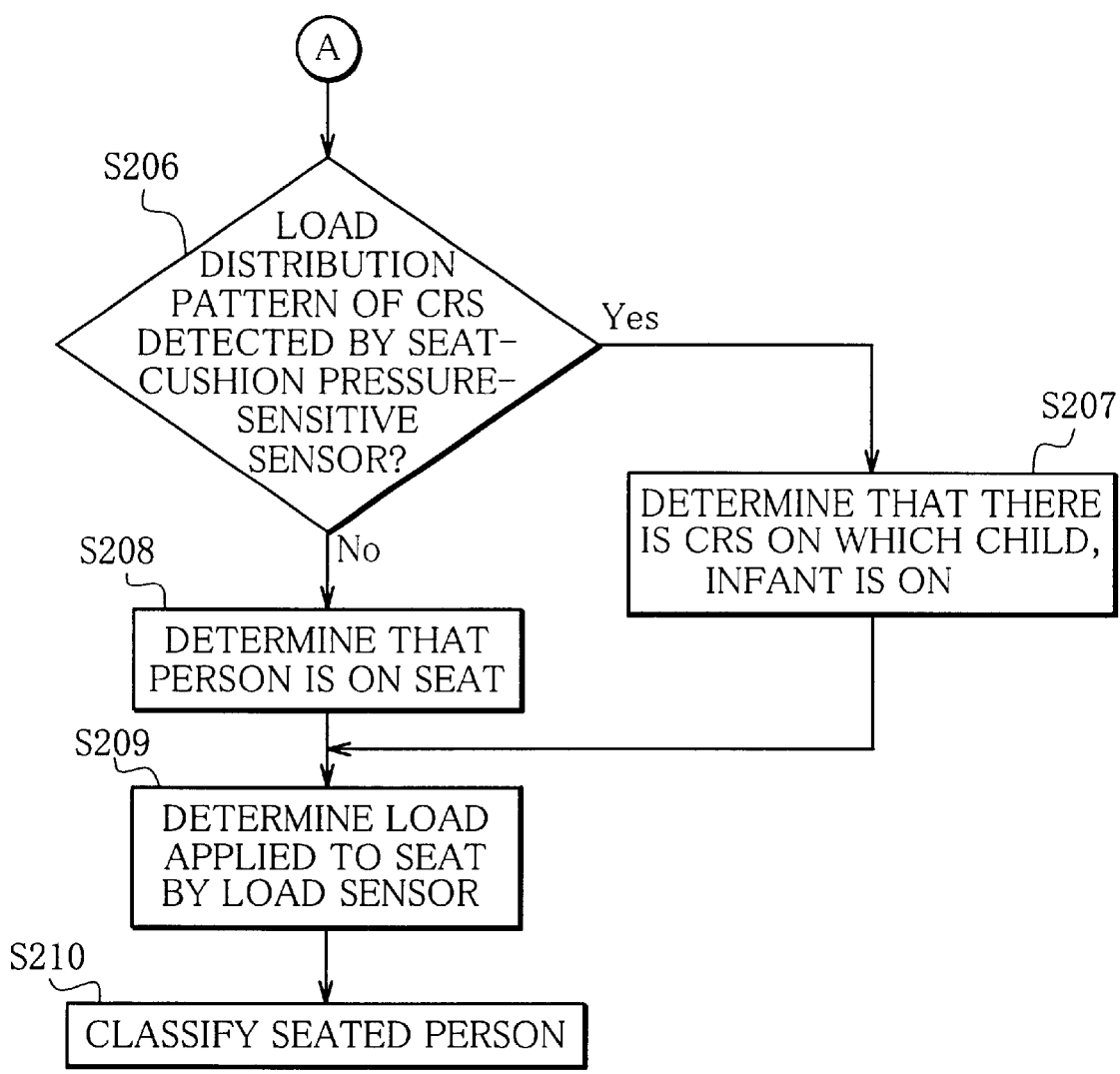
FIG. 16 is a flowchart illustrating procedures continuing from FIG. 15.

This passenger detecting routine will be discussed in detail below based on flowcharts illustrated in FIGS. 15 and 16.

First, the load that is applied to the seat cushion 201 is measured by the seat-cushion pressure-sensitive sensor 211 (step S201), and it is determined if there is a load applied to the seat cushion 201 (step S202). When there is no load applied to the seat cushion 201, it is determined that the seat is vacant (step S203). This decision result is transmitted to a control unit for the seat's peripheral systems to inhibit, for example, an air bag or the like from being activated unnecessarily. When there is an output from the seat-cushion pressure-sensitive sensor 211, it is detected from the output of the seat-cushion pressure-sensitive sensor 211 if the barycenter is shifted (step S204). When there is no barycenter shift, it is determined that a luggage is on the seat (step S205). When there is a barycenter shift, the CPU 213c determines if this load distribution pattern is close to the load distribution pattern of a child seat (CRS) by comparing it with the threshold value pattern in the memory 213m (step S206). When they are close to each other, it is determined that a child seat is on the seat (step S207). In this case, as barycenter shifting on the seat has already been detected in step S204, it is simultaneously determined that an infant or a child is in the child seat.

When the load distribution pattern is not close to the load distribution pattern of the child seat, it is determined that a passenger is directly seated on the seat (step S208).

Next, the load that is applied on the whole seat is measured by the load sensors 212 (step S209). As the load sensors 212 are placed under support portions 203 and 204 that support the seat frame (not shown) on the floor 202, they can measure the load that acts on the entire seat including the weight of the seat so that the load acting on the entire seat can be measured accurately.

When electric capacitance type pressure sensors are used for the load sensors 212, the initial values of the load sensors are likely to drift due to the influence of the temperature or the like. However, the drifting of the output value can be prevented by regularly correcting the initial values by using the occasion when the output of the seat-cushion pressure-sensitive sensor 211 is zero, i.e., when no passenger is seated on the seat.

Subsequently, classification of each weight of the seated persons is carried out (step S210). This can be accomplished easily as the CPU 213c compares the value of the load applied to the seat, obtained from the load sensors 212, with the threshold value stored in the memory 213m.

As one example, the passenger on the seat is classified nto a weight class of an adult of a standard size, a weight lass of a woman of small build and a weight class of a child rom the value of the load applied to the seat and even if it is determined as the weight class of a child, when it is determined in step S207 that a child seat is on the seat, it is determined that a child is not directly seated on the seat but the class is such that an infant is seated on the seat via the child seat.

Because the passenger detecting apparatus according to the second embodiment of this invention can accurately classify a passenger on the seat as apparent from the above, it is possible to, for example, normally activate an air bag when the weight of the passenger on the seat belongs to the weight class of an adult of a standard size, to active the air bag more slowly than the normal air-bag inflation speed when the passenger's weight belongs to the weight class of a woman of small build and to inhibit the inflation of the air bag when the passenger's weight belongs to the weight class of a child. Even when the weight of the passenger on the seat belongs to the weight class of a child, if it is determined that the weight belongs to the weight class of an infant seated on the seat via a child seat, the seat's peripheral systems, such as a door lock, are activated automatically so as to prevent the infant from carelessly opening the door.

A description will now be given of a passenger detecting apparatus which relates to the second embodiment of this invention.

Like reference symbols are given to the components which are the same as the corresponding components of the above-described embodiment, and the detailed description thereof is omitted.

Figure 17:
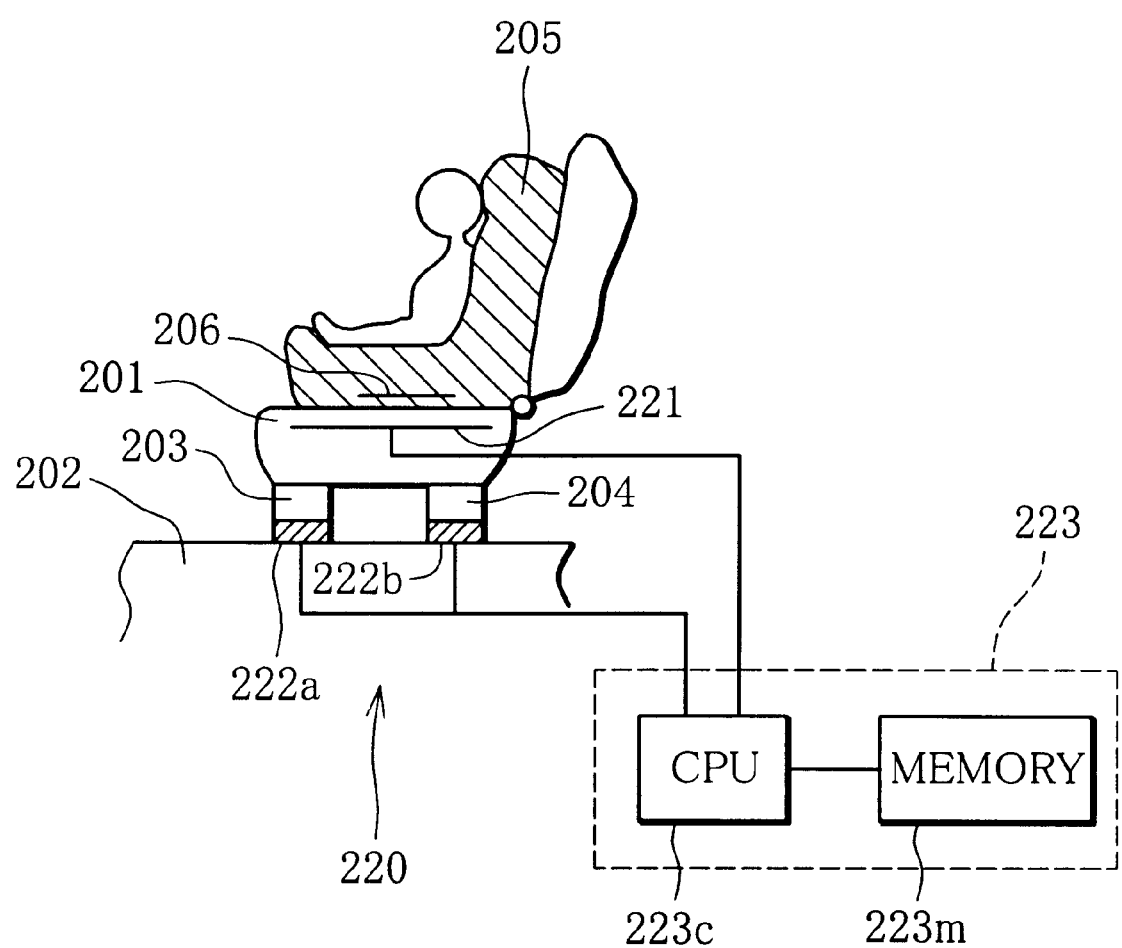
FIG. 17 is a diagram schematically showing the passenger detecting apparatus which relates to the second embodiment of this invention.

As shown in FIG. 17, a passenger detecting apparatus 220 which relates to the second embodiment of this invention comprises a child-seat detection antenna (first detection means) 221 located in the seat cushion 201 of a vehicle, load sensors (second detection means) 222a and 222b for detecting the weight of a seat of the vehicle and the load that is applied to the entire seat, and a processing section (decision means) 223 for classifying a passenger seated on the seat based on the detection results of the detection antenna 221 and the load sensors 222.

The child-seat detection antenna 221 detects a tag 206 attached to a child seat 205 in a non-contact manner, and is attached under the seat fabric so as to easily detect the tag 206.

Electric capacitance type pressure sensors similar to the load sensors 212 used in the passenger detecting apparatus 210 according to the second embodiment are used for the load sensors 222, which are placed under the support portions 203 and 204 that support the seat frame (not shown) on the floor 202 and measure the load that is applied to the entire seat including the weight of the seat.

The processing section 223 has a CPU 223c and memory 223m. Based on the decision flow which will be illustrated below in detail, the CPU 223c determines if the child seat 205 is on the seat and classifies the weight of the passenger on the seat from the detection result of the child-seat detection antenna 221. Stored in the memory 223m is the threshold value pattern that is needed for the CPU 223c to classify the passenger on the seat based on the detection results of the load sensors 222.

Figure 18:
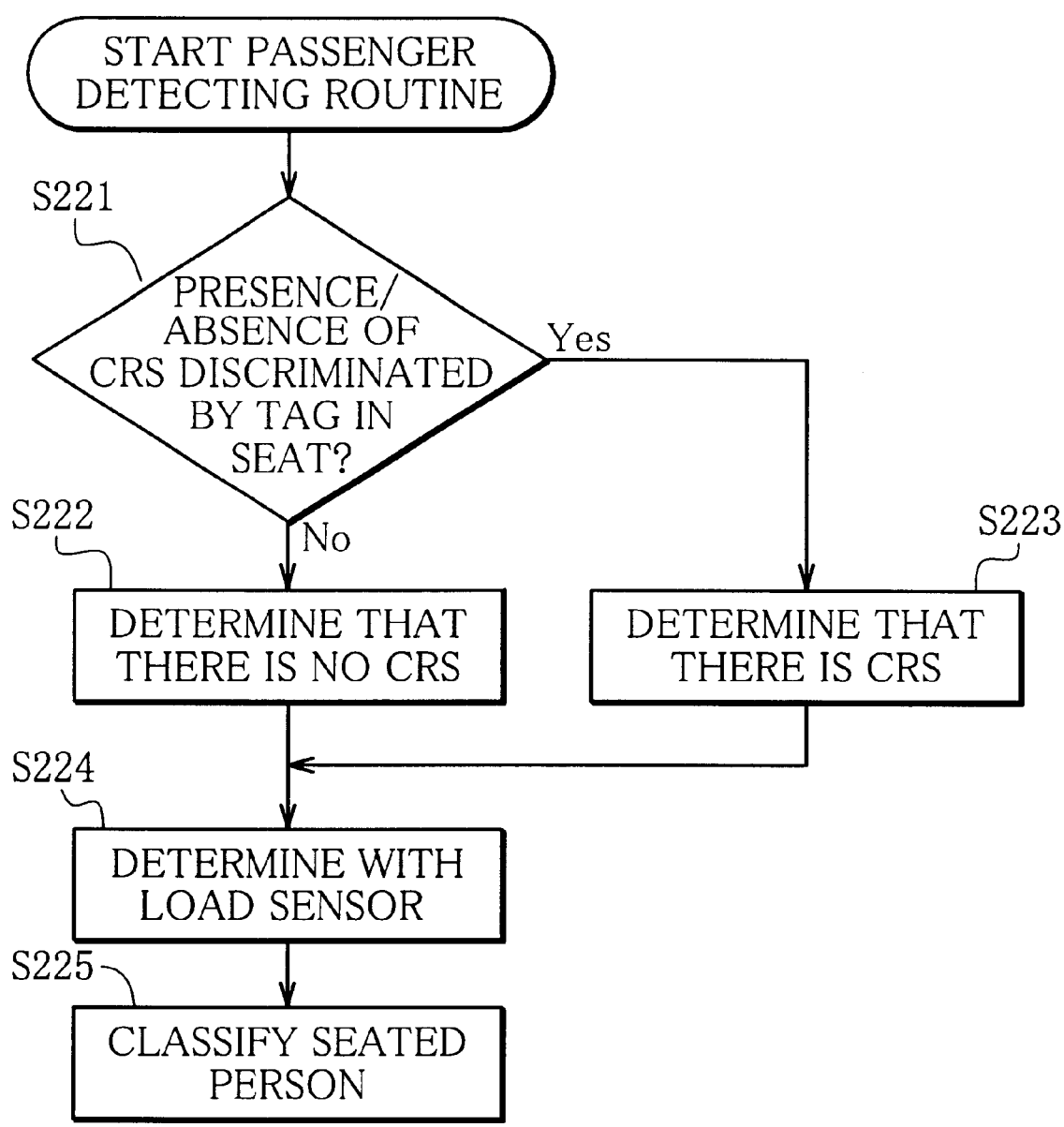
FIG. 18 is a diagram illustrating a decision flow of the passenger detecting apparatus which relates to the second embodiment of this invention.

This passenger detecting routine will be discussed below in detail based on a flowchart illustrated in FIG. 18.

First, the child-seat detection antenna 221 detects the tag 206 of the child seat to discriminate if the child seat (CRS) is on the seat (step S221), and when there is no output from the detection antenna 221, it is determined that there is no child seat (step S222). When there is an output from the detection antenna 221, on the other hand, it is determined that there is a child seat (step S223). After those decisions are made, the load sensors 222 measure the load that is applied to the entire seat (step S224).

In the case where electric capacitance type sensors are used for the load sensors 222, drifting of the output value can be prevented as the CPU 223c corrects the initial values of the load sensors 222 when a passenger is not seated, for example, upon detection of when the passenger opens the door and gets out of the vehicle.

Subsequently, classification of each weight of the seated persons is carried out (step S225). This can be accomplished as the CPU 223c compares the value of the load applied to the entire seat, obtained from the load sensors 222, with the threshold value stored in the memory 223m, as done by the passenger detecting apparatus 210 according to the second embodiment.

Specifically, the passenger on the seat is classified into a weight class of an adult of a standard size, a weight class of a woman of small build and a weight class of a child from the value of the load applied to the seat and even if it is determined as the weight class of a child, when it is determined in step S223 that a child seat is on the seat, it is determined that a child is not directly seated on the seat but the class is such that an infant is seated on the seat via the child seat.

The passenger detecting apparatus 220 which relates to the second embodiment of this invention can detect the presence/absence of a child seat and classify a passenger on the seat by a simpler decision flow. Accordingly, it is possible to activate an air bag normally or at a slower airbag inflation speed or inhibit it from being inflated in accordance with the weight of a passenger on the seat as in the case of the passenger detecting apparatus 210 of the second embodiment. Further, as an infant seating on the seat via a child seat is detected reliably, it is possible to automatically activate the seat's peripheral systems, such as a door lock, so as to prevent the infant from carelessly opening the door.

As different from the passenger detecting apparatus according to the above-described embodiment, a combination of a dielectric sensor and a pressure sensor may be used in the first detection means. For example, attaching a dielectric sensor to the back rest of a seat can allow a child seat on the seat to be distinguished from a booster seat.

The second detection means can use any sensor, such as a piezoelectric type sensor, pressure-sensitive rubber or pressure-sensitive ink, in place of the electric capacitance type sensor, as long as it can accurately measure the weight.

Needless to say that instead of the decision flow for the passenger detecting apparatus according to the above-described embodiment, various types of decision flows can be adapted without departing from the object of this invention.

A description will now be given of a passenger detecting apparatus 310 according to the third embodiment of this invention with reference to the accompanying drawings.

Figure 19:
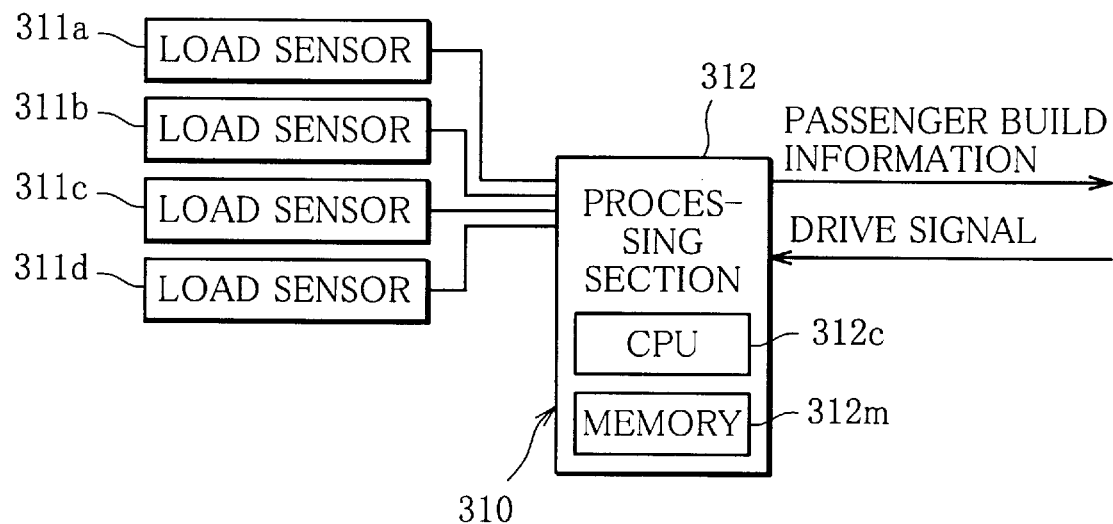
FIG. 19 is a block diagram for explaining a passenger detecting apparatus according to a third embodiment of this invention.
Figure 20B:
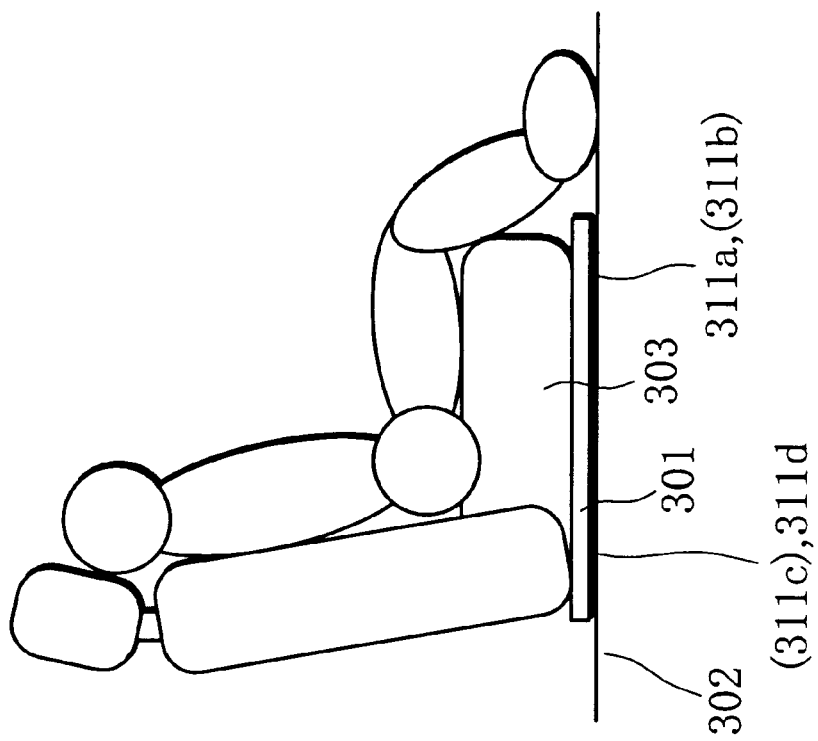
FIGS. 20A and 20B are diagrams for explaining the passenger detecting apparatus according to the third embodiment of this invention.
Figure 20A:
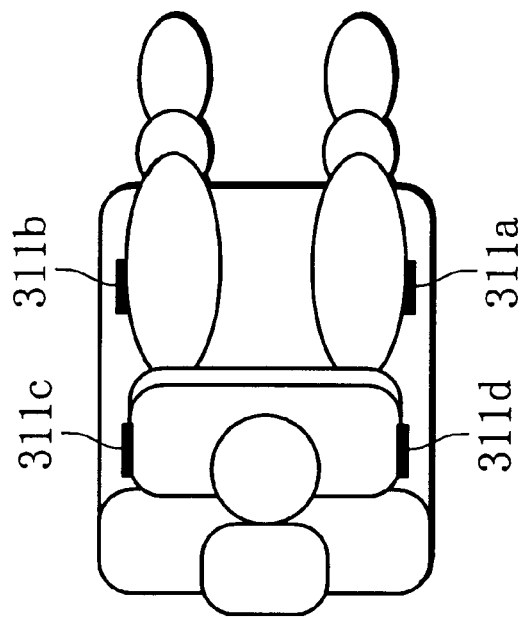

As shown in FIGS. 19, 20A and 20B, the passenger detecting apparatus 310 according to the third embodiment of this invention comprises four load sensors 311a–311d arranged between a seat frame 301 and a floor 302, and a processing section 312 which detects a passenger on the seat based on the outputs of the load sensors 311.

Electric capacitance type pressure sensors are used for the load sensors 311, and are placed under support portions which support the seat frame 301 to the floor 302 as shown in FIG. 20B. Each load sensor 311 measures the weight of a seat 303 that acts on the associated support portion and the weight of a passenger that is applied to the seat 303, and sends the output signal to the processing section 312. The load may be measured by using a distortion gauge instead of the electric capacitance type pressure sensor.

The processing section 312 has a memory 312m and CPU 312c. The memory 312m is storing threshold values for discriminating the weight of an adult of a standard size, the weight of a woman of small build and the weight of a child, and the correlation between the barycenter position of a passenger on the seat and the correction coefficients for the load that is applied to the feet of the passenger. The CPU 312c has functions of acquiring the barycenter position of a passenger on the seat, acquiring the load applied to the feet of the passenger from the weight of the passenger acting on the seat, correcting the load based on the barycenter position of the passenger on the seat and accurately estimating the weight of the passenger.

Figure 21:
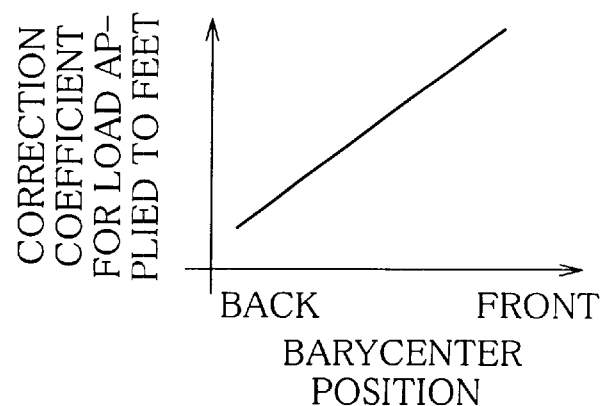
FIG. 21 is a diagram depicting a table stored in a memory in FIG. 19 to acquire a correction coefficient for the load applied to feet.

A table stored in the memory 312m, which shows the correlation between the barycenter position and the correction coefficients for the load that is applied to the feet, is designed in such a way that as the barycenter position of the passenger on the seat lies forward on the seat, the correction coefficient for the load applied to the feet becomes greater, as shown in FIG. 21. As the passenger is seated further forward on the seat, for example, a more weight is applied to the feet, so that it is possible to adequately estimate, from this correction coefficient, the load that is applied to the feet of the passenger, other than the weight of the passenger applied to the seat, and thus accurately estimate the weight of the passenger.

Specifically, the load that is applied to the feet of the passenger reaches 30% of the entire weight of the passenger at a maximum. More specifically, the load that is applied to the feet of the passenger becomes about 20 to 25% of the entire weight when the passenger is seated with a standard posture, depending on the state of the seat, and becomes about 30% of the entire weight at a maximum when the passenger is seated too forward. That is, as the passenger is seated deeper on the seat, the ratio of the load applied to the feet of the passenger decreases significantly with respect to the entire weight of the passenger. It is therefore possible to estimate the load applied to the feet of the passenger by using this correction coefficient, and thus accurately estimate the weight of the passenger.

The CPU 312c can acquire the barycenter of the passenger by comparing the output values of the load sensors 311a, 311b at the front portion of the seat with the output values of the load sensors 311c, 311d at the rear portion of the seat. That is, the output values of the load sensors 311a, 311b at the front portion of the seat become greater than the output values of the load sensors 311c, 311d at the rear portion of the seat when the passenger is seated at the front of the seat, and vice versa when the passenger is seated rearward on the seat, so that the barycenter of the passenger on the seat can be acquired by using the output difference. Note that an elastic member, such as a rubber bushing, may be interposed between the seat frame 301 and the floor 302 where the load sensors 311 are arranged. This causes the output values of the load sensors 311 at the front and back portions of the seat to differ greatly according to the seating position of the passenger, thus ensuring easier acquisition of the barycenter.

The CPU 312c also acquires the weight of the passenger applied to the seat 303 from the output values of the four load sensors 311, acquires the correction coefficient for the load that is applied to the feet of the passenger from the barycenter position, obtained in the above-described manner, by referring to the correction coefficient table in the memory 312mm, and accurately estimates the weight of the passenger based on those values. Even if the weight of the passenger applied to the seat 303 is the same, therefore, the weight is estimated heavier when the passenger is seated forward on the seat than when the passenger is seated rearward on the seat.

This passenger detecting routine will be discussed below in detail based on flowcharts illustrated in FIGS. 22 and 23.

First, the load that is applied to each load sensor 311 is measured in response to an external drive signal (step S301). Although the initial values of the load sensors are likely to drift due to the influence of the temperature or the like when electric capacitance type pressure sensors are used for the load sensors, the CPU may correct the initial values of the load sensors upon detection of the time when no passenger is seated on the seat, e.g., when the passenger opens the door and gets out of the vehicle.

Subsequently, the CPU computes the weight of the passenger applied to the seat (step S302). This is accomplished by adding the output values of the individual load sensors 311 and subtracting the weight of the seat itself prestored in the memory 312m from the resultant value. It should be noted that the weight of the seat itself is acquired by the load sensors 311 when no passenger is seated to use it.

Next, the CPU determines if the entire weight applied to the seat is equal to or less than a predetermined threshold value (step S303). When it is equal to or less than the predetermined threshold value, it is determined that the seat is vacant (step S304) and this decision signal is sent out. This decision signal is transmitted to the seat's peripheral ancillaries, e.g., the air bag system, as passenger build information to inhibit those ancillaries from being activated unnecessarily.

When the entire weight applied to the seat exceeds the predetermined threshold value, the barycenter position of the passenger on the seat is detected from the outputs of the individual load sensors by the above-described method (step S305).

Subsequently, it is determined if the detected barycenter position lies too forward beyond the allowable range (step S306). When it lies too forward, it is determined that the passenger is seated forward on the seat (step S307) and this decision signal is sent out as passenger build information.

Based on this decision signal, it is possible to give a warning to the effect that if a peripheral ancillary of the seat, e.g., the air bag system, is activated, for example, the face of the passenger may be injured.

When the detected barycenter position does not lie too forward, it is determined that the seating position of the passenger lies within the allowable range and the correction coefficient for the load that is applied to the feet of the passenger is acquired from this barycenter position by referring to the correction coefficient table in the memory 312m (step S308). Then, the load that is applied to the feet of the passenger is estimated from the entire weight applied to the seat and this correction coefficient, and the entire weight applied to the seat is added to this value to estimate the weight of the passenger (step S309).

Next, it is determined if the estimated passenger's weight is equal to or greater than the weight of an adult of a standard size (step S310). When it is equal to or greater than the weight of an adult of a standard size, it is determined that the passenger seated on the seat is an adult of a standard size (step S311) and this decision signal is sent out as passenger build information.

Based on this decision signal, a peripheral ancillary of the seat, e.g., the air bag system, is activated at the normal inflation speed.

When the estimated passenger's weight does not exceed the weight of an adult of a standard size, it is determined if this weight is equal to or greater than the weight of a woman of small build (step S312). When this weight is equal to or greater than the weight of a woman of small build, it is determined that the passenger seated on the seat is a woman of small build (step S313) and this decision signal is sent out as passenger build information.

Based on this decision signal, a peripheral ancillary of the seat, e.g., the air bag system, is activated at a inflation speed slower than the usual speed, thus preventing the passenger from being injured by the inflation of the air bag.

When the estimated weight does not exceed the weight of a woman of small build, it is determined that the passenger seated on the seat is a child or an infant (step S314) and this decision signal is sent out as passenger build information.

Based on this decision signal, the activation of a peripheral ancillary of the seat, e.g., the air bag system, is inhibited, thus preventing the passenger from being injured by the inflation of the air bag.

Specifically, in the case of a standard 6-year old child (height of 119 cm, weight of 24 kg) and a woman of small build (height of 150 cm, weight of 50 kg), when the decision is determined from the detected barycenter position that the passenger is seated forward, the maximum value of the load that is applied to the feet of the passenger becomes about 30% of the passenger's weight, so that the weight applied to the feet of the woman of small build becomes 15 Kg and the weight applied to the seat of the woman of small build acting on the seat may be determined as 35 kg at a minimum. Meanwhile, the weight of a heavy child seat is about 10 kg, and when this child seat is used, the weight of the standard 6-year old child is 34 kg. With 35 kg taken as the threshold value for determining if it is a woman of small build or a child, it is possible to reliably determine a woman of small build or a child.

As apparent from the above, the passenger detecting apparatus according to the third embodiment of this invention can accurately determine not only the presence/absence of a passenger on the seat but also the type (build) and the seating posture of the passenger using this decision result, therefore, it is possible to adequately activate the seat's peripheral ancillaries, such as the air bag system.

Figure 24B:
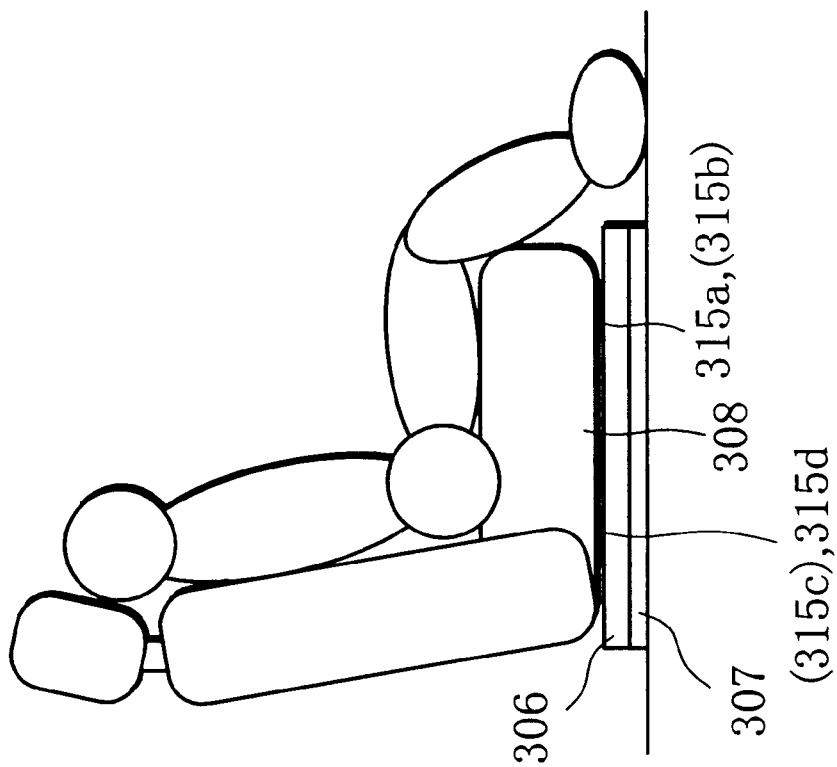
FIGS. 24A and 24B are diagrams for explaining a modification of the embodiment shown in FIGS. 20A and 20B.
Figure 24A:
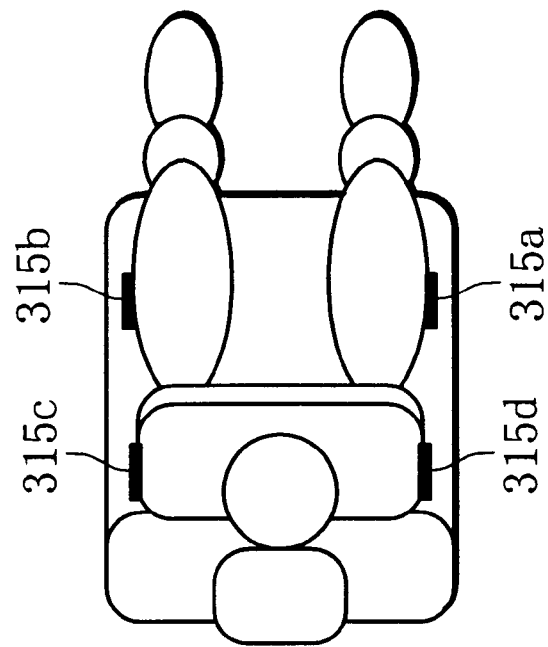

As different from the above-described embodiment, as shown in FIGS. 24A and 24B, four load sensors 315*a*–315*d* may be placed between seat rails 307 and a seat mounting portion 306 on the seat rails. This structure makes a change in the barycenter position of the passenger in accordance with a change in the seating position of the passenger greater than the one in the above-described embodiment (increases the dynamic range), so that the barycenter of the passenger on the seat can be detected accurately without significantly depending on the position of a seat 308 with respect to the seat rails 307.

A description will now be given of a passenger detecting apparatus which relates to the third embodiment of this invention.

Like reference symbols are given to the components which are the same as the corresponding components of the third embodiment, and the detailed description thereof is omitted.

Figure 25:
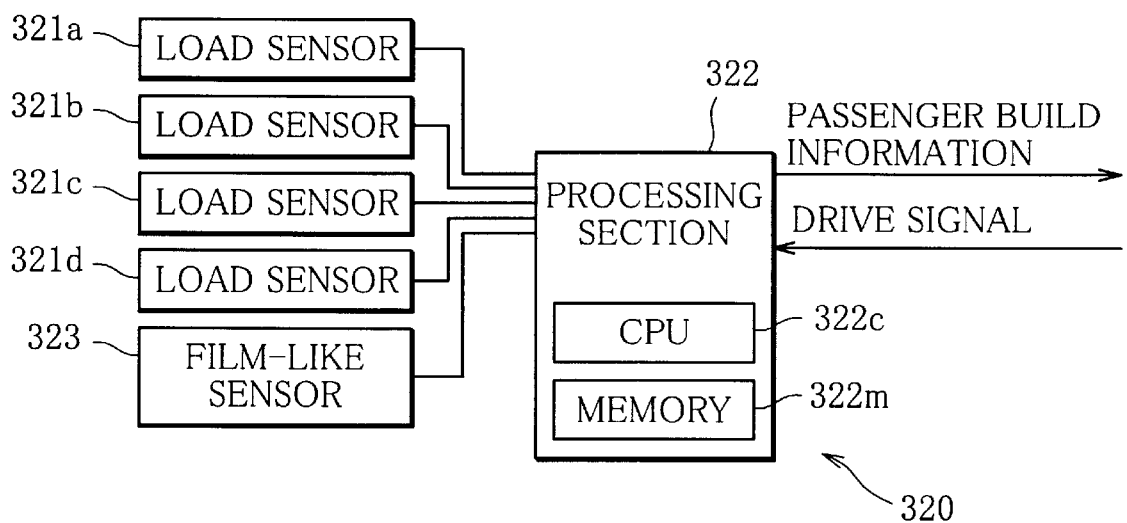
FIG. 25 is a block diagram for explaining a passenger detecting apparatus relating to the third embodiment of this invention.
Figure 26B:
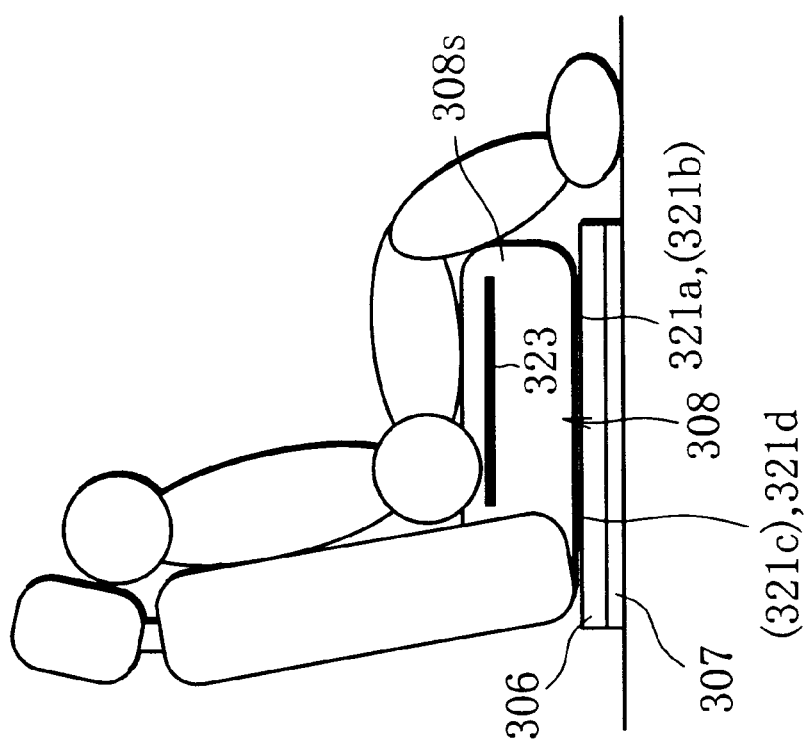
FIGS. 26A and 26B are diagrams for explaining the passenger detecting apparatus relating to the third embodiment of this invention.
Figure 26A:
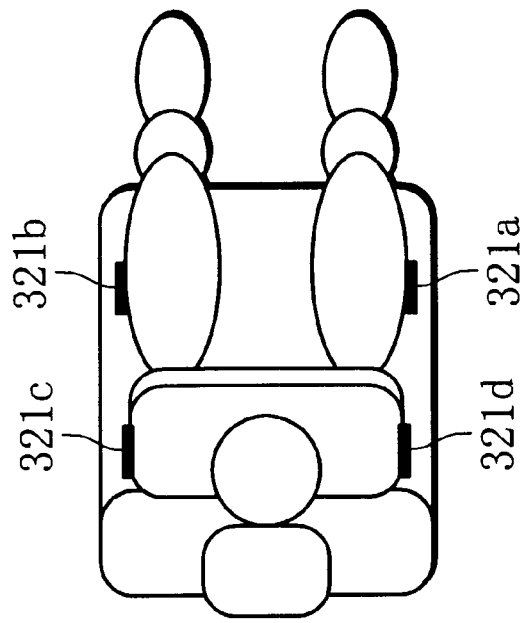

As shown in FIGS. 25, 26A and 26B, a passenger detecting apparatus 320 which relates to the third embodiment of this invention comprises four load sensors 321*a*–321*d* placed between the seat mounting portion 306 and the seat rails 307, a film-like sensor 323 provided in a seat cushion 308*s*, and a processing section 322 which detects a passenger on the seat based on the outputs of those sensors.

Electric capacitance type pressure sensors are used for the load sensors 321 as per the above-described embodiment, and the initial values are regularly corrected by using the occasion when the output of the film-like sensor 323 is zero, i.e., when no passenger is seated on the seat.

The film-like pressure sensor 323 has a plurality of pressure-sensitive sensor elements 324 laid in a sheet form and is located in the vicinity of the fabric of the seat cushion 308*s* so that it easily receives the load from a passenger.

Figure 27:
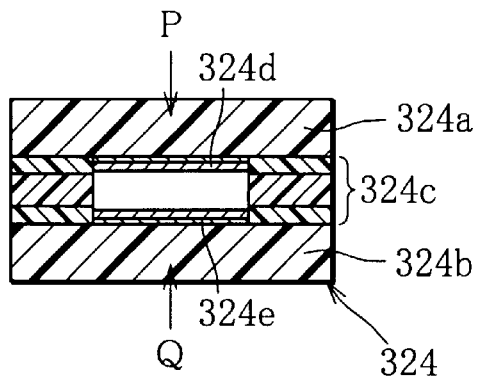
FIG. 27 is a cross-sectional view of sensor elements of a film-like sensor in FIG. 25.

As shown in FIG. 27, the pressure-sensitive sensor element 324 has an insulating layer 324*c*, comprising an adhesive layer of a predetermined thickness and an insulating plastic film or the like, sandwiched between insulating plastic films 324*a* and 324*b* of PET or the like. Conductive layers 324*d* and 324*e* which have metal foils of a predetermined shape adhered or conductive paint printed in a predetermined shape into a circuit pattern are adhered onto the insulating plastic films in such a way as to face each other at a given distance. With this structure, as pressure is applied to the pressure-sensitive sensor element 324 from the directions of arrows P and Q, the conductive layers contact each other and this contact is electrically detected to detect the pressure applied to the pressure-sensitive sensor element 324.

Figure 28:
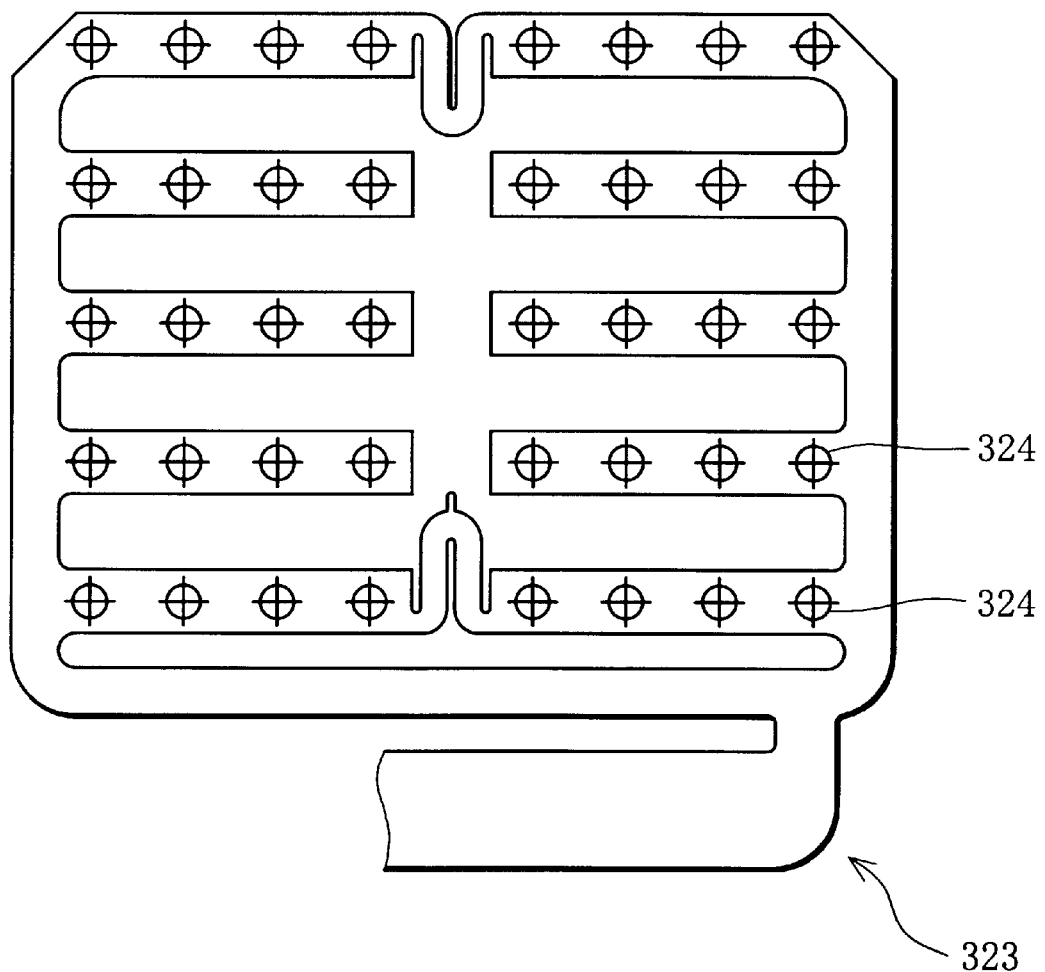
FIG. 28 is a diagram partially showing the film-like sensor in FIG. 25.

As such pressure-sensitive sensor elements 324 are arranged in a matrix form as partially shown in FIG. 28, it is possible to detect the area of the buttocks of the passenger seated on a seat 308 from the outputs of the individual pressure-sensitive sensor elements 324 of the film-like sensor 323.

The processing section 322 has a memory 322*m* and CPU 322*c*, as per the above-described embodiment. The memory 322*m* is storing the correlation between the barycenter position of the passenger and correction coefficients for the load that is applied to the feet of the passenger. The CPU 322*c* has functions of acquiring the center position of the area of the passenger's buttocks detected by the film-like sensor 323 and taking it as the barycenter position of the passenger on the seat, and functions of acquiring the weight of the passenger applied to the seat 308 from the output values of the four load sensors 321, acquiring the correction coefficient for the load that is applied to the feet of the passenger from the aforementioned barycenter position by referring to the correction coefficient table in the memory 322*m* and accurately estimating the weight of the passenger based on those values.

This passenger detecting routine will be discussed below in detail based on flowcharts illustrated in FIGS. 29 and 30.

Figure 22:
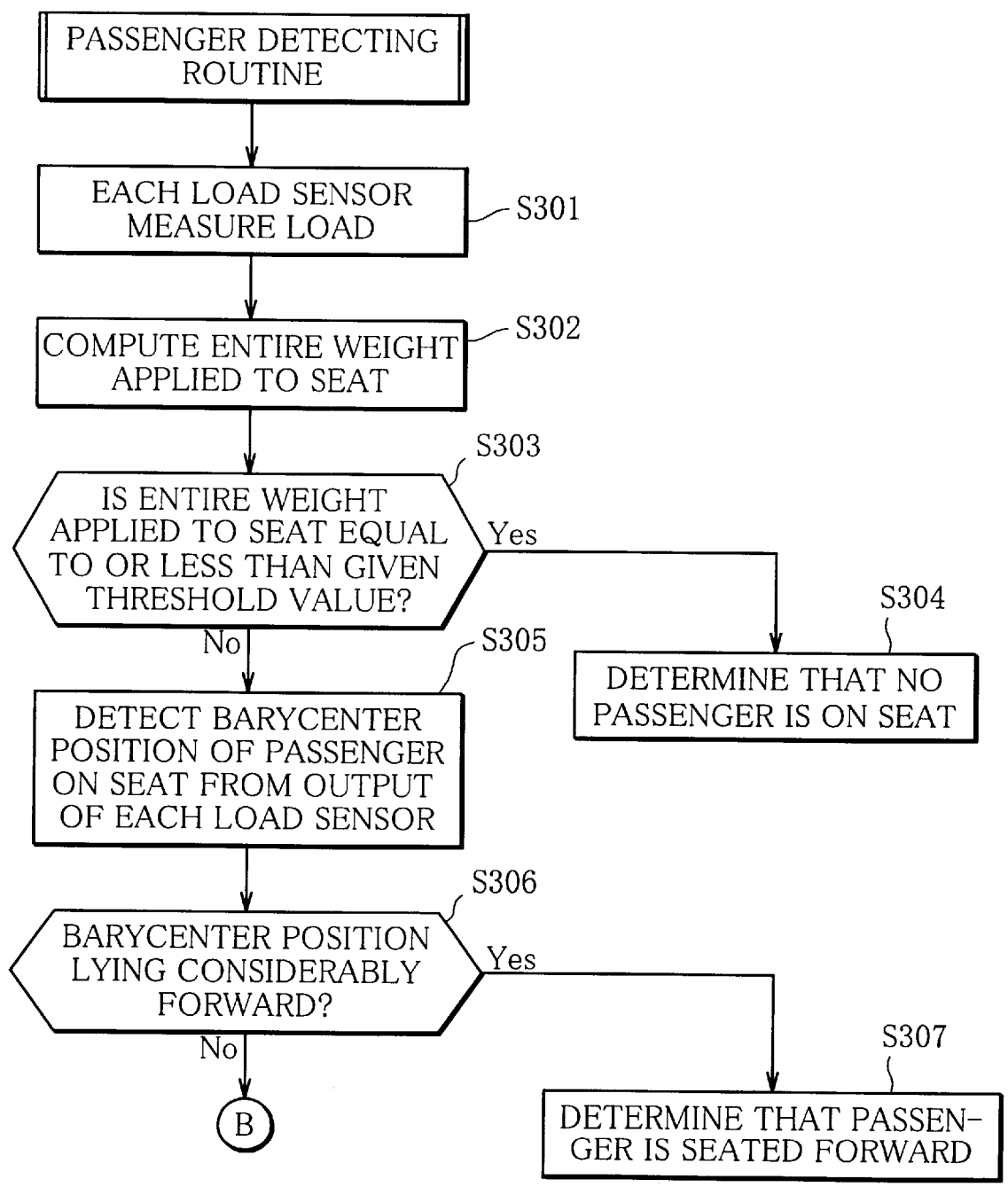
FIG. 22 is a flowchart illustrating a passenger detecting routine according to the third embodiment of this invention.
Figure 23:
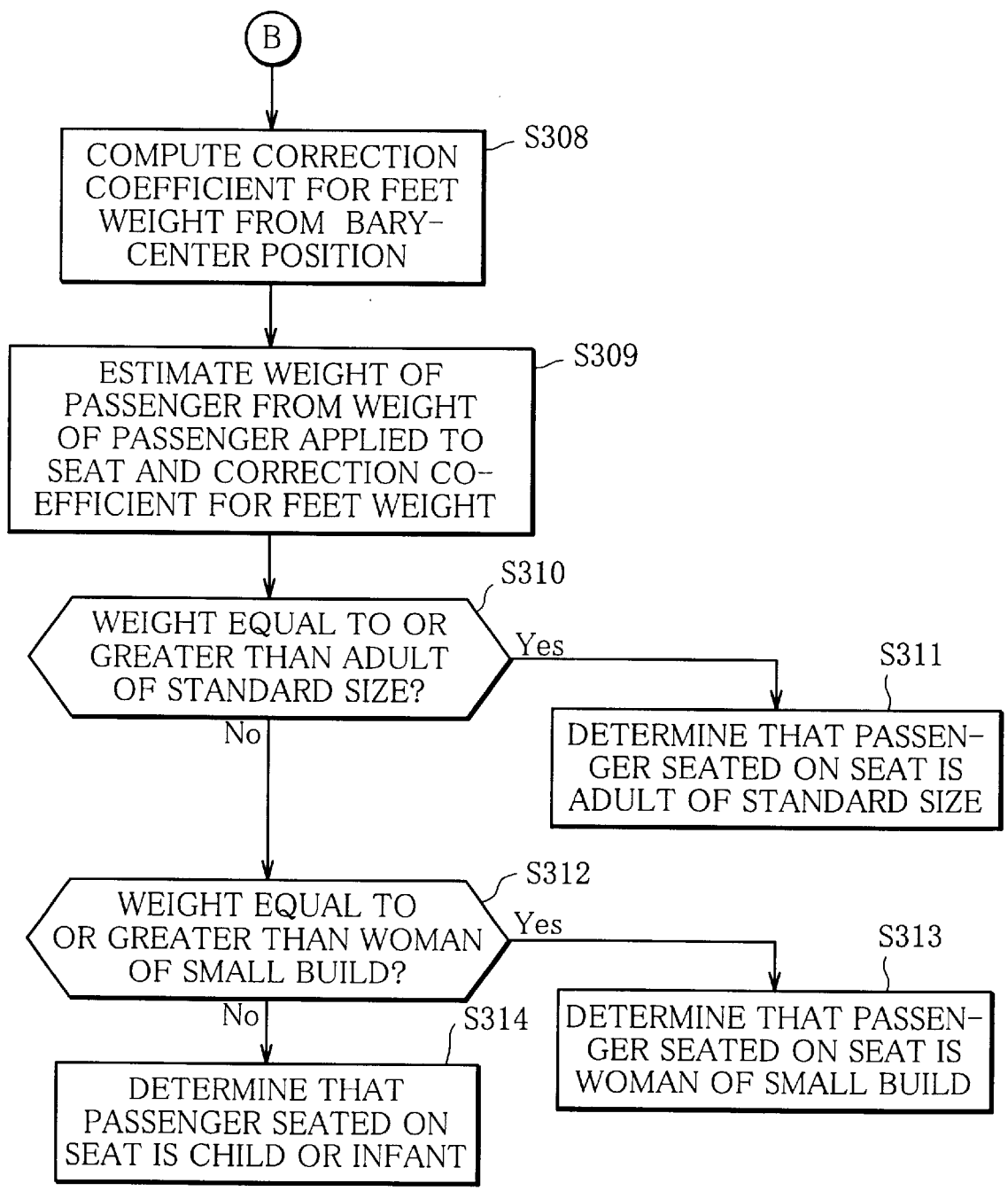
FIG. 23 is a flowchart illustrating procedures continuing from FIG. 22.
Figure 29:
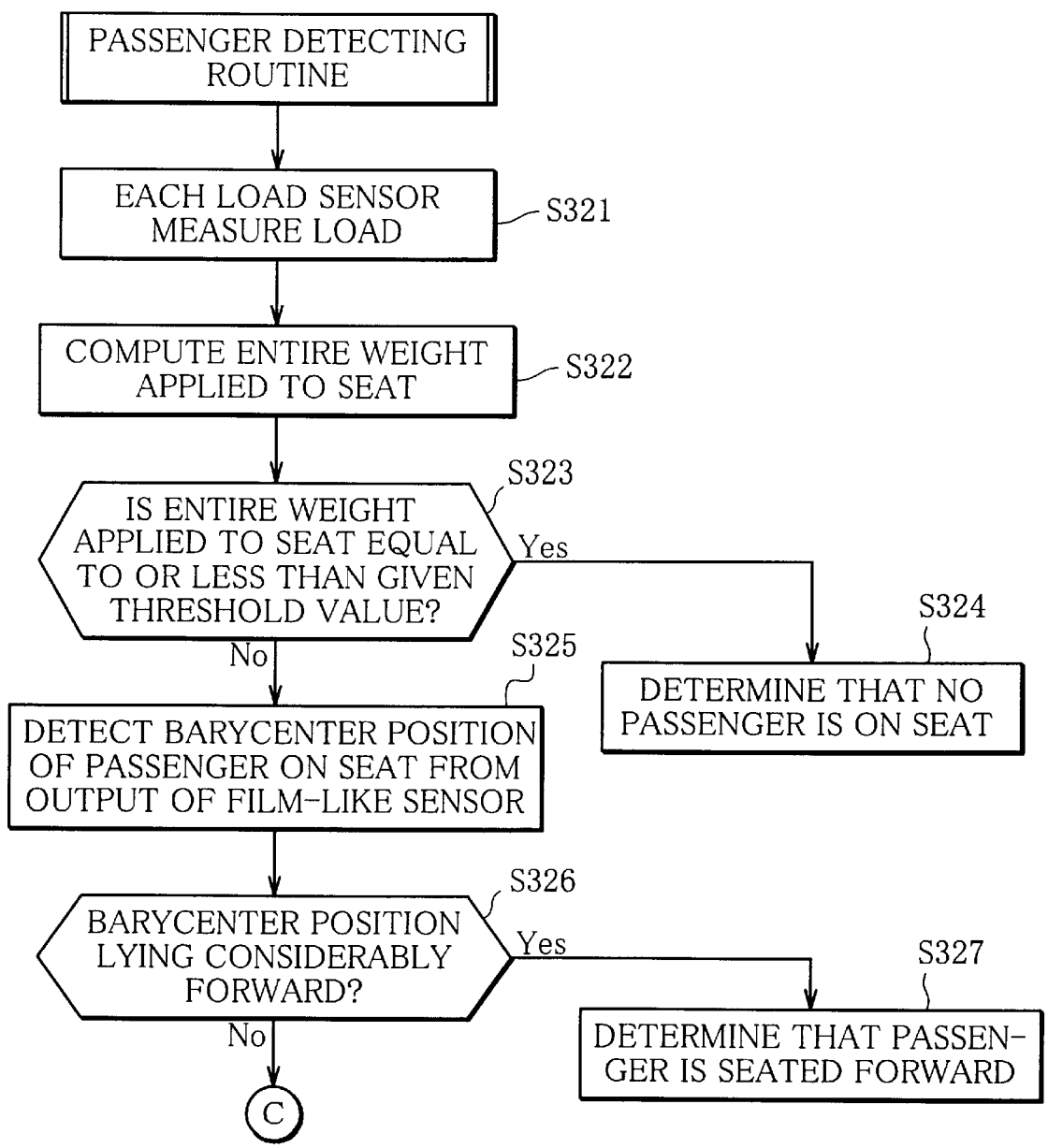
FIG. 29 is a flowchart illustrating a passenger detecting routine which relates to the third embodiment of this invention.
Figure 30:
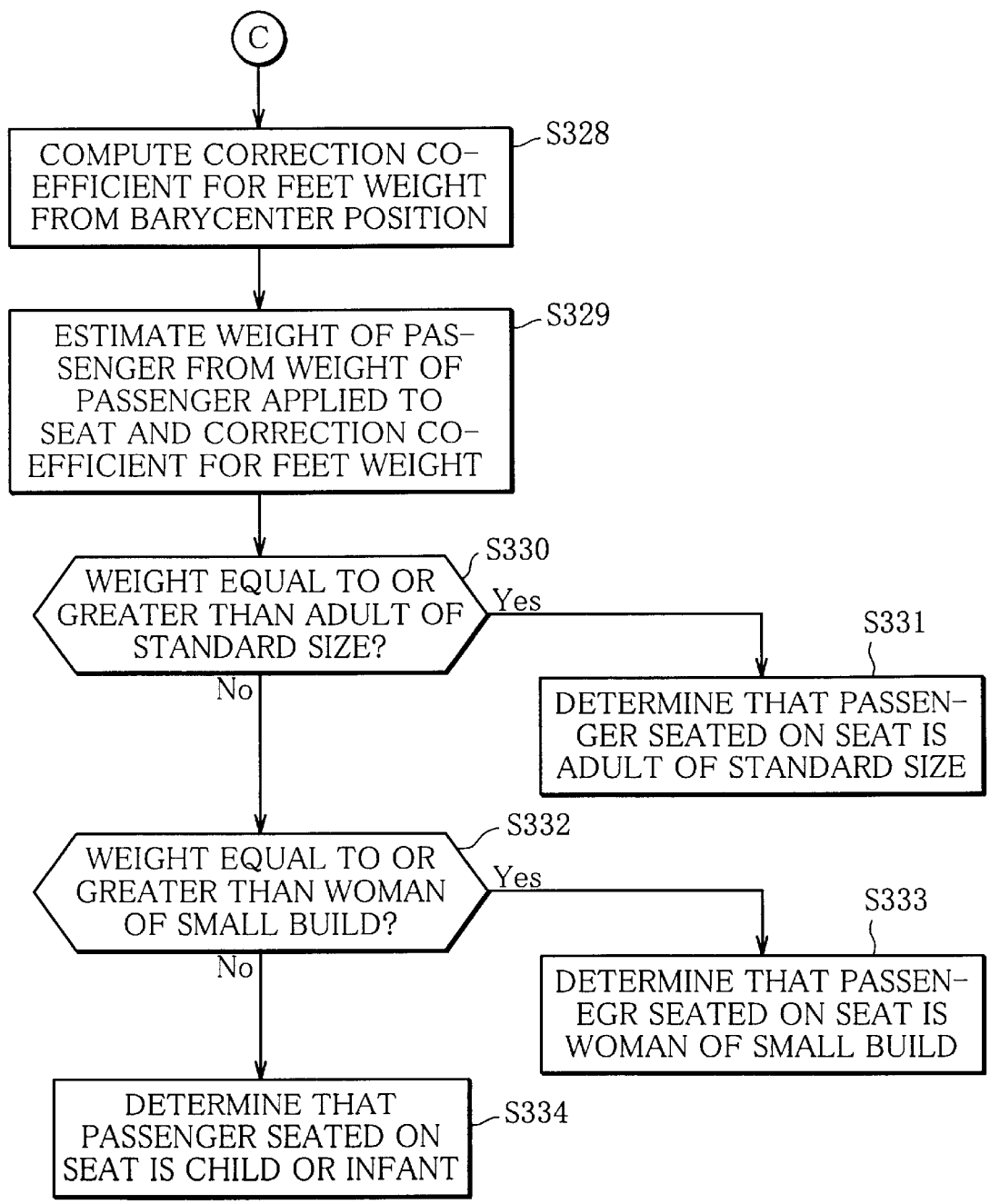
FIG. 30 is a flowchart illustrating procedures continuing from FIG. 29.

The flowcharts illustrated in FIGS. 29 and 30 are approximately the same as the flowcharts illustrated in FIGS. 22 and 23. The load that is applied to each load sensor 321 is measured in response to an external drive signal (step S321). Based on the measured values, the entire weight applied to the seat is computed (step S322). Next, it is determined if the entire weight applied to the seat is equal to or less than a predetermined threshold value (step S323). When it is equal to or less than the predetermined threshold value, it is determined that the seat is vacant (step S324) and this decision signal is sent out as passenger build information. When the entire weight applied to the seat exceeds the predetermined threshold value, the barycenter position of the passenger on the seat is detected from the output of the film-like sensor 323 by the above-described method (step S325). Then, it is determined if the barycenter position of the passenger lies too forward on the seat (step S326). When it lies too forward, it is determined that the passenger is seated forward on the seat (step S327) and this decision signal is sent out as passenger build information. Otherwise, the correction coefficient for the weight at the feet is computed from the barycenter position by the same method as used in the third embodiment (step S328).

Then, the weight of the passenger is estimated from the entire weight applied to the seat and the feet-weight correction coefficient (step S329), and it is determined if this weight is equal to or greater than the weight of an adult of a standard size (step S330). When the weight is equal to or greater than the weight of an adult of a standard size, it is determined that the passenger seated on the seat is an adult of a standard size (step S331). When the weight is less than the weight of an adult of a standard size, it is determined if this weight is equal to or greater than the weight of a woman of small build (step S332). When this weight is equal to or greater than the weight of a woman of small build, it is determined that the passenger seated on the seat is a woman of small build (step S333). When the weight is less than the weight of a woman of small build, it is determined that the passenger seated on the seat is a child or an infant (step S334). And, those decision results are sent out as passenger build information.

Based on the decision signal, a peripheral ancillary of the seat, e.g., the air bag system, is activated at the proper inflation speed when needed, thus preventing the passenger from being injured by the inflation of the air bag.

As pressure-sensitive sensors are used, the width of the buttocks of a passenger in a sitting state can be measured. As the width of the buttocks of a passenger in a sitting state is statistically known to be proportional to the weight, it is possible to avoid a decision error in a special case of no load applied to the feet such as the case of a child whose feet do not reach the floor or the case of an adult who is sitting with the feet up, by computing the estimated weight of the passenger from the width of the buttocks of the passenger in a sitting state, comparing it with the weight value computed in the aforementioned correlation and using a lighter one.

A description will now be given of a further passenger detecting apparatus which relates to the third embodiment of this invention.

Like reference symbols are given to the components which are the same as the corresponding components of the above-described embodiment, and the detailed description thereof is omitted.

Figure 31:
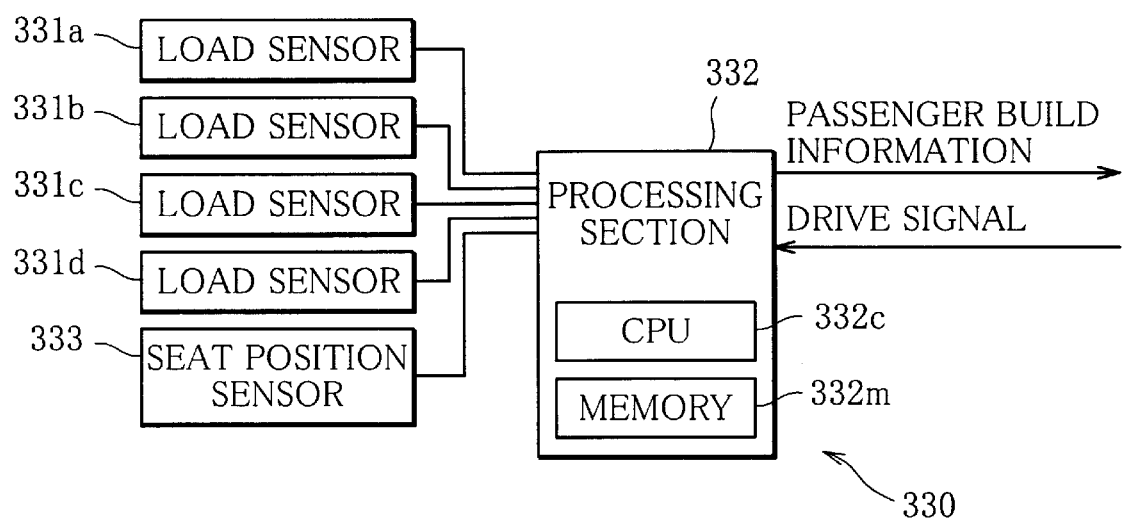
FIG. 31 is a block diagram for explaining another passenger detecting apparatus which relates to the third embodiment of this invention.
Figure 32B:
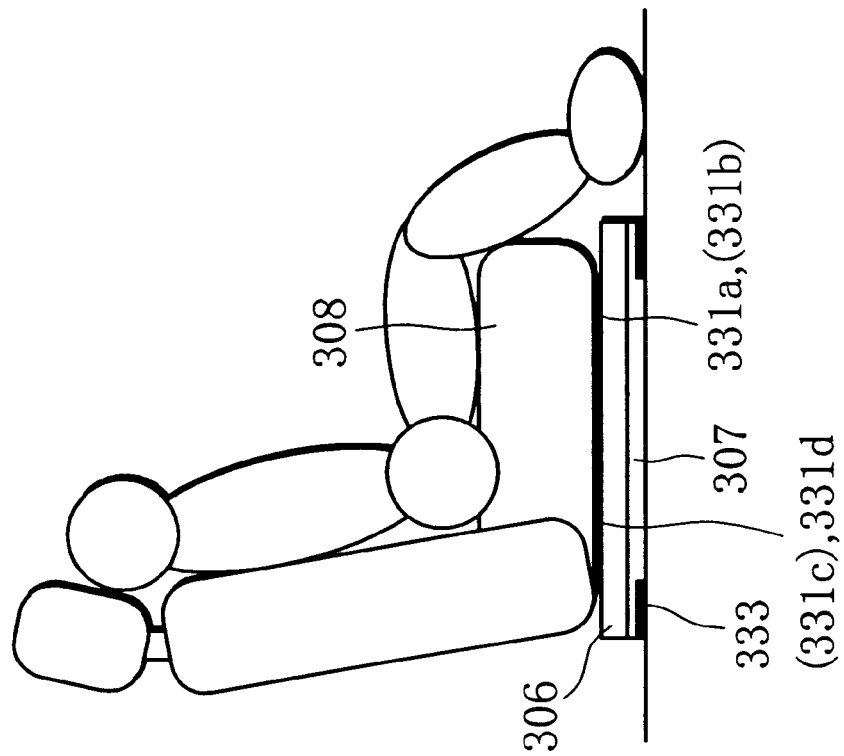
FIGS. 32A and 32B are diagrams for explaining the another passenger detecting apparatus relating to the third embodiment of this invention.
Figure 32A:
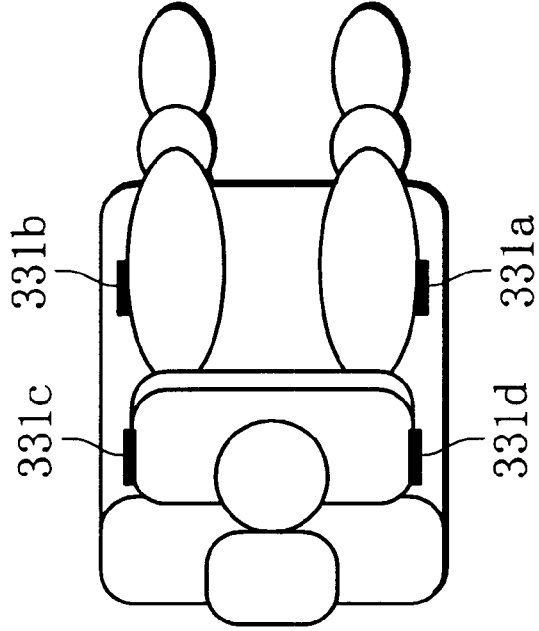

As shown in FIGS. 31, 32A and 32B, a further passenger detecting apparatus 330 which relates to the third embodiment of this invention comprises four load sensors 331a–331d placed between the seat mounting portion 306 and the seat rails 307, a seat position sensor 333 which detects a position of the seat 308 on the seat rails 307 and a processing section 332 which detects a passenger on the seat based on the outputs of those sensors.

Load sensors similar to those of the above-described embodiment are used as the load sensors 331. From the barycenter position of the passenger on the seat acquired by the four load sensors 331 and the position of the seat 308 on the seat rails 307 detected by the seat position sensor 333, a CPU 332c in the processing section detects the barycenter position of the passenger with respect to the seat rails 307, so that the forward seating of the passenger with respect to the seat rails 307 can be detected reliably.

The processing section 332 has a memory 332m identical to the one in the above-described embodiment and the CPU 332c. The CPU 332c has functions of acquiring the barycenter position of the passenger with respect to the seat rails 307 detected by the load sensors 331 and the seat position sensor 333, acquiring the load applied to the feet of the passenger, correcting it based on the barycenter position of the passenger and accurately estimating the weight of the passenger as per the above-described embodiment.

This passenger detecting routine will be discussed below in detail based on flowcharts illustrated in FIGS. 33 and 34.

Figure 33:
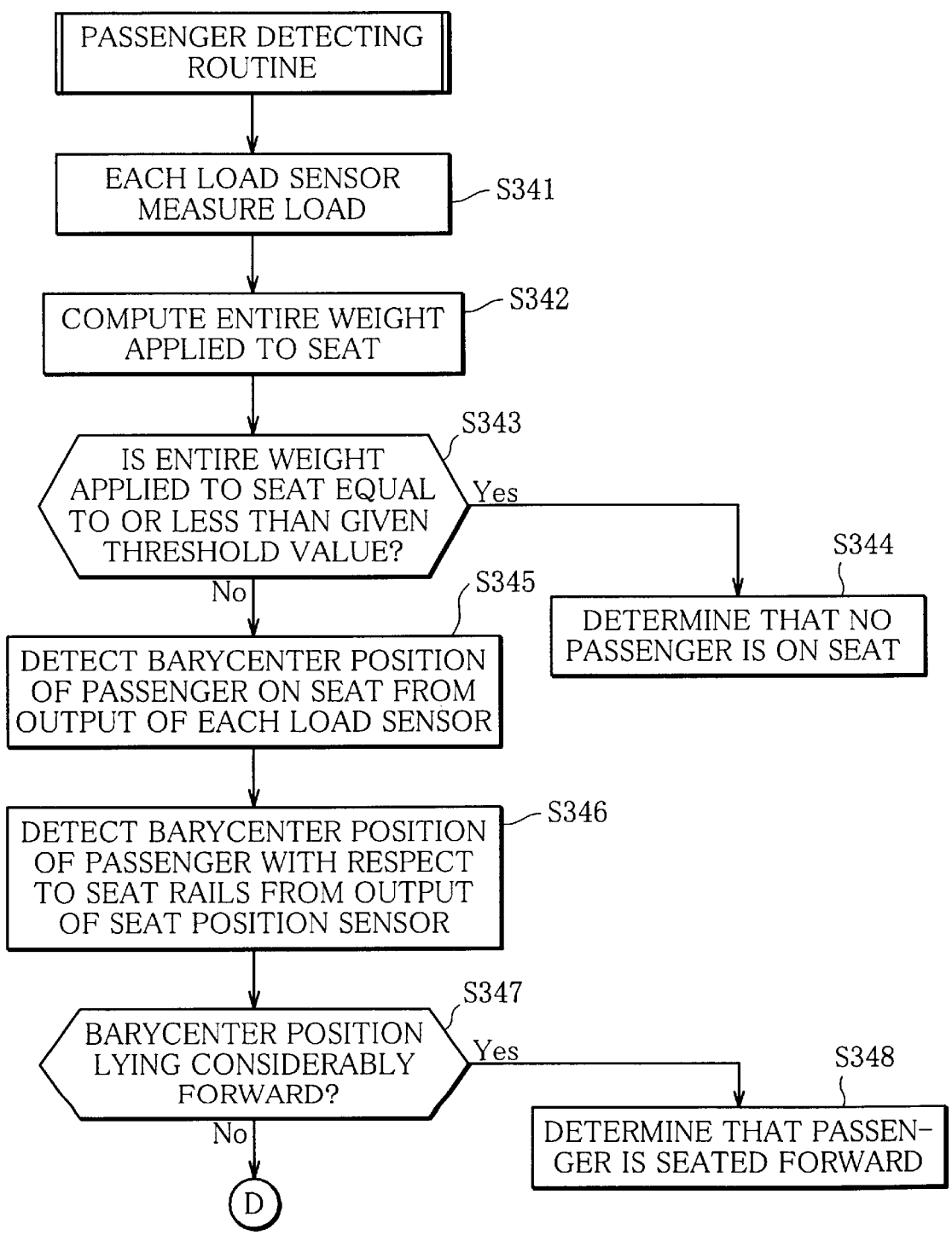
FIG. 33 is a flowchart illustrating a passenger detecting routine which relates to the third embodiment of this invention.
Figure 34:
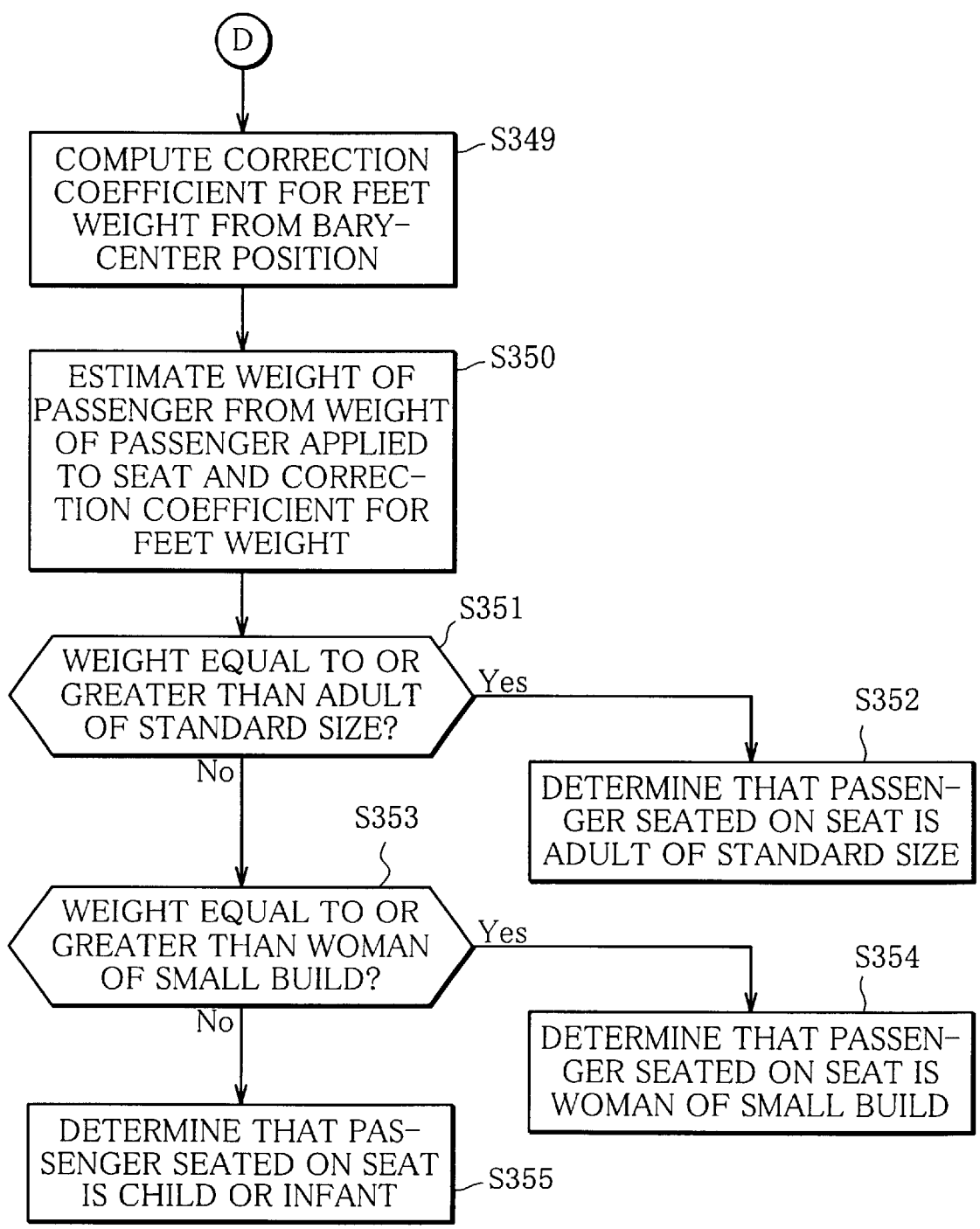
FIG. 34 is a flowchart illustrating procedures continuing from FIG. 33.

The flowcharts illustrated in FIGS. 33 and 34 are approximately the same as the above-described flowcharts. The load that is applied to each load sensor 331 is measured in response to an external drive signal (step S341). Based on the measured values, the entire weight applied to the seat is computed (step S342). Then, it is determined if the entire weight is equal to or less than a predetermined threshold value (step S343). When it is equal to or less than the predetermined threshold value, it is determined that the seat is vacant (step S344) and this decision signal is sent out as passenger build information. When the entire weight exceeds the predetermined threshold value, the barycenter position of the passenger on the seat is detected from the outputs of the individual load sensors 331 by the same method as used in the third embodiment (step S345). Further, the position of the seat on the seat rails is detected by the seat position sensor 333 and the barycenter position of the passenger with respect to the seat rails is detected from this detection result (step S346).

Subsequently, it is determined if the barycenter position lies considerably forward in relation to the seat rails (step S347). When the barycenter position lies considerably forward in relation to the seat rails, it is determined that the passenger is seated forward on the seat (step S348) and this decision signal is sent out as passenger build information.

As the passenger detecting apparatus according to this embodiment detects the barycenter position of the passenger with respect to the seat rails by using the output of the seat position sensor 333, it is possible to accurately determine whether the forward seating state is in a range allowable in relative positional relation with the seat rails or is too forward to be allowed.

When the barycenter position is not considerably forward in relation to the seat rails, the correction coefficient for the weight at the feet is computed from the barycenter position acquired from the individual load sensors by the same method as done in the first embodiment (step S349).

Then, the weight of the passenger is estimated from the weight of the passenger applied to the seat and the feet-weight correction coefficient (step S350), and it is determined if this weight is equal to or greater than the weight of an adult of a standard size (step S351). When the weight is equal to or greater than the weight of an adult of a standard size, it is determined that the passenger seated on the seat is an adult of a standard size (step S352). When the weight is less than the weight of an adult of a standard size, it is determined if this weight is equal to or greater than the weight of a woman of small build (step S353). When the weight is equal to or greater than the weight of a woman of small build, it is determined that the passenger seated on the seat is a woman of small build (step S354). When the weight is less than the weight of a woman of small build, it is determined that the passenger seated on the seat is a child or an infant (step S355). And, those decision results are sent out as passenger build information.

Based on the decision signal, a peripheral ancillary of the seat, e.g., the air bag system, is activated at the proper inflation speed whenever needed, thus preventing the passenger from being injured by the inflation of the air bag, as per the third embodiment and embodiments that relate to the third embodiment.

Figure 35:
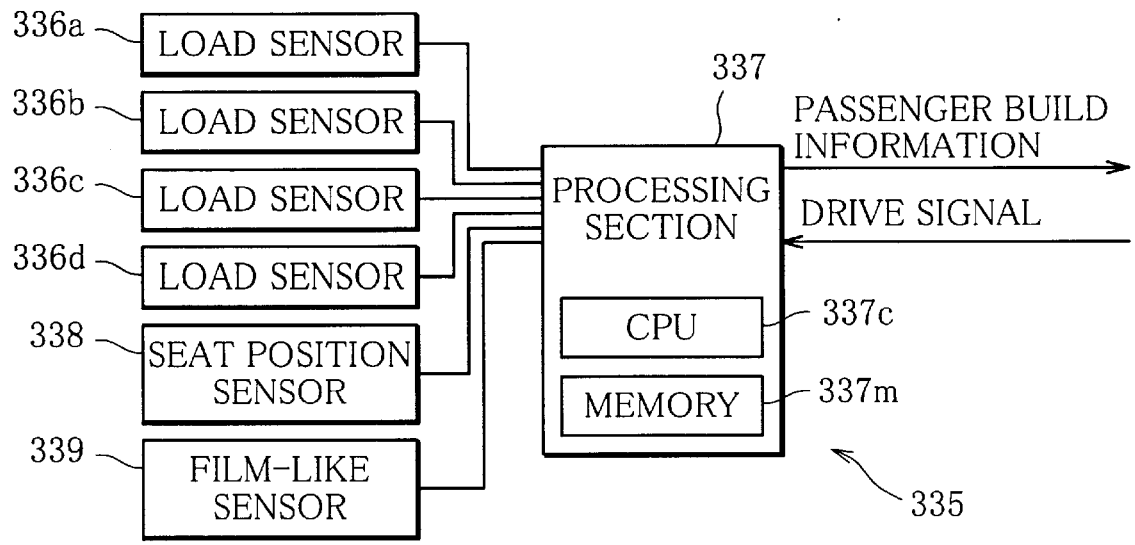
FIG. 35 is a block diagram for explaining a further passenger detecting apparatus which relates to the third embodiment of this invention.
Figure 36B:
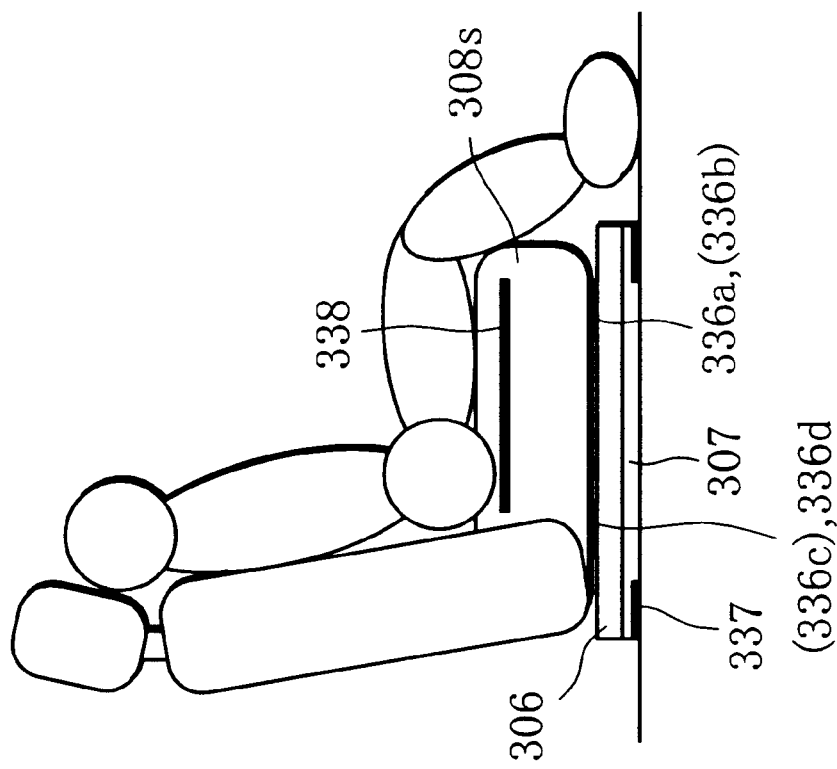
FIGS. 36A and 36B are diagrams for explaining a still further passenger detecting apparatus which relates to the third embodiment of this invention.
Figure 36A:
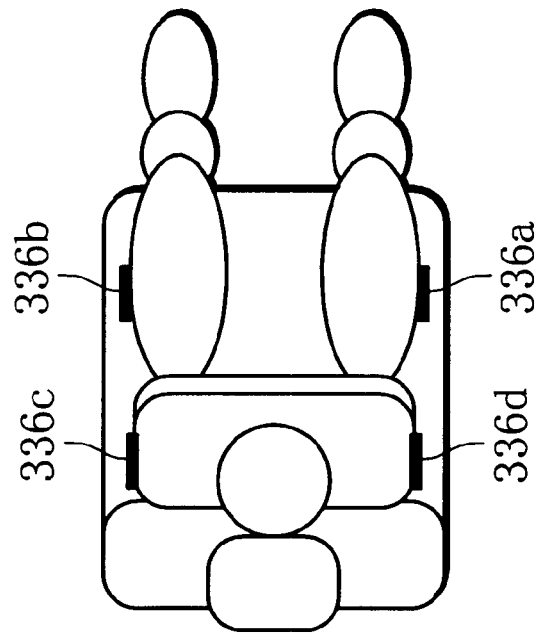

As different from the above-described embodiment, as shown in FIGS. 35, 36A and 36B, four load sensors 336a–336d may be placed between the seat rails 307 and the seat mounting portion 306 on the seat rails, a film-like sensor 338 may be provided in the seat cushion 308s and a position sensor 337 for detecting the position of the seat 308 on the seat rails may be provided on the seat rails 307, so that the barycenter position of a passenger on the seat is acquired by using the film-like sensor 338 as in the passenger detecting apparatus according to the third embodiment, and the barycenter position of the passenger with respect to the seat rails 307 is acquired accurately from the barycenter position of the passenger on the seat and the output of the position sensor 337. Thus, the weight of the passenger can be estimated more accurately.

A description will now be given of a still further passenger detecting apparatus which relates to the third embodiment of this invention.

Like reference symbols are given to the components which are the same as the corresponding components of the above-described embodiment, and the detailed description thereof is omitted.

Figure 37:
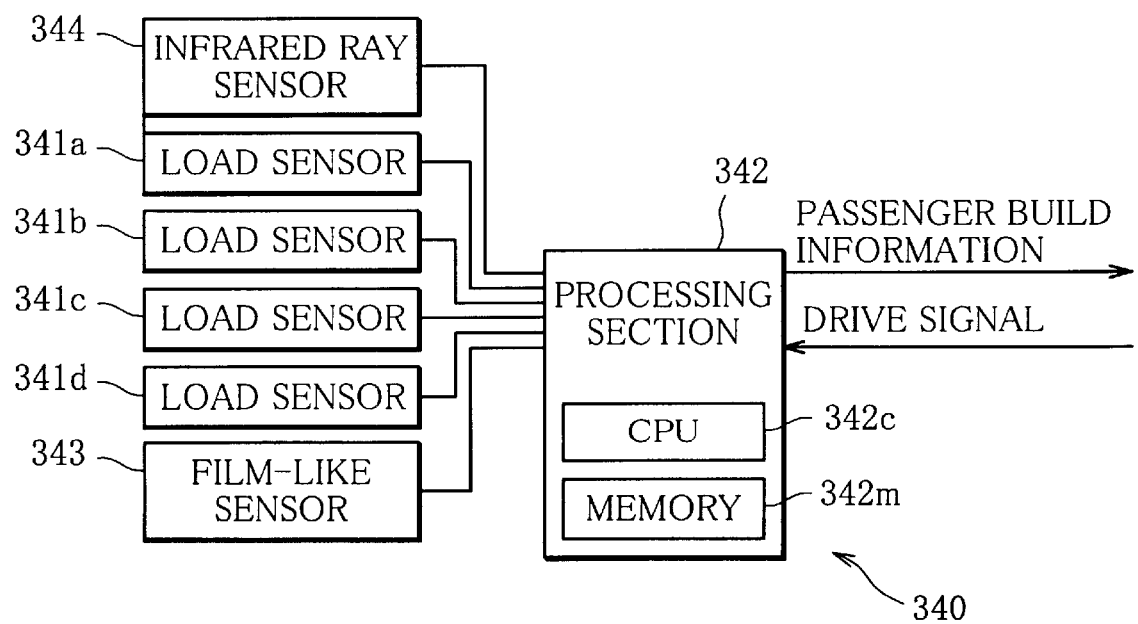
FIG. 37 is a block diagram for explaining a further passenger detecting apparatus which relates to the third embodiment of this invention.
Figure 38:
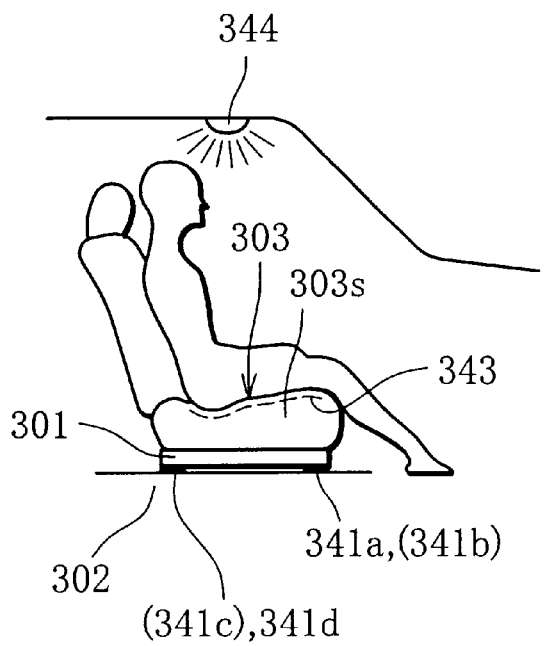
FIG. 38 is a diagram for explaining the further passenger detecting apparatus relating to the third embodiment of this invention.

As shown in FIGS. 37 and 38, a still further passenger detecting apparatus 340 which relates to the third embodiment of this invention comprises four load sensors 341a–341d placed between the seat frame 301 and the floor 302, a film-like sensor 343 provided in the seat cushion 303s, an infrared ray sensor 344, located apart from the seat 303, for detecting the head position of the passenger on the seat, and a processing section 342 which detects the passenger on the seat based on the outputs of those sensors.

Load sensors similar to those of the above-described embodiment are used as the load sensors 341. The four load sensors 341 can acquire the weight of the passenger applied to the seat 303 and the film-like sensor 343 can acquire the barycenter position of the passenger on the seat. The head position of the passenger on the seat detected by the infrared ray sensor 344 is transmitted to a CPU 342c of the processing section 342.

Figure 39:
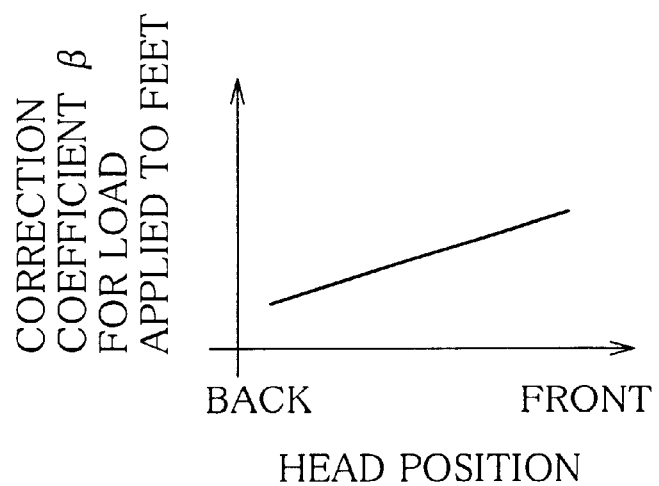
FIG. 39 is a diagram depicting a table stored in a memory to acquire a correction coefficient for the load that is applied to the feet from the position of the head of a passenger in another passenger detecting apparatus relating to the third embodiment of this invention.

Stored in a memory 342m of the processing section 342 are a first table (see FIG. 21) which represents the correlation between the barycenter position on the seat and the correction coefficients for the load applied to the feet, which has been explained in the third embodiment and a second table which represents the correlation between the position of the head of the passenger on the seat and the correction coefficients for the load applied to the feet, which is illustrated in FIG. 39. That is, as the head of the passenger on the seat comes forward in relation to the seat, the passenger bends forward, so that the tables are stored in such a way that as the head position of the passenger comes forward in relation to the seat, a correction coefficient β becomes larger, increasing the load applied to the feet of the passenger.

The inclination of the second table is smaller than the inclination of the first table. That is, the correction coefficients in the second table are set in such a manner that a change in correction coefficient due to a difference in the detection position becomes smaller than that in correction coefficient in the first table. Accordingly, the CPU 342c corrects the load that is applied to the feet based on the barycenter position of the passenger on the seat and further makes supplementary correction of the load applied to the feet based on the position of the head of the passenger on the seat.

When the head of the passenger on the seat is positioned extremely forward, the CPU 342c determines it as an unallowable seating state.

Figure 40:
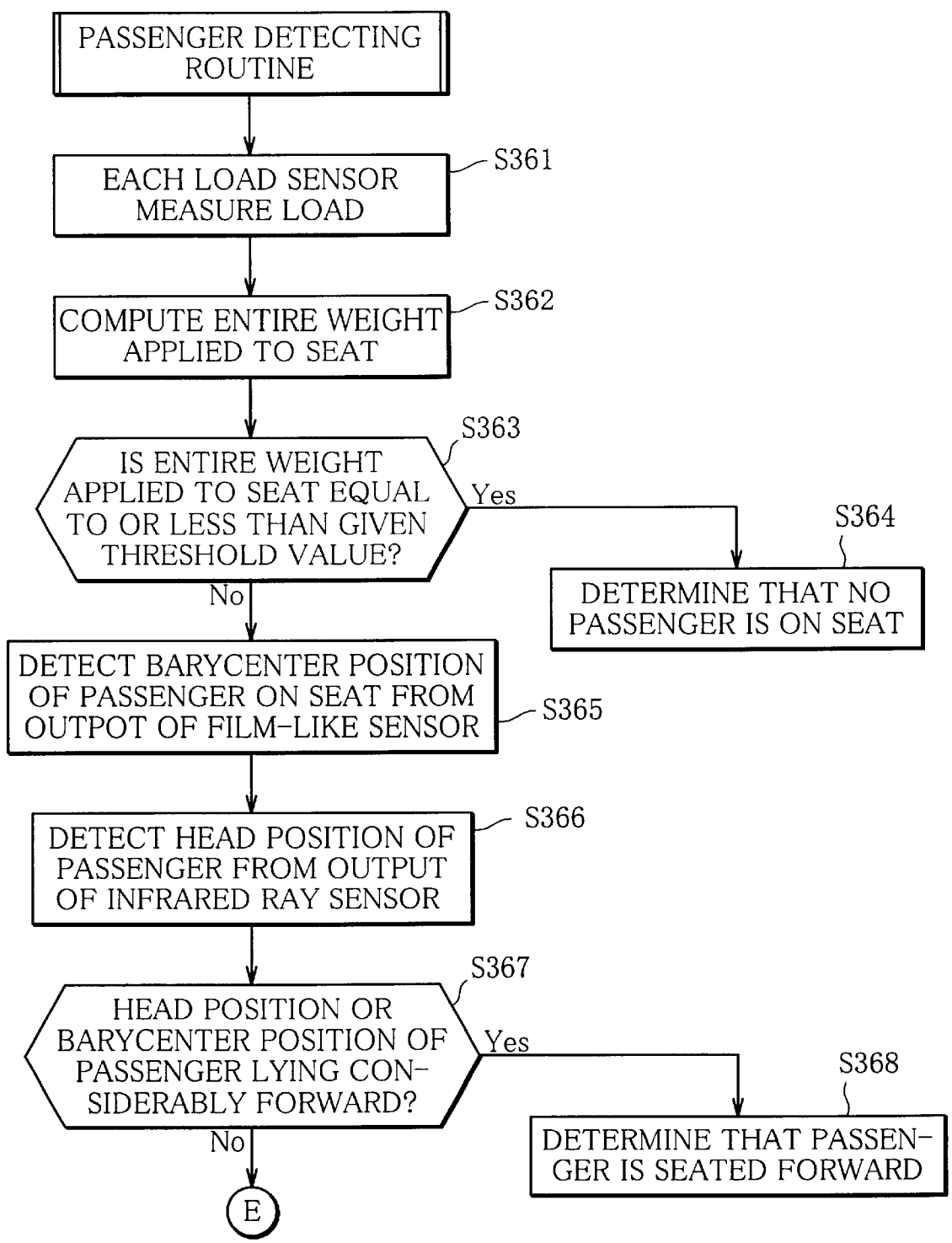
FIG. 40 is a flowchart illustrating another passenger detecting routine which relates to the third embodiment of this invention.

This passenger detecting routine according to this embodiment will be discussed below in detail based on flowcharts illustrated in FIGS. 40 and 41.

First, the load that is applied to each load sensor 341 is measured in response to an external drive signal (step S361). Based on the measured values, the entire weight applied to the seat is computed (step S362). Then, it is determined if the entire weight is equal to or less than a predetermined threshold value (step S363). When it is equal to or less than the predetermined threshold value, it is determined that the seat is vacant (step S364) and this decision signal is sent out as passenger build information. When the entire weight exceeds the predetermined threshold value, the barycenter position of the passenger on the seat is detected from the output of the film-like sensor 343 (step S365). Further, the head position of the passenger is detected from the output of the infrared ray sensor 344 (step S366), and it is determined if the head position or the barycenter position of the passenger lies considerably forward (step S367). When it is determined that at least one of them lies considerably forward, it is determined that the passenger is seated forward on the seat (step S368).

As the passenger detecting apparatus according to this embodiment detects the head position of a passenger by using the output of the infrared ray sensor 344, it is possible to surely detect the state where the barycenter position of the passenger on the seat is at the normal position but the passenger is seated bending forward and to prevent the passenger's head from being injured by the activation of the seat's peripheral ancillaries, such as the air bag system, in such a case.

When the barycenter position does not lie too forward in relation to the seat rails, a correction coefficient α for the weight on the feet is computed from the barycenter position acquired from the film-like sensor 343 based on the first table (step S369).

The correction coefficient β for the weight on the feet is computed from the head position acquired from the infrared ray sensor 344 based on the second table (step S370).

Next, the weight that is applied to the feet of the passenger is acquired from the weight of the passenger applied to the seat and the feet-weight correction coefficients α and β, and it is added to the weight of the passenger applied to the seat to estimate the weight of the passenger (step S371).

Figure 42C:
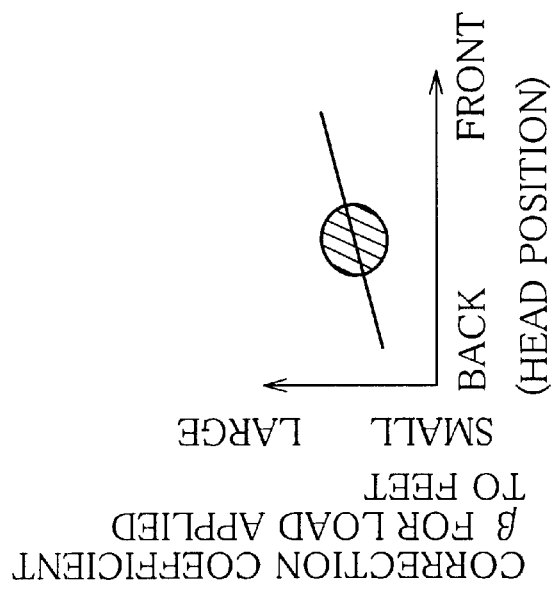
FIGS. 42A through 42C are diagrams showing a relationship between the posture of a passenger on a seat and the correction coefficient of the load applied to the feet.
Figure 42B:
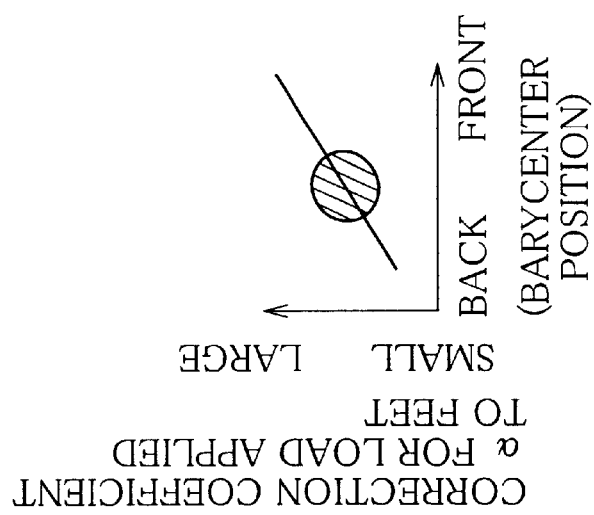
Figure 42A:
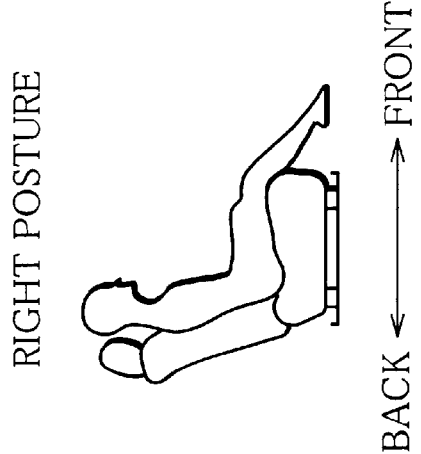

When the passenger is seated at the proper posture as shown in FIG. 42A, for example, the feet-weight correction coefficient α is obtained from the hatched area as shown in FIG. 42B and the feet-weight correction coefficient β is obtained from the hatched area as shown in FIG. 42C.

Figure 43A:
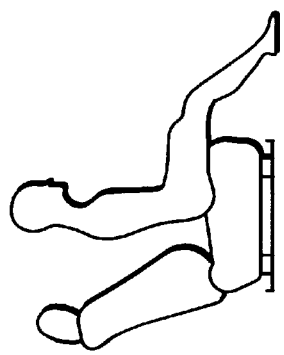
FIGS. 43A through 43C are diagrams showing a relationship between the posture of a passenger on a seat and the correction coefficient of the load applied to the feet.
Figure 43B:
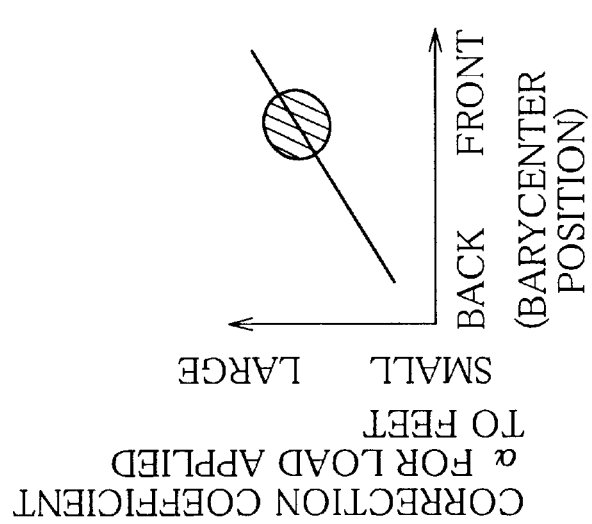
Figure 43C:
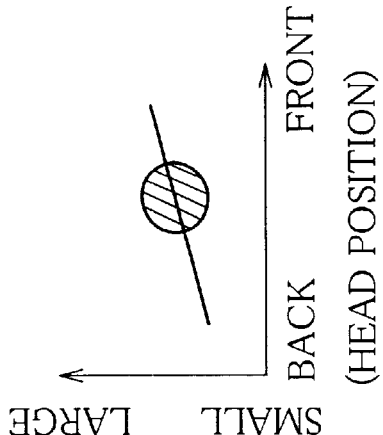

When the passenger is seated forward as shown in FIG. 43A, the feet-weight correction coefficient α is obtained from the hatched area as shown in FIG. 43B and the feet-weight correction coefficient β is obtained from the hatched area as shown in FIG. 43C. Therefore, the values of the feet-weight correction coefficients α and β increase and correction is made to increase the weight at the feet of the passenger to accurately estimate the weight of the passenger.

Figure 44A:
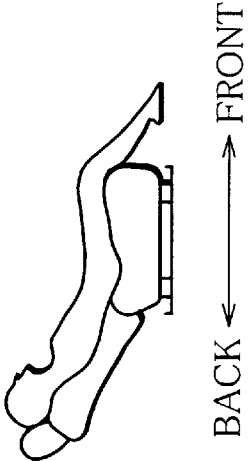
FIGS. 44A through 44C are diagrams showing a relationship between the posture of a passenger on a seat and the correction coefficient of the load applied to the feet.
Figure 44B:
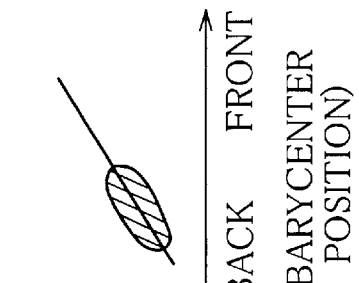
Figure 44C:
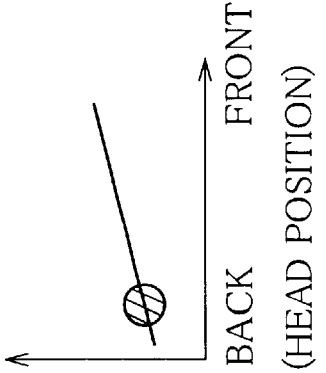

When the passenger is reclining as shown in FIG. 44A, the feet-weight correction coefficient α is obtained from the hatched area as shown in FIG. 44B and the feet-weight correction coefficient β is obtained from the hatched area as shown in FIG. 44C. Therefore, the values of the feet-weight correction coefficients α and β become smaller and correction is made to decrease the weight at the feet of the passenger to accurately estimate the weight of the passenger.

Figure 45C:
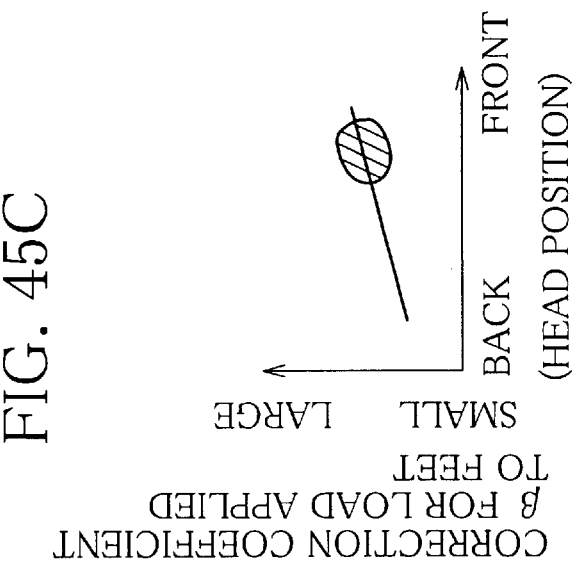
FIGS. 45A through 45C are diagrams showing a relationship between the posture of a passenger on a seat and the correction coefficient of the load applied to the feet.
Figure 45B:
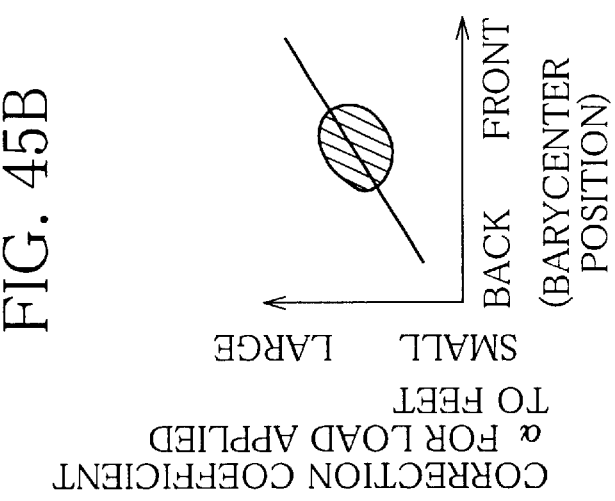
Figure 45A:
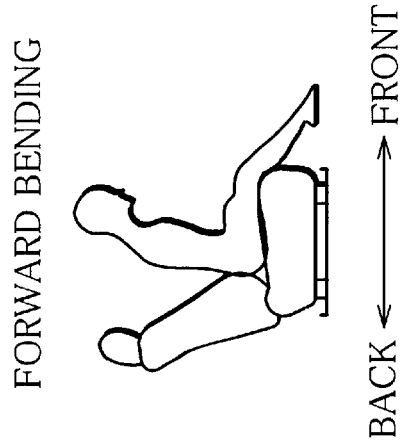

When the passenger is bending forward (reclining forward) as shown in FIG. 45A, the feet-weight correction coefficient a is equivalent to the area within the hatched area as shown in FIG. 45B and the feet-weight correction coefficient β is equivalent to the area within the hatched area as shown in FIG. 45C. That is, it is understood that the head position lies extremely forward and it can be determined that the seating posture of the passenger is out of the allowable range.

As two correction coefficients are used in the above manner, it is possible to estimate the weight of the passenger more accurately.

Figure 41:
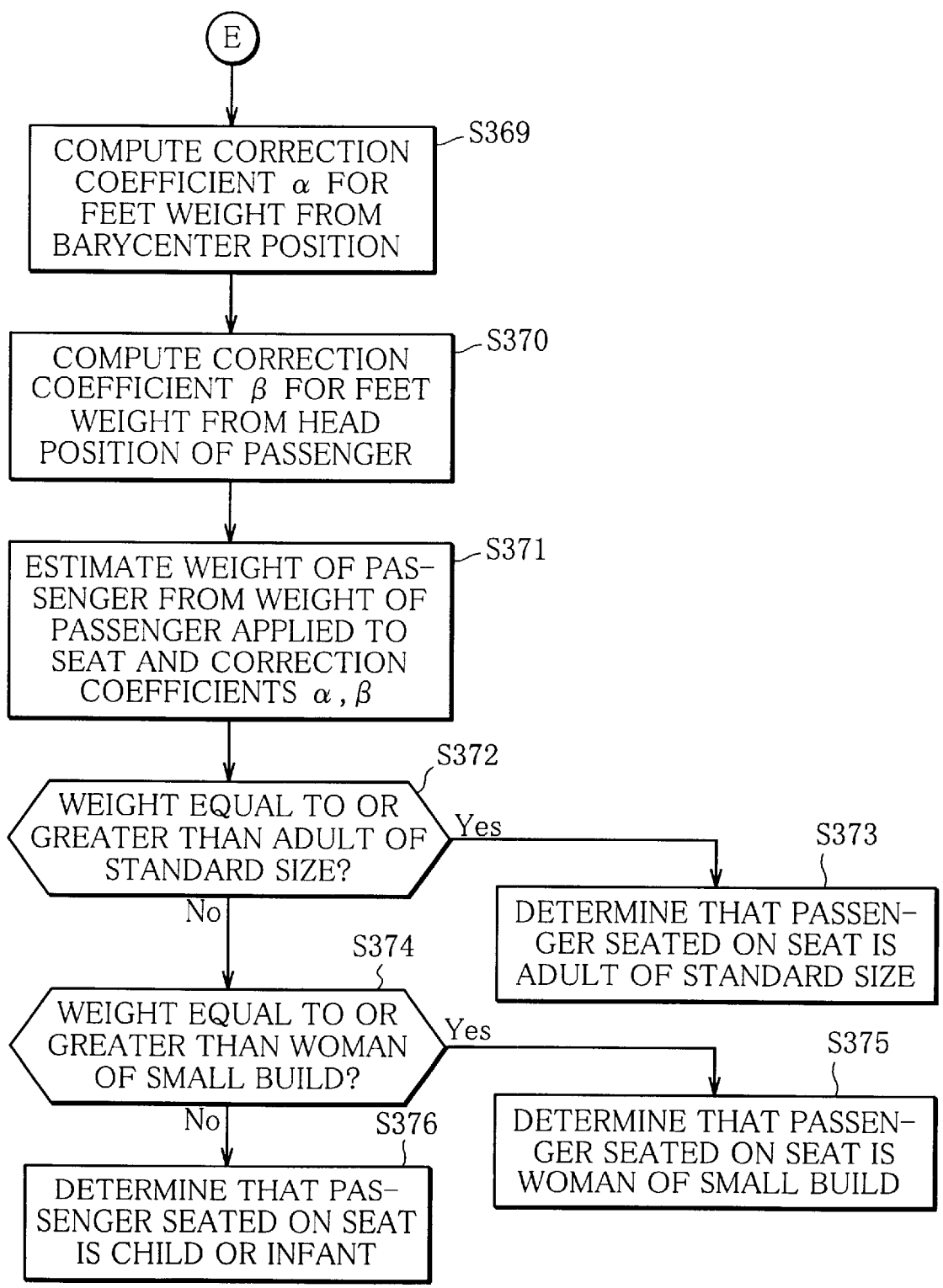
FIG. 41 is a flowchart illustrating procedures continuing from FIG. 40.

Next, as shown in FIG. 41, it is determined if this weight is equal to or greater than the weight of an adult of a standard size (step S372). When the weight is equal to or greater than the weight of an adult of a standard size, it is determined that the passenger seated on the seat is an adult of a standard size (step S373). When the weight is less than the weight of an adult of a standard size, it is determined if this weight is equal to or greater than the weight of a woman of small build (step S374). When the weight is equal to or greater than the weight of a woman of small build, it is determined that the passenger seated on the seat is a woman of small build (step S375). When the weight is less than the weight of a woman of small build, it is determined that the passenger seated on the seat is a child or an infant (step S376). And, those decision results are sent out as passenger build information.

Based on the decision signal, a peripheral ancillary of the seat, e.g., the air bag system, is activated at the proper inflation speed whenever needed, thus preventing the passenger from being injured by the inflation of the air bag, as per the third embodiment and embodiments that relate to the third embodiment.

Instead of the aforementioned infrared ray sensor, an ultrasonic sensor, CCD camera or the like may be used to detect the position of the head of a passenger on the seat.

Needless to say, the above-described passenger detecting routine is not limited to the aforementioned flowcharts, but various combinations are possible within the scope of this invention.

Further, the above-described passenger detecting apparatuses can be used to automatically control the air-conditioning of a vehicle based on the presence/absence of a seated person or weight information of a seated person or radio-transmitting build information of the passenger to a nearest center (terminal) in emergency to be helpful in passenger rescue in emergency.

The passenger detecting apparatuses according to this invention are not limited to the adaptation to a seat of a vehicle, but may be adapted to, for example, a home massaging machine, so that a massage menu is properly selected in accordance with the weight of a user.

A description will now be given of a passenger detecting apparatus according to the fourth embodiment of this invention with reference to FIGS. 46 to 50.

Figure 46:
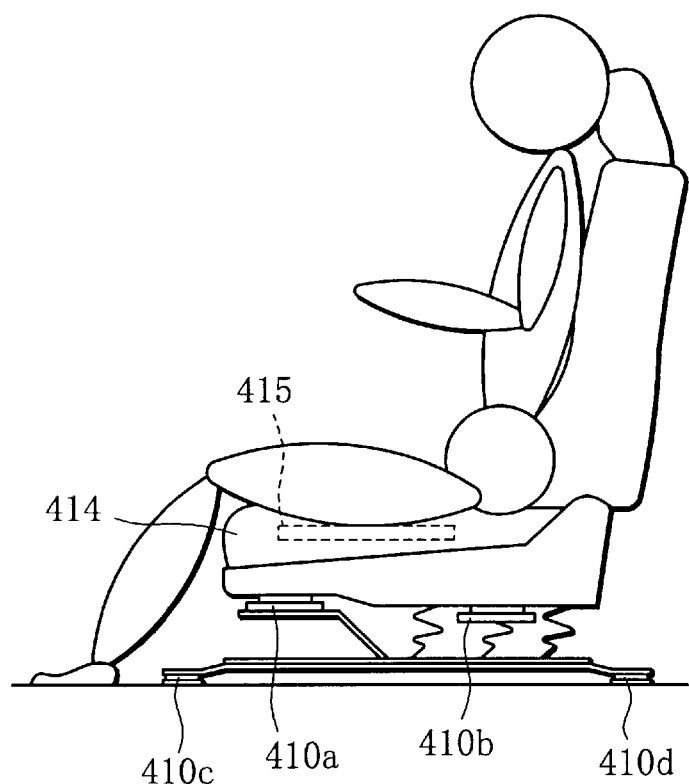
FIG. 46 is a diagram showing load sensors and a passenger detecting apparatus installed in a seat.
Figure 48:
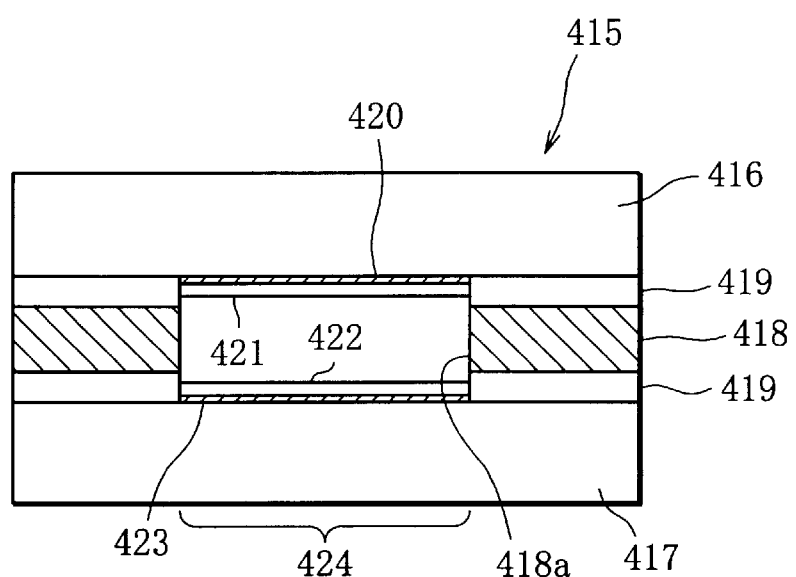
FIG. 48 is a B—B cross-sectional view of the passenger detecting apparatus shown in FIG. 47.
Figure 47:
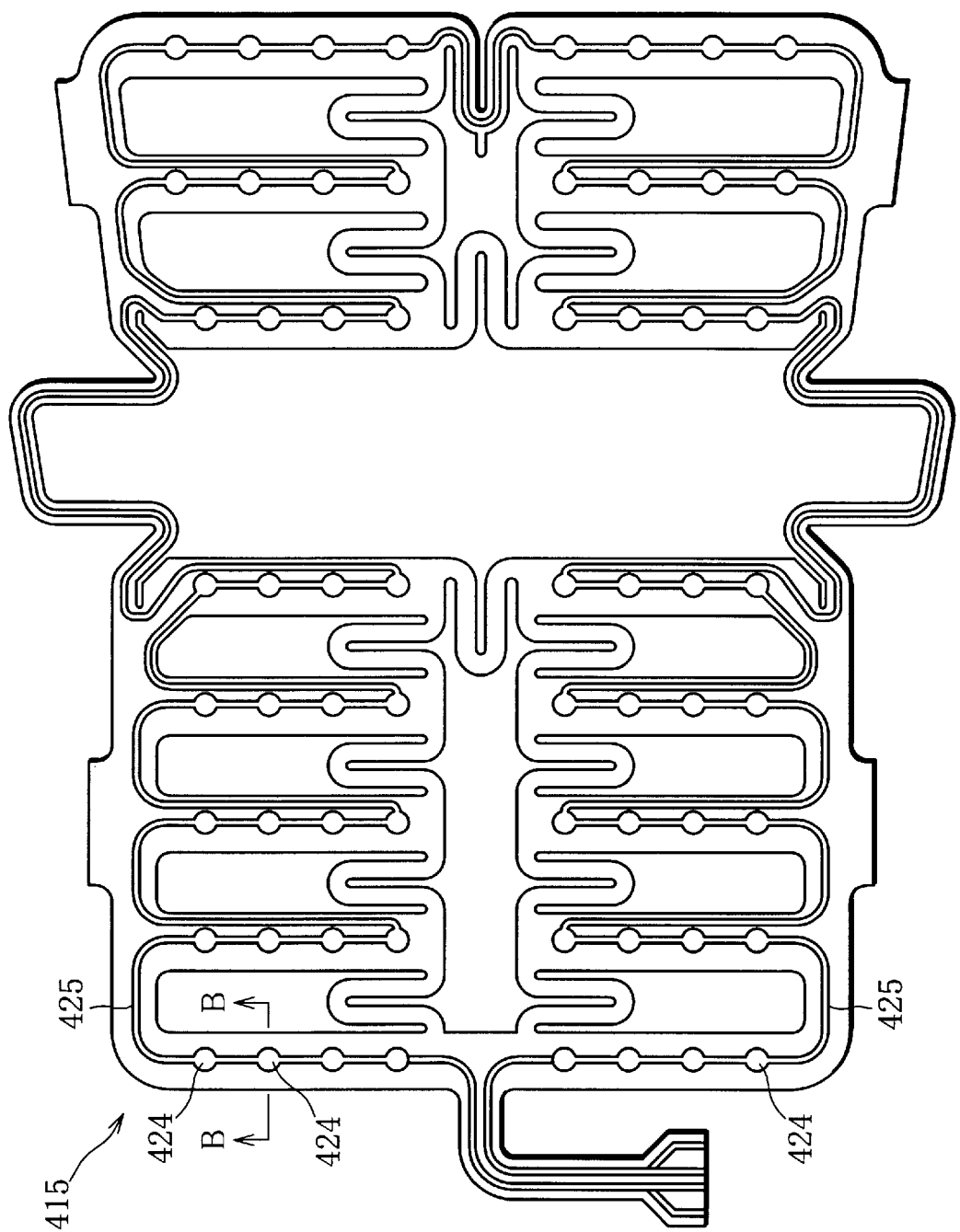
FIG. 47 is a general diagram showing the general structure of the passenger detecting apparatus shown in FIG. 46.

FIG. 46 is a diagram showing load sensors used in the passenger detecting apparatus according to this invention and the passenger detecting apparatus installed in a seat. For the sake of descriptive convenience, same reference numerals are given to those components in the following diagrams which are the same as the corresponding components in FIG. 51.

Figure 51:
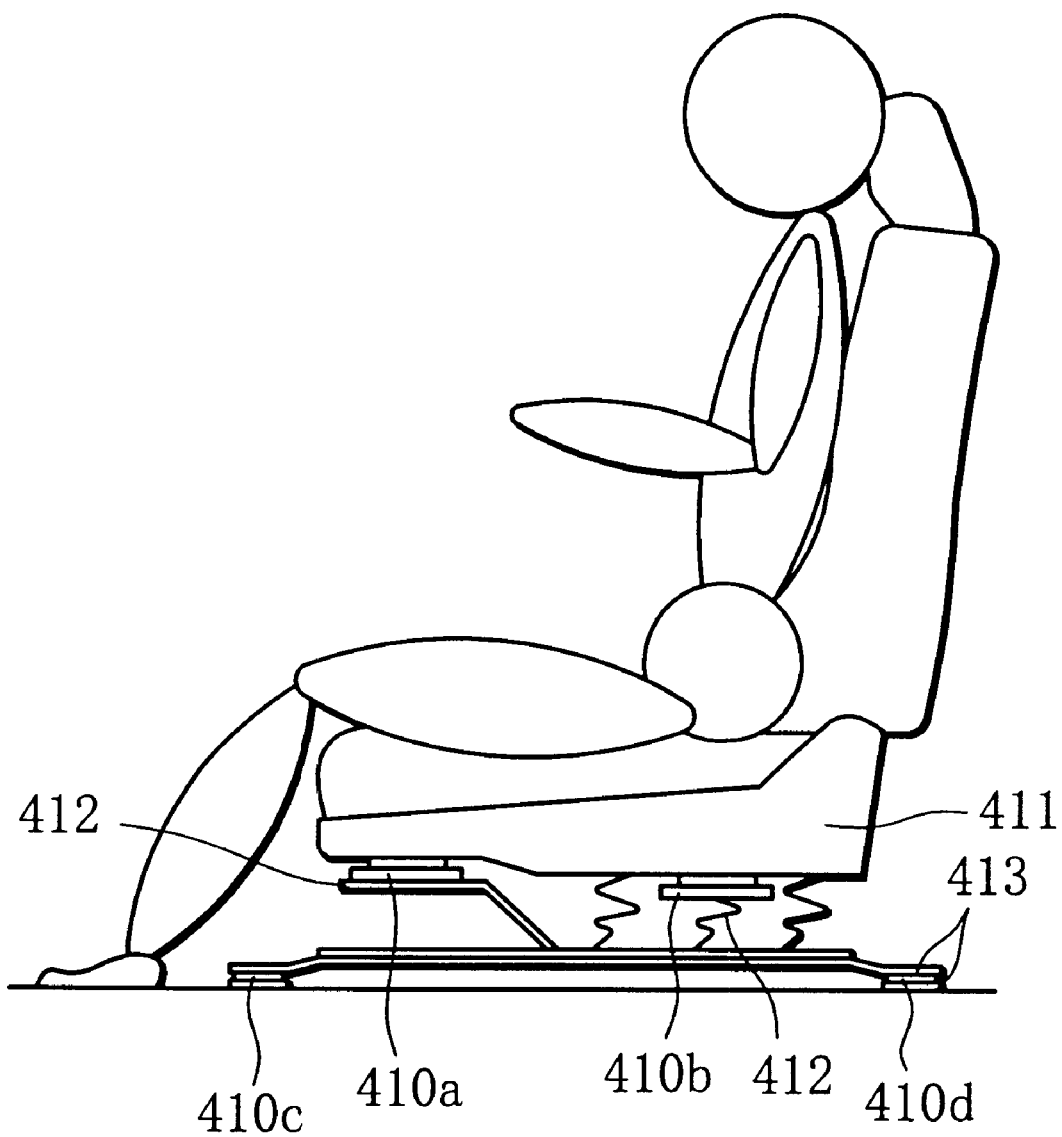
FIG. 51 is a diagram showing load sensors installed in a seat.

In FIG. 46, load sensors 410a to 410d are placed sandwiched between the seat cushion pan and the springs or the seat mounting portion to detect the weight of a passenger as in FIG. 51. A passenger detecting apparatus 415 is provided on a seat cushion 414 in a seat, and is comprised of flat film electric wires as shown in the general view in FIG. 47 and the B—B cross-sectional view in FIG. 48. The passenger detecting apparatus 415 has such a structure that an insulating layer 418 of an insulating plastic film or the like is bonded between plastic films 416 and 417 comprised of a flexible electrically insulating circuit board, such as polyethylene terephthalate (PET) or the like (hereinafter called "insulating films") by using an adhesive 419. At this time, two conductive layers 420 and 421 and two conductive layers 422 and 423 each having, for example, conductive paint printed thereon, are respectively formed on one surface of the insulating films 416 and 417, and the conductive layers 420 and 421 face the conductive layers 422 and 423. The individual conductive layers 420–423 are each so formed as to form a circuit pattern.

The insulating layer 318 has an opening 418a formed at a predetermined location, where the conductive layers 421 and 422 face each other with space (clearance) corresponding to the thickness of the insulating layer 418, thus constituting a detection section 424 which detects external pressure acting on the film electric wires. The individual detection sections 424 are coupled by an air tube 425 which, like the detection section 424, has the insulating films 416 and 417 formed into a passage with, for example, a rectangular cross section, facing each other with a clearance therebetween, and is so constructed that air can flow through the detection sections. The circuit patterns of the insulating films 416 and 417 approximately coincides with the path of the air tube 425.

Therefore, the passenger detecting apparatus 415 enables pressure detection by a detection circuit 432 to be described later, by using the phenomenon that when pressure acts on the opening 418a from one of the sides, one or both of the insulating films 416 and 417 elastically deform so that the conductive layers 420 and 421 and the conductive layers 422 and 423 electrically conduct at the opening 418a.

Figure 49:
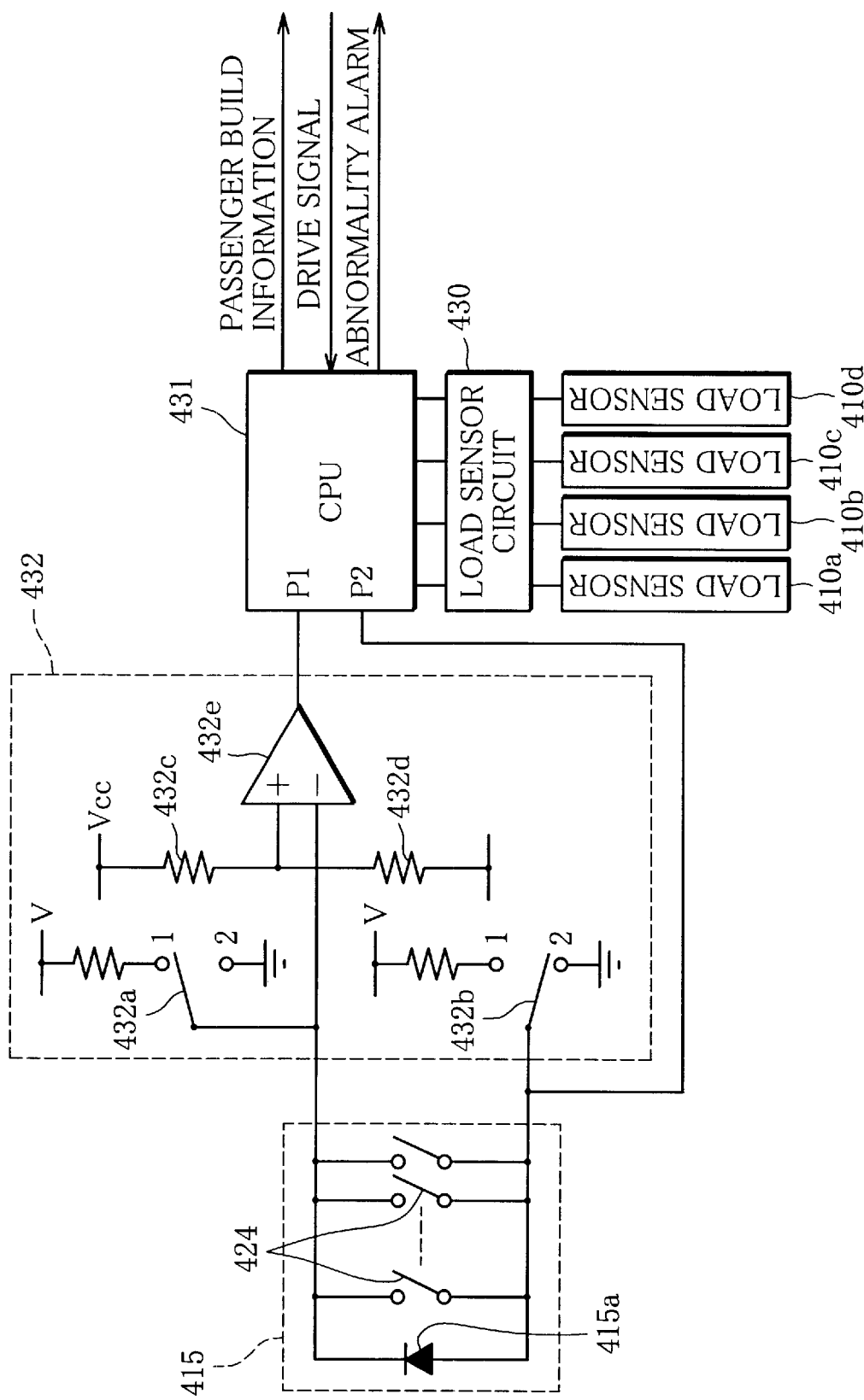
FIG. 49 is a structural diagram exemplifying the structure of a passenger detecting apparatus according to this invention which uses the sensors shown in FIG. 46.

FIG. 49 is a structural diagram exemplifying the structure of the passenger detecting apparatus according to this invention which uses the sensors shown in FIG. 46. In this diagram, the individual load sensors 410a–410d which constitute the weight detection means are connected to a load sensor circuit 430 which also constitutes the weight detection means. The load sensor circuit 430 detects weight information of a passenger seated on a seat of a vehicle coming from the individual load sensors 410a–410d, and sends it to a CPU 431 which constitutes the acquisition means and correction means of this invention.

The individual detection sections 424 of the passenger detecting apparatus 415 which constitute the passenger detection means of this invention can be expressed to be electrically equivalent to switches connected in parallel, and the passenger detecting apparatus 415, which is constructed by those switches 424 and a diode 415a connected in parallel thereto, is connected to the detection circuit 432 that also constitutes the passenger detection means.

The detection circuit 432 has switches 432a and 432b which are respectively connected to both end portions of the passenger detecting apparatus 415 and perform switching to connect the respective end portions to a power source side 1 or a ground side 2. The switching of the switches 432a and 432b is controlled by, for example, the CPU 431 in such a way that when one of the switches 432a and 432b is connected to the power source side 1, the other switch is connected to the ground side 2. In addition, the detection circuit 432 compares a reference voltage Vcc, set by the resistances of two resistors 432c and 432d, with a detection signal (detection voltage) output from one end of the passenger detecting apparatus 415 in a comparator 432e, and sends the comparison result to the CPU 431. In this embodiment, the reference voltage Vcc is set to a value lower than a voltage value V and higher than a voltage value at one end of the passenger detecting apparatus 415 which is generated when any one of the detection sections 424 is on.

The CPU 431 is connected to one end of the passenger detecting apparatus 415 via the detection circuit 432 and is connected directly to the other end of the passenger detecting apparatus as mentioned above, thereby constituting the decision means of this invention, and determines an abnormality (disconnection) in the passenger detecting apparatus based on the output value from the other end. That is, at the time of correcting the initial values of the load sensors, the CPU 431 connects the switch 432a to the power source side 1 and connects the switch 432b to the ground side 2 to thereby acquire a sensor output value P1 from the detection circuit 432. At the time of determining if the passenger detecting apparatus 415 is normal, the CPU 431 connects the switch 432a to the ground side 2 and connects the switch 432b to the power source side 1. At the normal time, therefore, an output value P2 becomes a low-level voltage value based on the resistance of the sensor conductive section, and at the abnormal (disconnection) time, the output value P2 becomes a voltage value V applied to the switch 432b.

When the detection circuit 432 detects the absence of a passenger, the CPU 431 acquires initial weight information detected by the load sensor circuit 430 and corrects the initial values of the individual load sensors 410a–410d based on the initial weight information. Thereafter, the CPU 431 detects the weight of a passenger based on the corrected initial values when the detection circuit 432 detects the presence of the passenger.

Figure 50:
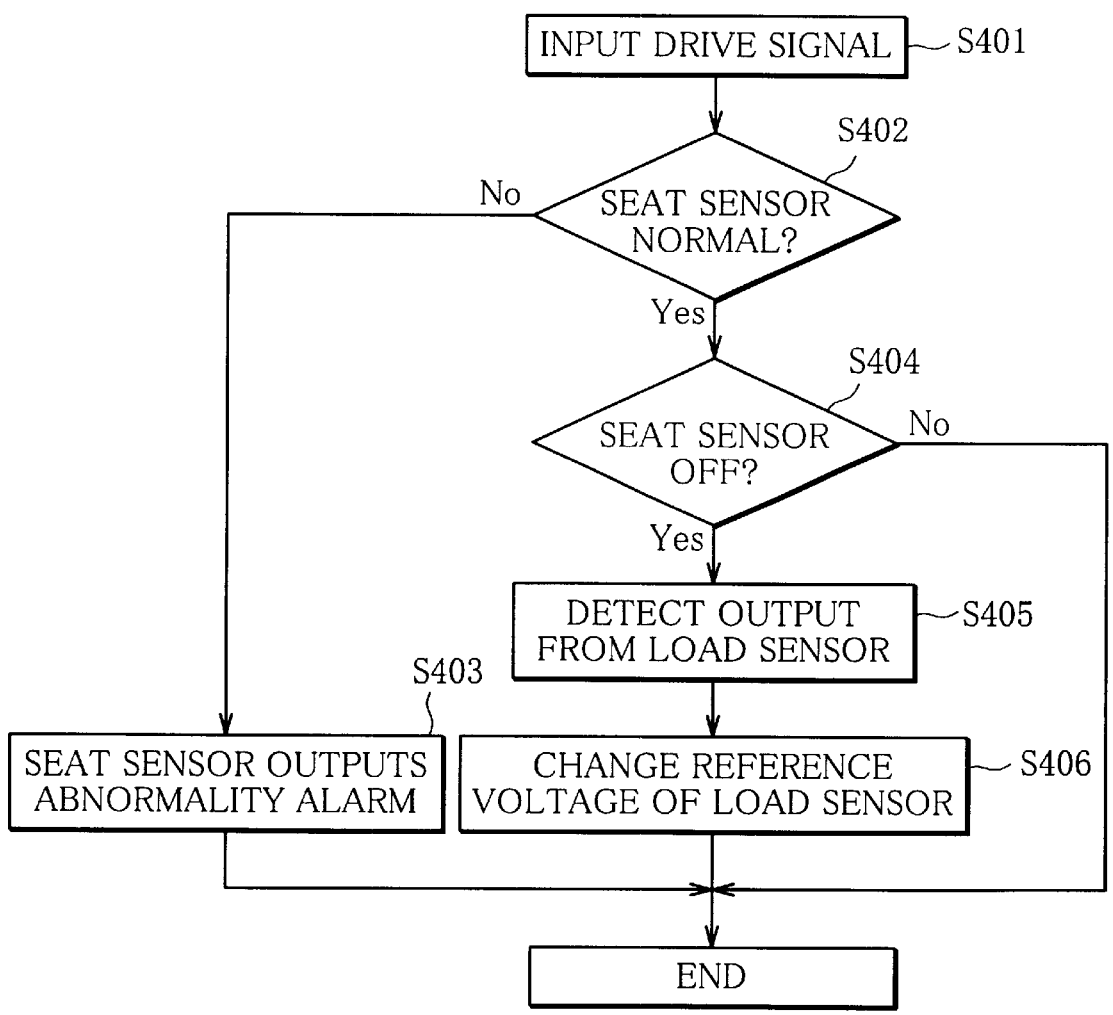
FIG. 50 is a flowchart for explaining the operation of the passenger detecting apparatus shown in FIG. 49.

Next, the operation of the passenger detecting apparatus shown in FIG. 49 will be discussed based on a flowchart in FIG. 50. First, when a drive signal, e.g., a drive signal originated from the opening of a door of a vehicle is input (step S401), the CPU 431 connects the switch 432a to the ground side 2 and connects the switch 432b to the power source side 1 to determine if the passenger detecting apparatus 415 is normal (step S402).

When the output value P2 becomes the high level of the voltage value V, the CPU 431 determines that disconnection has occurred in the passenger detecting apparatus 415 and outputs an abnormal alarm (step S403). When the output value P2 becomes a low level significantly lower than the voltage value V, the CPU 431 determines that the passenger detecting apparatus 415 is normal.

Then, it is determined if the passenger detecting apparatus is in an OFF state or in a load-free state (step S404). Before this decision, the CPU 431 connects the switch 432a to the power source side 1 and connects the switch 432b to the ground side 2.

Under a load-free state, the thickness of the insulating layer 418 disables the opposing conductive layers 420 and 421 and the conductive layers 422 and 423 of the detection section 424 from contacting with each other, so that the resistance of the detection section 424 is always kept infinity. Therefore, V>Vcc in the comparator 432e of the detection circuit 432 and the sensor output value P1 becomes a predetermined voltage value. As the information of this voltage value does not change in a load-free state, the CPU 431 determines based on this information that no passenger is on the seat.

At the same time, the CPU 431 acquires the outputs (initial weight information) of the individual load sensors 410a–410d from the load sensor circuit 430 (step S405), and corrects the initial values of the individual load sensors 410a–410d or the reference voltages of the individual load sensors (step S406). Note that when there are plurality of load sensors as in this embodiment, the initial values of the load sensors which have acquired the initial weight information are corrected in each of the load sensors based on the initial weight information.

According to this embodiment, therefore, because the CPU corrects the initial values corresponding to the initial weights based on information from the load sensors at the time information about no passenger being on the seat is acquired from the passenger detecting apparatus, correction of the initial values of the sensors can be carried out easily and when the passenger detecting apparatus thereafter detects the presence of a passenger, the weight of the passenger can be detected accurately. As the precision of detecting the weight of a passenger is improved in this embodiment, it is possible to accurately acquire secondary information, such as the build of a passenger.

As correction of the initial values of the load sensors is repeated every time absence of a passenger is detected in this embodiment, it is possible to minimize the influence of a drift caused by a change in the ambient environment such as the temperature.

Further, the initial values are corrected in each of the load sensors based on information from each load sensor when information about no passenger is obtained in this embodiment. Even if the seat weight differs or the sensor mounting state differs in each of the vehicle types, it is possible to perform correction of the initial values according to those differences and thus to suppress a variation in the weight detection of the individual load sensors caused by the difference in the vehicle type or mounting state.

This invention is not limited to those embodiments, but may be modified in various forms without departing from the scope of this invention. Although the presence/absence of a passenger on a seat of a vehicle is detected by using the passenger detecting apparatus in the embodiments, for example, this invention is not limited to this case but the same advantages can be acquired even when sensors using infrared rays or ultrasonic waves (proximity sensors) are used.

Although switches are used to switch the direction of the voltage to be applied to the passenger detecting apparatus in the embodiments, transistors may be used instead in which case the direction of the voltage can be switched by controlling the ON/OFF of the transistors by an operation control signal from the CPU.

Further, this invention may be designed so that the drive signal is input to the CPU in accordance with the ON action of, for example, the ignition key in addition to the opening of a door of a vehicle.

What is claimed is:

1. A passenger detection apparatus for detecting the presence of a passenger or an object on a seat cushion, said apparatus comprising:
    at least one pressure sensor having an output signal;
    at least one dielectric sensor having an output signal; and
    a decision unit coupled to said pressure sensor and said dielectric sensor configured to determine the presence of a passenger or an object on said seat cushion in response to said output signals, wherein if the presence of a passenger is identified, the decision unit is configured to determine a buttock position of the passenger on the seat cushion and a shoulder position of the passenger on a seat back, and wherein the decision unit is configured to use the buttock position and the shoulder position to determine the size of the upper body of the passenger.

2. The apparatus of claim 1, additionally comprising a temperature sensor.

3. The apparatus of claim 1, wherein said decision unit is configured to detect moisture on said seat cushion.

4. The apparatus of claim 1, wherein said pressure sensor comprises a matrix of a plurality of independent pressure sensor elements arranged in said seat cushion.

5. A passenger detection apparatus comprising:
    a first detector having an output signal in a seat cushion for detecting passenger contact with said seat cushion;

a second detector having an output signal in a seat back for detecting passenger contact with said seat back;

an angle detector having an output signal for measuring an angle defined by the relative orientation of said seat cushion and said seat back; and a decision unit configured to determine a buttock position of the passenger with respect to the seat cushion and a shoulder position of the passenger with respect to the seat back in response to said output signals, wherein the decision unit is configured to use the buttock position, the shoulder position, and the angle detector to determine the size of the upper body of the passenger.

6. The apparatus of claim 5, wherein said first detector comprises one or more of a dielectric sensor, a pressure sensor, and a temperature sensor.

7. The apparatus of claim 5, wherein said second detector comprises one or more of a dielectric sensor, a pressure sensor, and a temperature sensor.

* * * * *